（12） United States Patent
Heo et al.

(10) Patent No.: US 12,197,677 B2
(45) Date of Patent: Jan. 14, 2025

(54) ELECTRONIC DEVICE INCLUDING PRESSURE SENSOR AND METHOD FOR OPERATING SAME

(71) Applicant: SAMSUNG ELECTRONICS CO., LTD., Suwon-si (KR)

(72) Inventors: Hoondo Heo, Suwon-si (KR); Minuk Kim, Suwon-si (KR); Keunsik Lee, Suwon-si (KR); Eunsung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/097,835

(22) Filed: Jan. 17, 2023

(65) Prior Publication Data

US 2023/0161442 A1 May 25, 2023

Related U.S. Application Data

(63) Continuation of application No. PCT/KR2021/010014, filed on Jul. 30, 2021.

(30) Foreign Application Priority Data

Jul. 30, 2020 (KR) .................. 10-2020-0095532

(51) Int. Cl.
*G06F 3/041* (2006.01)
*G06F 3/044* (2006.01)
*G06F 3/045* (2006.01)

(52) U.S. Cl.
CPC ............ *G06F 3/0418* (2013.01); *G06F 3/045* (2013.01); *G06F 3/0443* (2019.05); *G06F 3/0445* (2019.05); *G06F 2203/04102* (2013.01)

(58) Field of Classification Search
None
See application file for complete search history.

(56) References Cited

U.S. PATENT DOCUMENTS

| 2010/0117975 A1 | 5/2010 | Cho |
| 2014/0168139 A1 | 6/2014 | Ku |

(Continued)

FOREIGN PATENT DOCUMENTS

| CN | 104007873 A | 8/2014 |
| KR | 10-2014-0078922 A | 6/2014 |

(Continued)

OTHER PUBLICATIONS

International Search Report dated Oct. 29, 2021, issued by the International Searching Authority in International Application No. PCT/KR2021/010014 (PCT/ISA/210).

(Continued)

*Primary Examiner* — Amare Mengistu
*Assistant Examiner* — Sarvesh J Nadkarni
(74) *Attorney, Agent, or Firm* — Sughrue Mion, PLLC

(57) ABSTRACT

An electronic device includes: a housing structure; a flexible display provided on the housing structure; a pressure sensor including a first resistor and a second resistor that are provided in at least a portion of the flexible display; and a control circuit configured to detect a value associated with a pressure applied to the flexible display based on values corresponding to the first resistor and the second resistor in case that the flexible display is touched.

19 Claims, 43 Drawing Sheets

(56) References Cited

U.S. PATENT DOCUMENTS

| | | | |
|---|---|---|---|
| 2014/0240261 A1 | 8/2014 | Heo et al. | |
| 2015/0153887 A1 | 6/2015 | Kim et al. | |
| 2017/0010704 A1* | 1/2017 | Chen | G06F 3/0412 |
| 2017/0010732 A1 | 1/2017 | Bosch Ruiz et al. | |
| 2017/0010742 A1* | 1/2017 | Liu | G06F 3/045 |
| 2017/0090659 A1 | 3/2017 | Shiozaki | |
| 2017/0357344 A1* | 12/2017 | Hong | G06F 3/0447 |
| 2017/0371471 A1 | 12/2017 | Kim et al. | |
| 2018/0040678 A1* | 2/2018 | Zhai | H10K 59/131 |
| 2018/0082632 A1 | 3/2018 | Lee | |
| 2018/0150108 A1* | 5/2018 | Song | H10K 59/40 |
| 2019/0212858 A1 | 7/2019 | Jeon et al. | |
| 2021/0360099 A1* | 11/2021 | You | H03K 17/964 |

FOREIGN PATENT DOCUMENTS

| | | |
|---|---|---|
| KR | 10-2015-0122014 A | 10/2015 |
| KR | 10-2017-0140460 A | 12/2017 |
| KR | 10-2018-0000665 A | 1/2018 |
| KR | 10-2018-0031893 A | 3/2018 |
| KR | 10-2020-0079956 A | 7/2020 |

OTHER PUBLICATIONS

Written Opinion dated Oct. 29, 2021, issued by the International Searching Authority in International Application No. PCT/KR2021/010014 (PCT/ISA/237).

* cited by examiner

ELECTRONIC DEVICE INCLUDING PRESSURE SENSOR AND METHOD FOR OPERATING SAME

CROSS-REFERENCE TO RELATED APPLICATIONS

This application is a by-pass continuation application of International Application No. PCT/KR2021/010014, filed on Jul. 30, 2021, which is based on and claims priority to Korean Patent Application No. 10-2020-0095532, filed on Jul. 30, 2020 in the Korean Intellectual Property Office, the disclosures of which are incorporated by reference herein in their entireties.

BACKGROUND

1. Field

The disclosure relates to an electronic device including a pressure sensor that detects a touch pressure applied to a display, and a method of operating the same.

2. Description of Related Art

With the development of electronic, information, and communication technologies, various functions have come to be integrated into a single electronic device. For example, a smartphone may include functions of a sound playback device, an imaging device, or a digital diary, in addition to a communication function, and more various functions may be implemented in the smartphone through additional installation of applications.

As functional differences have been considerably reduced among these electronic devices of respective manufacturers, in order to satisfy consumers' purchasing desires, the electronic devices are becoming gradually slimmer and are being improved to increase the rigidity of electronic devices and to enhance the design aspects of the electronic devices, as well as to differentiate the functional elements thereof. These electronic devices are being transformed into various shapes, departing from a uniform rectangular shape. For example, an electronic device may have a transformable structure that is convenient to carry and enables a large-screen display to be used when the electronic device is used.

As the use of personal and portable electronic devices such as smartphones has become common, demands for portability and usability are increasing. For example, an electronic device having a foldable structure is easy to carry and is capable of providing an improved multimedia environment through a wider screen.

These miniaturized electronic devices or foldable electronic devices may acquire a plurality of pieces of information via various sensors and perform various functions by using the acquired information. For example, the electronic devices that perform such functions may include, in a display, a pressure sensor configured to detect a touch pressure.

A foldable electronic device may include a plate having a plurality of openings for supporting a folding area of a foldable display. When the pressure of an input received on the display is small, a pressure sensor included in a miniaturized electronic device or a foldable electronic device may not detect the small pressure of the input due to the thickness of the display, or the sensitivity of the detected input pressure may be low, and thus the sensing function of the pressure sensor may be deteriorated.

Alternatively, when a user input is received by the electronic device, a change may be caused in a resistor included in the pressure sensor by the temperature generated by a user's body which is in contact with the electronic device. As a result, an error is caused in a value identified from the pressure sensor, which may result in a measurement error with respect to the pressure of the user input.

Alternatively, since resistance values of resistors included in a pressure sensor disposed on the bendable portion are changed depending on the folding state (e.g., the folding angle) of a foldable electronic device, a pressure may be misidentified, which may cause malfunction of the electronic device.

SUMMARY

Provided is an electronic device including a pressure sensor capable of detecting an external input related to a foldable display in the electronic device.

According to an aspect of the disclosure, an electronic device includes: a housing structure; a flexible display provided on the housing structure; a pressure sensor including a first resistor and a second resistor that are provided in at least a portion of the flexible display; and a control circuit configured to detect a value associated with a pressure applied to the flexible display based on values corresponding to the first resistor and the second resistor in case that the flexible display is touched.

The flexible display may include: a window; a display panel disposed on a rear surface of the window; a polarizer disposed between the window and the display panel; a touch panel disposed between the polarizer and the display panel; a plurality of touch sensors disposed on the touch panel and configured to detect a touch of an external object at a front surface of the window; a polymer member disposed on a rear surface of the display panel; a conductive plate attached to a rear surface of the polymer member and including a plurality of openings, the first resistor is disposed in an area of the flexible display other than the plurality of openings, and the second resistor is disposed on at least one of the plurality of openings.

A first proportion of the first resistor disposed on the plurality of openings may be less than a second proportion of the second resistor disposed on the plurality of openings, and in case that the flexible display is touched, a second change amount in a resistance value of the second resistor is greater than a first change amount in a resistance value of the first resistor.

The plurality of openings may have an equal size, and the plurality of openings may have at least one of an elongated bar-type shape, a circular shape, a square shape, a rectangular shape, a rhombus shape, or an oval shape.

The plurality of openings may have different sizes, and the plurality of openings may have at least one of an elongated bar-type shape, a circular shape, a square shape, a rectangular shape, a rhombus shape, or an oval shape.

The first resistor may be provided in a first zigzag pattern, the second resistor may be provided in a second zigzag pattern, and a shape of the first zigzag pattern and a shape of the second zigzag pattern have a predetermined interval.

A width the first resistor may be greater than or equal to a width of a support area provided between the plurality of openings.

A width the first resistor may be smaller than or equal to a width of a support area provided between the plurality of openings.

A width of the first resistor may be smaller than a width of the second resistor, and a thickness of the first resistor may be greater than a thickness of the second resistor.

A width of the first resistor may less than a width of the second resistor, and a thickness of the first resistor may be smaller than a thickness of the second resistor.

A width of the second resistor is greater than or equal to a width of a spatial area provided in the plurality of openings.

A width of the second resistor may be smaller than a width of a spatial area provided in the plurality of openings.

The conductive plate may include: a first flat portion facing the housing structure; a second flat portion facing the housing structure; and a bendable portion that integrally interconnects the first flat portion and the second flat portion so that the conductive plate is foldable via the plurality of openings.

The control circuit may be further configured to: obtain an at least one first value associated with a user input by using a touch sensor of the plurality of touch sensors, obtain at least one second value associated with a pressure of the user input by using the pressure sensor based on the first change amount in the resistance value of the first resistor and the second change amount in the resistance value of the second resistor, the second change amount being greater than the first change amount, and perform at least one control operation based on the at least one first value and the at least one second value.

The control circuit may be further configured to: compare the at least one first value with a first threshold value to obtain a first comparison result, based on the first comparison result, identify a second threshold value corresponding to the first comparison result, compare the at least one second value with the second threshold value to obtain a second comparison result, and perform at least one control operation based on the first comparison result and the second comparison result.

The electronic device may further include a hinge structure, the housing structure may include a first housing and a second housing connected to the hinge structure, and the control circuit is further configured to: based on the user input being positioned in a first area of the flexible display associated with the hinge structure and an angle between the first housing and the second housing being a first angle, reflect a first gain value on a value associated with the pressure of the user input, compare the value associated with the pressure of the user input on which the first gain value is reflected with the second threshold value, based on the angle between the first housing and the second housing being a second angle, reflect a second gain value on the value associated with the pressure of the user input, and compare the value associated with the pressure of the user input on which the second gain value is reflected with the second threshold value.

The control circuit may be further configured to: based on the angle between the first housing and the second housing being the first angle, configure the second threshold value to the at least one first value, and based on the angle between the first housing and the second housing being the second angle, configure the second threshold value to the at least one second value.

The first area of the flexible display associated with the hinge structure may include a first sub-area and a second sub-area, and the control circuit may be further configured to: based on the user input being positioned in the first sub-area, reflect a third gain value on the value associated with the pressure of the user input, and based on the user input being positioned in the second sub-area, reflect a fourth gain value on the value associated with the pressure of the user input, and based on the first sub-area being relatively more curved than the second sub-area in case that the angle between the first housing and the second housing is changed, the third gain value is greater than the fourth gain value.

The control circuit may be further configured to: based on the user input being positioned in the first sub-area, compare the value associated with the pressure of the user input on which the third gain value is reflected with a third threshold value, and based on the user input being positioned in the second sub-area, compare the value associated with the pressure of the user input on which the fourth gain value is reflected with a fourth threshold value.

According to one or more embodiments, provided is an electronic device in which the resistors included the pressure sensor of the electronic device are arranged in a structure that allows a resistance change amount due to a temperature associated with a user input to be canceled, thereby reducing a measurement error for the pressure of the user input, and a method of operating the same.

According to one or more embodiments, provided is an electronic device in which the resistors included in the pressure sensor of the electronic device are arranged in a structure that allows a difference in resistance change amounts to be increased by a user input, thereby facilitating the detection of the pressure of the user input received on the folding area, and a method of operating the same.

According to one or more embodiments, provided is an electronic device in which the electronic device executes an operation for compensating for pressure misidentified by a pressure sensor disposed on a bendable portion according to a folding state (e.g., a folding angle or the like) of the electronic device, thereby preventing a malfunction of the electronic device due to a misidentified pressure, and a method of operating the same. According to one or more embodiments, when a foldable display is folded, the shapes of resistors of a pressure sensor disposed to correspond to the folding area may be changed, thereby improve a pressure sensing function.

In an electronic device including a pressure sensor including a first resistor and a second resistor according to various embodiments of the disclosure, for example, the first resistor is disposed between a plurality of openings provided in a conductive plate of a flexible display and the second resistor is disposed on the plurality of openings. As a result, when an input made by an external object (e.g., a portion of a user's body) is received on the flexible display, the resistances of the first resistor and the second resistor are changed to have different values, and the control circuit is capable of detecting the pressure of the input based on a difference in resistance change amounts between the first and second resistors. Accordingly, the pressure sensor including the first resistor and the second resistor may easily detect a touch pressure of a small force applied to the flexible display, and as a result, an input on the flexible display may be stably detected.

Effects that can be obtained in the disclosure are not limited to those described above, and other effects not described above will be clearly understood by a person ordinarily skilled in the art to which the disclosure belongs based on the following description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
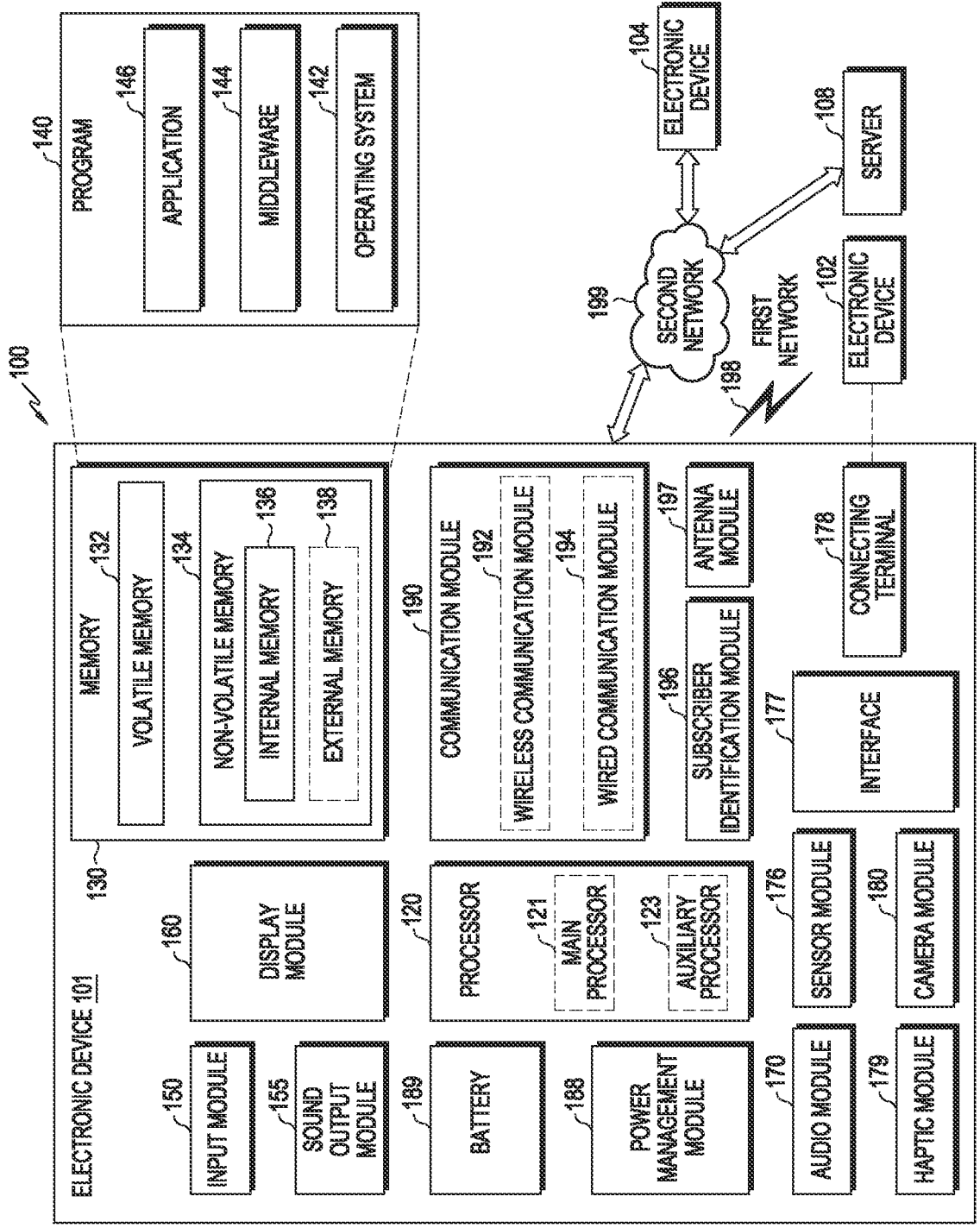
FIG. 1 is a block diagram of an electronic device in a network environment, according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
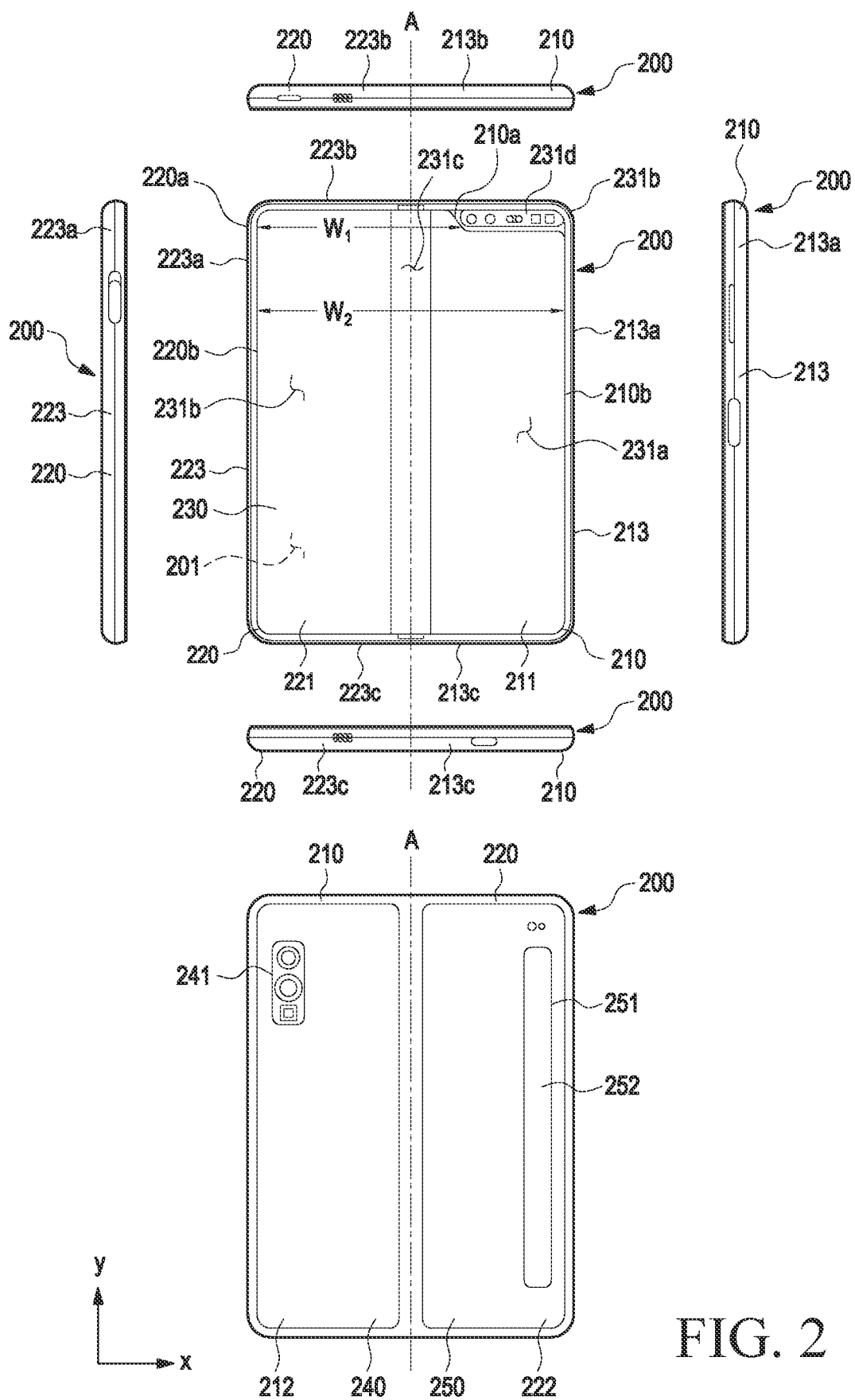
FIG. 2 is a view illustrating an electronic device in an unfolded state, according to various embodiments.
Figure 3:
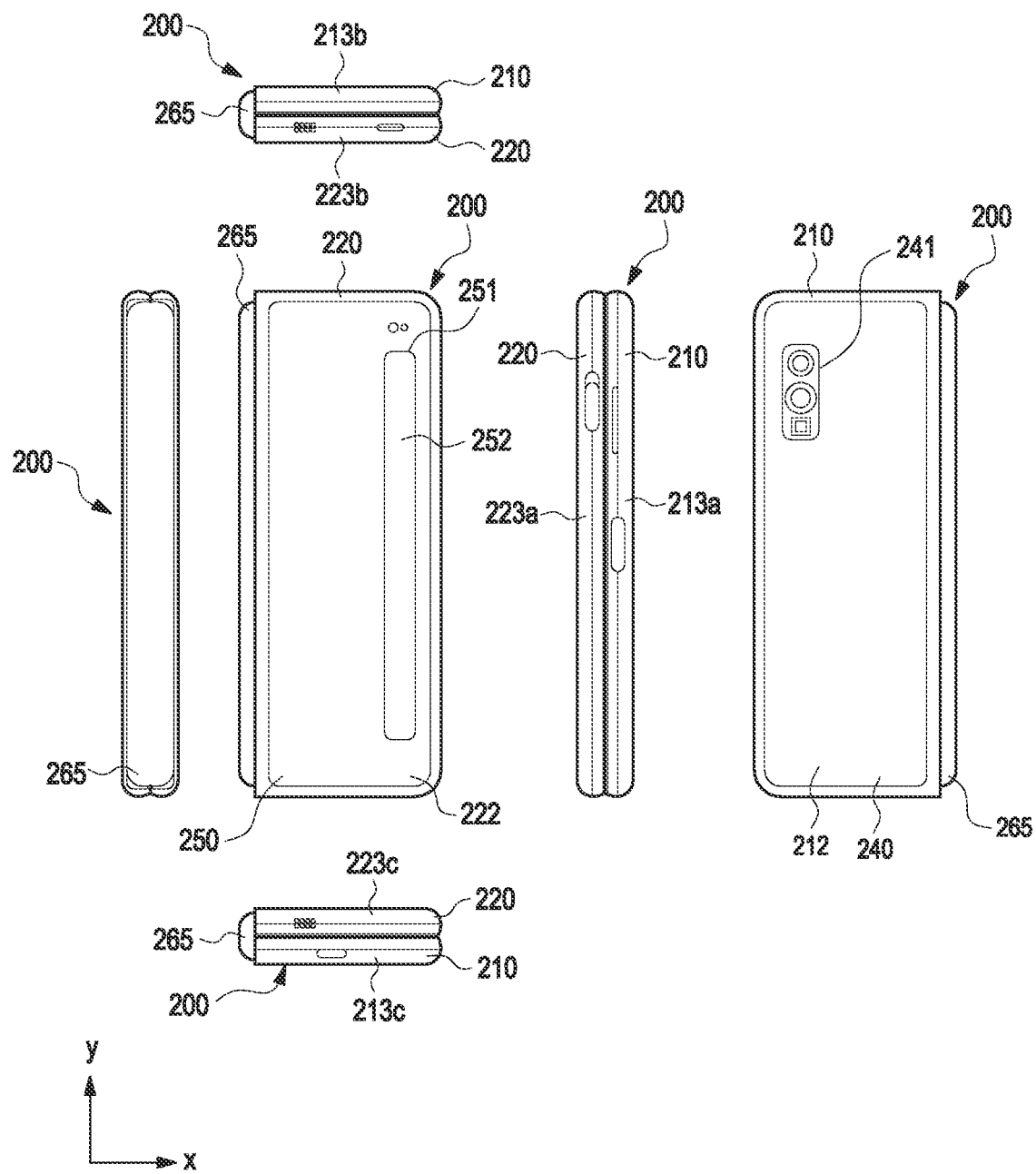
FIG. 3 is a view illustrating the electronic device of FIG. 2 in a folded state, according to various embodiments.

FIG. 2 is a view illustrating an electronic device 200 according to various embodiments in an unfolded state. FIG. 3 is a view illustrating the electronic device 200 of FIG. 2 according to various embodiments in a folded state.

The electronic device 200 of FIGS. 2 and 3 may be at least partially similar to the electronic device 101 of FIG. 1, or may include another embodiment of the electronic device.

Referring to FIG. 2, the electronic device 200 may include a pair of housing structures 210 and 220 rotatably coupled to each other via a hinge structure (e.g., the hinge structure 264 in FIG. 4) so as to be folded with respect to each other, a hinge cover 265 that covers the foldable portions of the pair of housing structures 210 and 220, and a display 230 (e.g., a flexible display or a foldable display) disposed in a space defined by the pair of housing structures 210 and 220 (hereinafter, the display will be referred to as a flexible display). In some embodiments, the hinge cover 265 may be a portion of the hinge structure 264. In an embodiment, the electronic device 200 may include a foldable housing in which the pair of housing structures 210 and 220 are coupled to be pivotable from positions at which the pair of housing structures 210 and 220 are folded to face each other to positions at which the pair of housing structures 210 and 220 are parallel to each other. Herein, the surface on which the flexible display 230 is disposed may be defined as the front surface of the electronic device 200, and the surface opposite the front surface may be defined as the rear surface of the electronic device 200. In addition, the surface surrounding the space between the front surface and the rear surface may be defined as the side surface of the electronic device 200.

In an embodiment, the pair of housing structures 210 and 220 may include a first housing structure 210 including a sensor area 231d, a second housing structure 220, a first rear surface cover 240, and a second rear surface cover 250. The pair of housing structures 210 and 220 of the electronic device 200 are not limited to the shape and assembly illustrated in FIGS. 2 and 3, but may be implemented by other combinations and/or assemblies of other shapes or components. For example, in another embodiment, the first housing structure 210 and the first rear surface cover 240 may be integrally configured, and the second housing structure 220 and the second rear surface cover 250 may be integrally configured.

According to an embodiment, the first housing structure 210 and the second housing structure 220 may be disposed on opposite sides about a first axis (e.g., a folding axis A), and may have generally symmetrical shapes with respect to the folding axis A. In some embodiments, the first housing structure 210 and the second housing structure 220 are pivotable with respect to the hinge structure 264 or the hinge cover 265 about different folding axes, respectively. For example, each of the first housing structure 210 and the second housing structure 220 may be pivotably coupled to the hinge structure 264 or the hinge cover 265. By pivoting the first housing structure 210 and the second housing structure 220 about the folding axis A or about different folding axes, respectively, the first housing structure 210 and the second housing structure 220 are pivotable from positions at which the first housing structure 210 and the second housing structure 220 are folded to each other to positions at which the first housing structure 210 and the second housing structure 220 are inclined with respect to each other or the positions at which the first housing structure 210 and the second housing structure 220 are parallel to each other. That is, the housing structures 210 and 220 are rotatable about a rotation axis by using the hinge structure 264. The housing structures 210 and 220 may form an acute angle, a right angle, or a flat angle with each other as being rotated, and may form an obtuse angle to be out-folded. For example, when the housing structures 210 and 220 are rotated so that the electronic device 200 is out-folded, it may mean that the rear surfaces of respective housing structures 210 and 220 are rotated to face each other.

Herein, "located side by side" or "extending parallel to each other" may mean the state in which two structures are at least partially located next to each other or the state in which at least portions positioned next to each other are arranged parallel to each other. In some embodiments, "arranged side by side" may mean that two structures are arranged to be oriented in parallel directions or in substantially the same direction while being located next to each other. Expressions such as "side by side" and "parallel" may be used in the following detailed description, which will be readily understood according to the shapes or arrangements of the structures with reference to the accompanying drawings or the like.

According to an embodiment, the angle or distance between the first housing structure 210 and the second housing structure 220 may vary depending on whether the state of the electronic device 200 (e.g., the operating state) is an unfolded state (a half-folded state, an unfolded state, a flat state, or an open state), a folded state (a closed state or a folded state), or an intermediate state. According to an embodiment, the first housing structure 210 may further include a sensor area 231d in which various sensors are arranged unlike the second housing structure 220, but the first housing structure 210 and the second housing structure 220 may have mutually symmetrical shapes in other areas. As another embodiment, the sensor arrangement area 231d may be additionally disposed in or replaced with at least a partial area of the second housing structure 220.

In an embodiment, in the unfolded state of the electronic device 200, the first housing structure 210 may be connected to the hinge structure (e.g., the hinge structure 264 in FIG. 4) and include a first surface 211 disposed to face the front side of the electronic device 200, a second surface 212 facing away from the first surface 211, and a first side surface member 213 surrounding at least a portion of the space between the first surface 211 and the second surface 212. In an embodiment, the first side surface member 213 may include a first side surface 213a arranged parallel to the folding axis A, a second side surface 213b extending from one end of the first side surface 213a in a direction perpendicular to the folding axis A, and a third side surface 213c extending from the other end of the first side surface 213a in a direction perpendicular to the folding axis A. In describing various embodiments, expressions such as "parallel" or "perpendicular" are used in connection with the arrangements of the above-described side surfaces, but in some embodiments, the expressions may include the meaning of "partially parallel" or "partially perpendicular". In some embodiments, expressions such as "parallel" or "perpendicular" may include an inclined arrangement relationship in an angular range within 10 degrees.

In an embodiment, the second housing structure 220 may be connected to the hinge structure (e.g., the hinge structure 264 in FIG. 4), and in the unfolded state of the electronic device 200, the second housing structure 220 may include a third surface 221 arranged to face the front side of the electronic device 200, a fourth surface 222 facing away from the third surface 221, and a second side surface member 223 surrounding at least a portion of the space between the third surface 221 and the fourth surface 222. In an embodiment, the second side surface member 223 may include a fourth side surface 223a arranged parallel to the folding axis A, a fifth side surface 223b extending from one end of the fourth side surface 223a in a direction perpendicular to the folding axis A, and a sixth side surface 223c extending from the other end of the fourth side surface 223a in a direction perpendicular to the folding axis A. In an embodiment, in the folded state, the third surface 221 may face the first surface 211. In some embodiments, although there are some differences in specific shapes, the second side surface member 223 may be made, in shape and material, to be substantially the same as the first side surface member 213.

In an embodiment, the electronic device 200 may include a recess 201 provided to accommodate the flexible display 230 through structural shape coupling of the first housing structure 210 and the second housing structure 220. The recess 201 may have substantially the same size as the flexible display 230. In an embodiment, due to the sensor area 231d, the recess 201 may have two or more different widths in a direction perpendicular to the folding axis A. For example, the recess 201 may have a first width $W_1$ between a first portion 220a of the second housing structure 220 that is parallel to the folding axis A and a first portion 210a of an edge of the sensor area 231d of the first housing structure 210, and a second width $W_2$ between a second portion 220b of the second housing structure 220 and a third portion 210b of the first housing structure 210 that does not correspond to the sensor area 213d and is parallel to the folding axis A. In this case, the second width $W_2$ may be longer than the first width $W_1$. For example, the recess 201 may have the first width $W_1$ from the first portion 210a of the first housing structure 210 to the first portion 220a of the second housing structure 220, which are asymmetric to each other, and the second width $W_2$ from the third portion 210b of the first housing structure 210 to the second portion 220b of the second housing structure 220, which are symmetric to each other. In an embodiment, the first portion 210a and the third portion 210b of the first housing structure 210 may have different distances from the folding axis A, respectively. The widths of the recess 201 are not limited to the illustrated example. In various embodiments, the recess 201 may have two or more different widths due to the shape of the sensor area 213d or the asymmetric portions of the first housing structure 210 and the second housing structure 220.

In an embodiment, the first housing structure 210 and the second housing structure 220 may be at least partially formed of a metal material or a non-metal material having the rigidity of a level selected in order to support the flexible display 230. In another embodiment, the first housing structure 210 and the second housing structure 220 may at least partially include a conductive material. When the first housing structure 210 and the second housing structure 220 include a conductive material, the electronic device 200 may transmit/receive radio waves by using the portions formed of the conductive material in the first housing structure 210 and the second housing structure 220. For example, a processor or a communication module (e.g., the processor 120 or the communication module 190 in FIG. 1) of the electronic device 200 may perform radio communication by using at least a portion of the first housing structure 210 and the second housing structure 220.

In an embodiment, the sensor area 231d may have a predetermined area adjacent to one corner of the first housing structure 210. However, the arrangement, shape, and size of the sensor area 231d are not limited to the illustrated example. For example, in another embodiment, the sensor area 231d may be provided at another corner of the first housing structure 210 or in any area between the upper and lower end corners. In another embodiment, the sensor area 231d may be disposed in at least one area of the second housing structure 220. In another embodiment, the sensor area 231d may be disposed to extend over the first housing structure 210 and the second housing structure 220. In an embodiment, the electronic device 200 may include components exposed to the front surface of the electronic device 200 through the sensor area 231d or through one or more openings provided in the sensor area 231d, and may perform various functions by using these components. The components disposed in the sensor area 231d may include at least one of, for example, a front camera module (e.g., the camera module 180 in FIG. 1), a receiver (e.g., the audio module 170 in FIG. 1), a proximity sensor, an illuminance sensor, an iris recognition sensor, an ultrasonic sensor (e.g., the sensor module 176 in FIG. 1), or an indicator.

In an embodiment, the first rear surface cover 240 may be disposed on the second surface 212 of the first housing structure 210, and may have a substantially rectangular periphery. In an embodiment, the edges of the first rear surface cover 240 may be at least partially enclosed by the first housing structure 210. Similarly, the second rear surface cover 250 may be disposed on the fourth surface 222 of the second housing structure 220, and the edges of the second rear surface cover 250 may be at least partially enclosed by the second housing structure 220.

In the illustrated embodiment, the first rear surface cover 240 and the second rear surface cover 250 may have substantially symmetrical shapes with respect to the folding axis A. According to another embodiment, the first rear surface cover 240 and the second rear surface cover 250 may have various different shapes. In a still another embodiment, the first rear surface cover 240 may be configured integrally with the first housing structure 210, and the second rear surface cover 250 may be configured integrally with the second housing structure 220.

In an embodiment, the first rear surface cover 240, the second rear surface cover 250, the first housing structure 210, and the second housing structure 220 may provide, through a mutually coupled structure, a space in which various components (e.g., a printed circuit board, an antenna module, a sensor module, or a battery) of the electronic device 200 may be arranged. In an embodiment, one or more components may be disposed or visually exposed on the rear surface of the electronic device 200. For example, one or more components or sensors may be visually exposed through the first rear surface area 241 of the first rear surface cover 240. In various embodiments, the sensors may include a proximity sensor, a rear camera module, and/or a flash. In another embodiment, at least a portion of a sub-display 252 may be visually exposed through a second rear surface area 251 of the second rear surface cover 250.

The flexible display 230 may be disposed in a space defined by the pair of housing structures 210 and 220. For example, the flexible display 230 may be seated in the recess (e.g., the recess 201 in FIG. 2) defined by the pair of housing structures 210 and 220, and may be disposed to occupy substantially the majority of the front surface of the electronic device 200. For example, the front surface of the electronic device 200 may include the flexible display 230, and a partial area (e.g., an edge area) of the first housing structure 210 and a partial area (e.g., an edge area) of the second housing structure 220, which are adjacent to the flexible display 230. In an embodiment, the rear surface of the electronic device 200 may include the first rear surface cover 240, a partial area (e.g., an edge area) of the first housing structure 210 adjacent to the first rear surface cover 240, the second rear surface cover 250, and a partial area (e.g., an edge area) of the second housing structure 220 adjacent to the second rear surface cover 250.

In an embodiment, the flexible display 230 may be a flexible display in which at least a partial area is deformable into a flat shape or a curved shape. In an embodiment, the flexible display 230 may include a folding area 231c, a first area 231a disposed on one side of the folding area 231c (e.g., the right area of the folding area 231c), and a second area 231b disposed on the other side of the folding area 231c (e.g., the left area of the folding area 231c). For example, the first area 231a may be disposed in the first surface 211 of the first housing structure 210, and the second area 231b may be disposed in the third surface 221 of the second housing structure 220. For example, the flexible display 230 may extend from the first surface 211 to the third surface across the hinge structure 264 in FIG. 3, and at least an area corresponding to the hinge structure (e.g., the folding area 231c) may be a flexible region that is deformable from a flat plate shape to a curved shape.

In an embodiment, the area division of the flexible display 230 is exemplary, and the flexible display 230 may be divided into multiple areas (e.g., four or more areas or two areas) depending on the structure or functions thereof. As an example, in the embodiment illustrated in FIG. 2, the folding area 231c extends in the direction of the vertical axis (e.g., the Y axis in FIG. 4) parallel to the folding axis A, and the area of the flexible display 230 may be divided with reference to the folding area 231c or the folding axis (the axis A). However, in another embodiment, the area of the flexible display 230 may be divided with reference to another folding area (e.g., a folding area parallel to the horizontal axis (e.g., the X axis in FIG. 4)) or another folding axis (e.g., a folding axis parallel to the X axis in FIG. 4). The above-described area division of the flexible display is merely physical division based on the pair of housing structures 210 and 220 and the hinge structure (e.g., the hinge structure 264 in FIG. 4), and the flexible display 230 may display one full screen substantially through the pair of housing structures 210 and 220 and the hinge structure (e.g., the hinge structure 264 in FIG. 4). According to embodiments, the electronic device 200 may include a flexible display 230 that operates in a multi-folding manner in which a plurality of housings is alternately folded in opposite directions with respect to each other. For example, in the electronic device 200, a plurality of housings may perform a folding operation with reference to a plurality of folding axes (e.g., folding axes parallel to the X axis and the Y axis of FIG. 4).

According to an embodiment, the first area 231a and the second area 231b may have generally symmetrical shapes about the folding area 231c. However, unlike the second area 231b, the first area 231a may include a notch area (e.g., the notch area 233 in FIG. 4) which provides the sensor area 231d and may have a shape symmetrical to the second area 231b in the other area (e.g., the area other than the notch area). For example, the first area 231a and the second area 231b may include mutually symmetrical portions and mutually asymmetrical portions.

According to an embodiment, at least one of the flexible display 230 (e.g., the first display) and the sub-display 252 (e.g., the second display) may include a fingerprint sensing area. For example, the fingerprint sensing area is an area in which a fingerprint sensor (e.g., the sensor module 176 in FIG. 1) is embedded, and may include an area capable of measuring an external input (e.g., a fingerprint input). According to an embodiment, the fingerprint sensor may be disposed to at least partially overlap the flexible display 230 and/or the sub-display 252 when viewed from the front surface (e.g., the first surface 211 or the third surface 221).

In an embodiment, the fingerprint sensor may include a first fingerprint sensor configured to detect a fingerprint through at least a portion of the flexible display 230 configuring the third surface 221 and a second sensor configured to detect a fingerprint via at least a portion of the sub-display 252. The first fingerprint sensor and the second fingerprint sensor may be disposed in, for example, the inner space of the second housing structure 220 and may be disposed to at least partially overlap each other. In an embodiment, the first fingerprint sensor and the second fingerprint sensor are mounted on at least one circuit board (e.g., the printed circuit board 270 in FIG. 4) to secure a mounting space and reduce the thickness of the electronic device 200. The fingerprint sensors and the fingerprint sensor areas are not limited to the above-described examples, and may be configured to have different arrangement positions, number, sizes, or the areas of the sensing areas according to various embodiments.

Figure 4:
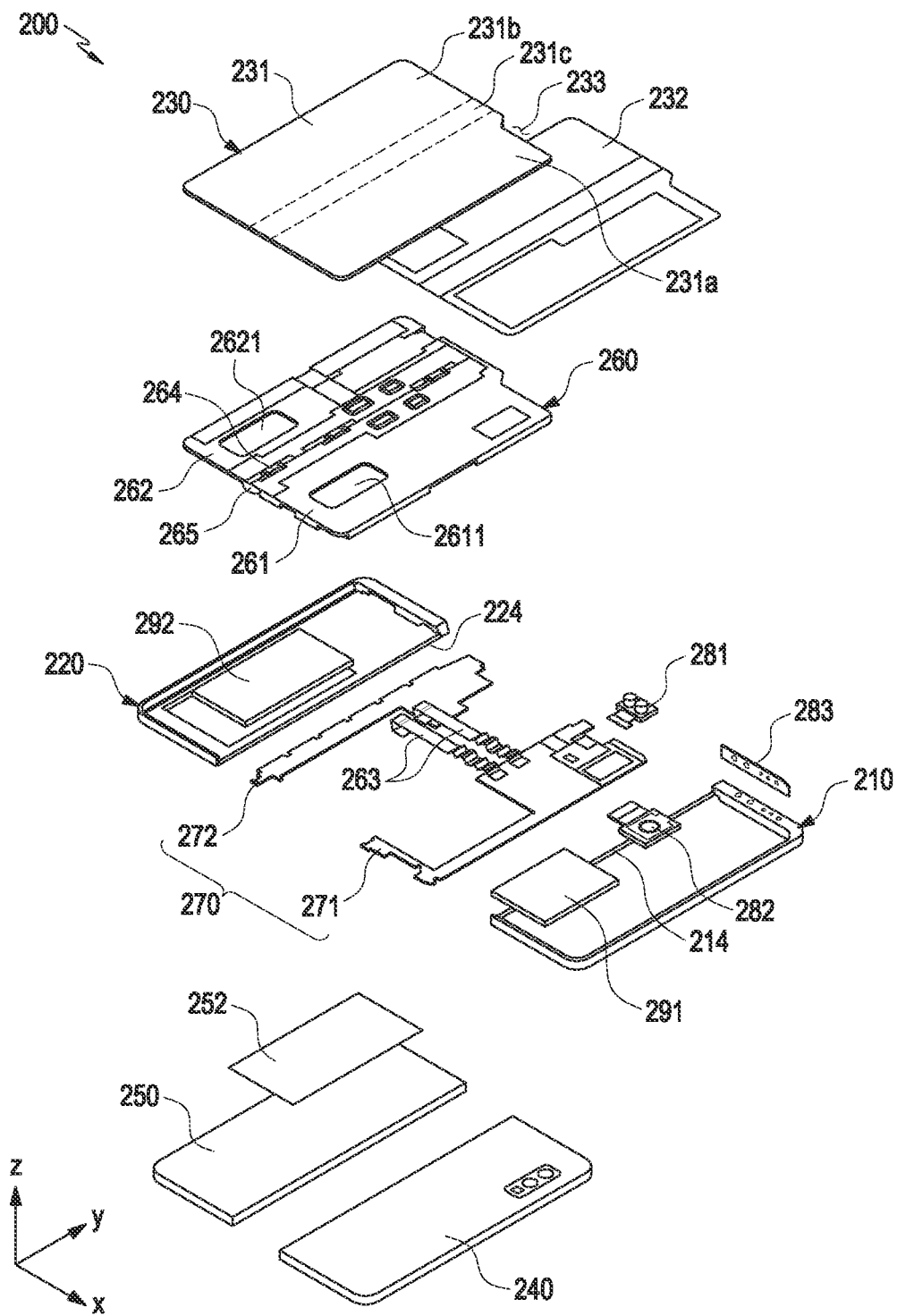
FIG. 4 is an exploded perspective view illustrating an electronic device according to various embodiments.

Referring to FIG. 3, the hinge cover 265 may be disposed between the first housing structure 210 and the second housing structure 220 so as to cover internal components (e.g., the hinge structure 264 in FIG. 4). Although the hinge cover 265 is disclosed separately from the hinge structure 264 for brevity of description, as mentioned above, the hinge cover 265 may partially configure the external appearance of the electronic device 200 while being a portion of the hinge structure 264. In an embodiment, the hinge cover 265 may be covered by a portion of each of the first and second housing structures 210 and 220 or may be exposed to the outside depending on the operating state of the electronic device 200 (the unfolded state or the folded state).

For example, as illustrated in FIG. 2, when the electronic device 200 is in the unfolded state, the hinge cover 265 may not be exposed by being covered by the first housing structure 210 and the second housing structure 220. As another example, as illustrated in FIG. 3, when the electronic device 200 is in the folded state (e.g., the completely folded state), the hinge cover 265 may be exposed to the outside between the first housing structure 210 and the second housing structure 220. As still another example, when the first housing structure 210 and the second housing structure 220 are in the intermediate state in which the first housing structure 210 and the second housing structure 220 are folded with a certain angle therebetween, the hinge cover 265 may be partially exposed to the outside of the electronic device between the first housing structure 210 and the second housing structure 220. In this case, the exposed area may be smaller than that in the completely folded state. In an embodiment, the hinge cover 265 may include a curved surface.

Hereinafter, the operations of the first housing structure 210 and the second housing structure 220 and respective areas of the flexible display 230 according to the operating states (e.g., the unfolded state and the folded state) of the electronic device 200 will be described.

In an embodiment, when the electronic device 200 is in the unfolded state (e.g., the state of FIG. 2), the first housing structure 210 and the second housing structure 220 may form a first angle (e.g., about 180 degrees) therebetween, and the first area 231a and the second area 231b of the flexible display may be disposed to face substantially the same direction, for example, to display screens in directions parallel to each other. In addition, the folding area 231c may form the same plane as the first area 231a and the second area 231b. As another embodiment, when the electronic device 200 is in the unfolded state, the first housing structure 210 and the second housing structure 220 may form a second angle (e.g., about 360 degrees) therebetween, and the first area 231a and the second area 231b of the flexible display may be disposed to face substantially opposite directions, for example, to display screens in directions opposite to each other. For example, the electronic device 200 may be folded such that the second surface 212 and the fourth surface 222 face each other. In an embodiment, when the electronic device 200 is in the folded state (e.g., the state of FIG. 3), the first housing structure 210 and the second housing structure 220 may be disposed to face each other. For example, when the electronic device 200 is in the folded state (e.g., the state of FIG. 3), the first area 231a and the second area 231b of the flexible display 230 may face each other while forming a narrow angle (e.g., 0 to 10 degrees) therebetween. For example, when the electronic device 200 is in the folded state (e.g., the state of FIG. 3), at least a portion of the folding area 231c may provide a curved surface having a predetermined curvature.

In an embodiment, when the electronic device 200 is in the intermediate state, the first housing structure 210 and the second housing structure 220 may be disposed to form a certain angle (e.g., about 90 degrees) therebetween. For example, in the intermediate state, the first area 231a and the second area 231b of the flexible display 230 may form an angle larger than that in the folded state and smaller than that in the unfolded state. For example, at least a portion of the folding area 231c may be configured as a curved surface having a predetermined curvature, and the curvature in this case may be smaller than that in the folded state.

FIG. 4 is an exploded perspective view of an electronic device 200 according to various embodiments.

Referring to FIG. 4, in an embodiment, the electronic device 200 may include a flexible display 230, a support member assembly 260, at least one printed circuit board 270 (e.g., a printed circuit board (PCB), a flexible FPCB (PCB), or a rigid-flexible PCB (RFPCB), a first housing structure 210, a second housing structure 220, a first rear surface cover 240, and a second rear surface cover 250. Herein, the flexible display 230 (e.g., a first display) may be referred to as a display module or a display assembly.

In an embodiment, the flexible display 230 may include a display panel 231 (e.g., a flexible display panel), and at least one plate 232 or layer on which the display panel 231 is seated. In an embodiment, the at least one plate 232 may include a conductive plate (e.g., Cu sheet or SUS sheet) disposed between the display panel 231 and the support member assembly 260. According to an embodiment, the conductive plate may have substantially the same area as the flexible display, and the area facing the folding area of the flexible display may be configured to be bendable. The plate 232 may include at least one auxiliary material layer (e.g., a graphite member) disposed on the rear surface of the display panel 231. In an embodiment, the plate 232 may have a shape corresponding to that of the display panel 231. For example, a partial area of the first plate 232 may have a shape corresponding to that of a notch area 233 in the display panel 231.

In an embodiment, the support member assembly 260 may include a first support member 261 (e.g., a first support plate), a second support member 262 (e.g., a second support plate), a hinge structure 264 disposed between the first support member 261 and the second support member 262, a hinge cover 265 configured to cover the hinge structure 264 when the hinge structure 264 is viewed from the outside, and at least one wiring member 263 (e.g., a flexible printed circuit board (FPCB)) extending across the first and second support members 261 and 262.

In an embodiment, the support member assembly 260 may be disposed between the plate 232 and the at least one printed circuit board 270. For example, the first support member 261 may be disposed between the first area 231a of the flexible display 230 and a first printed circuit board 271. The second support member 262 may be disposed between the second area 231b of the flexible display 230 and a second printed circuit board 272.

According to an embodiment, the wiring member 263 and the hinge structure 264 may be at least partially disposed inside the support member assembly 260. The wiring member 263 may be disposed in a direction across the first support member 261 and the second support member 262 (e.g., the x-axis direction). The wiring member 263 may be arranged in a direction substantially perpendicular to the folding axis (e.g., the y axis or the folding axis A in FIG. 1) of the folding area 231c (e.g., in the x-axis direction).

In an embodiment, as described above, the at least one printed circuit board 270 may include a first printed circuit board 271 disposed on the first support member 261 side and a second printed circuit board 272 disposed on the second support member 262 side. The first printed circuit board 271 and the second printed circuit board 272 may be disposed in a space defined by the support member assembly 260, the first housing structure 210, the second housing structure 220, the first rear surface cover 240, and the second rear surface cover 250. Components for implementing various functions of the electronic device 200 may be mounted on the first printed circuit board 271 and the second printed circuit board 272.

In an embodiment, in the first space of the first housing structure 210, the first printed circuit board 271 disposed in the space provided through the first support member 261, a first battery 291 disposed at a position facing a first swelling hole 2611 in the first support member 261, at least one sensor module 281, or at least one camera module 282 may be included. In an embodiment, the at least one camera module 282 may include a plurality of camera modules. For example, the electronic device 200 may include a plurality of camera devices (e.g., a dual camera or a triple camera) which have different properties (e.g., angles of view) or functions, respectively. For example, a plurality of camera modules including lenses having different angles of view may be configured. Based on a user's selection, the electronic device 200 may control to use a camera module of an angle of view related to the user's selection. In addition, the plurality of cameras may include at least one of a wide-angle camera, a telephoto camera, a color camera, a monochrome camera, or an infrared (IR) camera (e.g., a time of flight (TOF) camera or a structured light camera). According to an embodiment, the IR camera may be operated as at least a part of the sensor module 281. The first housing structure 210 may include a window glass 283 disposed in order to protect the at least one sensor module 281 and the at least one camera module 282 at a position corresponding to the notch area 233 in the flexible display 230.

In an embodiment, in the second space of the second housing structure 220, the second printed circuit board 272 disposed in the space provided through the second support member 262 and a second battery 292 disposed at a position facing a second swelling hole 2621 in the second support member 262 may be included. According to an embodiment, the first housing structure 210 and the first support member 261 may be configured integrally with each other. According to an embodiment, the second housing structure 220 and the second support member 262 may also be configured integrally with each other. According to an embodiment, in the second space of the second housing structure 220, a sub-display 252 may be disposed. According to an embodiment, the sub-display 252 (e.g., the second display) may be disposed to be visible from the outside through at least one area of the second rear surface cover 250.

In an embodiment, the first housing structure 210 may include a first rotation support surface 214, and the second housing structure 220 may include a second rotation support surface 224, which corresponds to the first rotation support surface 214. The first rotation support surface 214 and the second rotation support surface 224 may include curved surfaces corresponding to the curved surface included in the hinge cover 265.

In an embodiment, when the electronic device 200 is in the unfolded state (e.g., the state of FIG. 2), the first rotation support surface 214 and the second rotation support surface 224 may cover the hinge cover 265 not to expose or to minimally expose the hinge cover 265 to the rear surface of the electronic device 200. In an embodiment, when the electronic device 200 is in the folded state (e.g., the state of FIG. 3), the first rotation support surface 214 and the second rotation support surface 224 may rotate along the curved surface included in the hinge cover 265 to expose the hinge cover 265 to the rear surface of the electronic device 200 as much as possible.

Figure 5A:
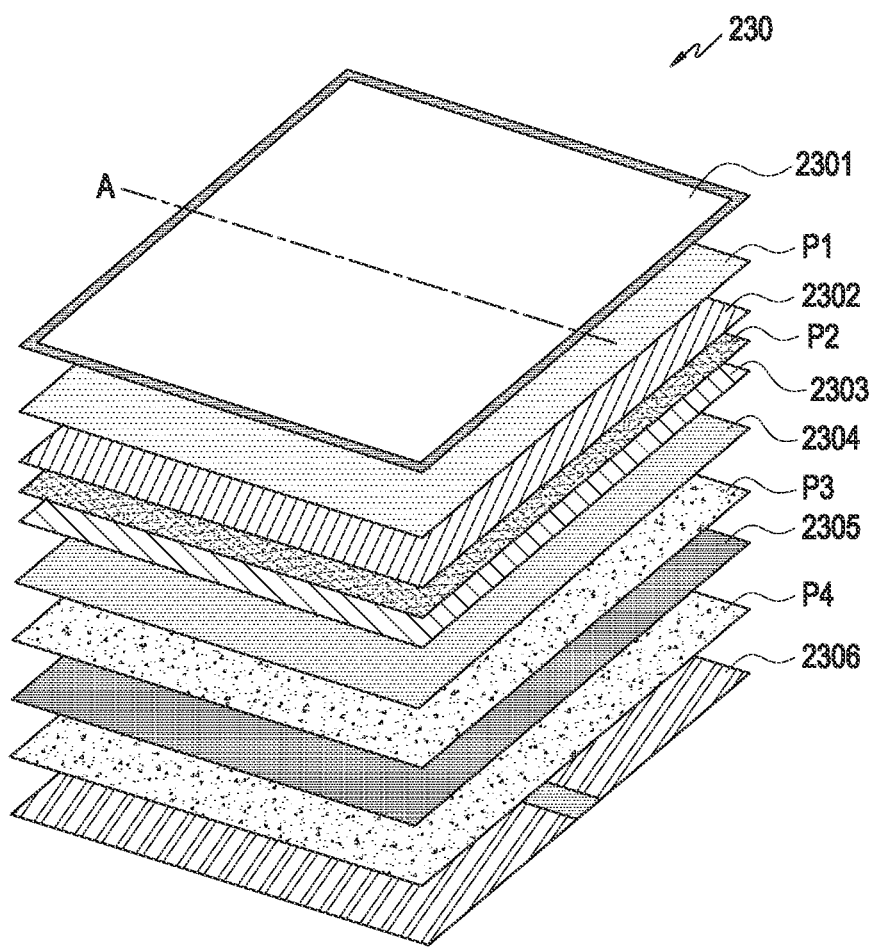
FIG. 5A is an exploded perspective view illustrating a laminated structure of a flexible display of an electronic device according to various embodiments of the disclosure.
Figure 5B:
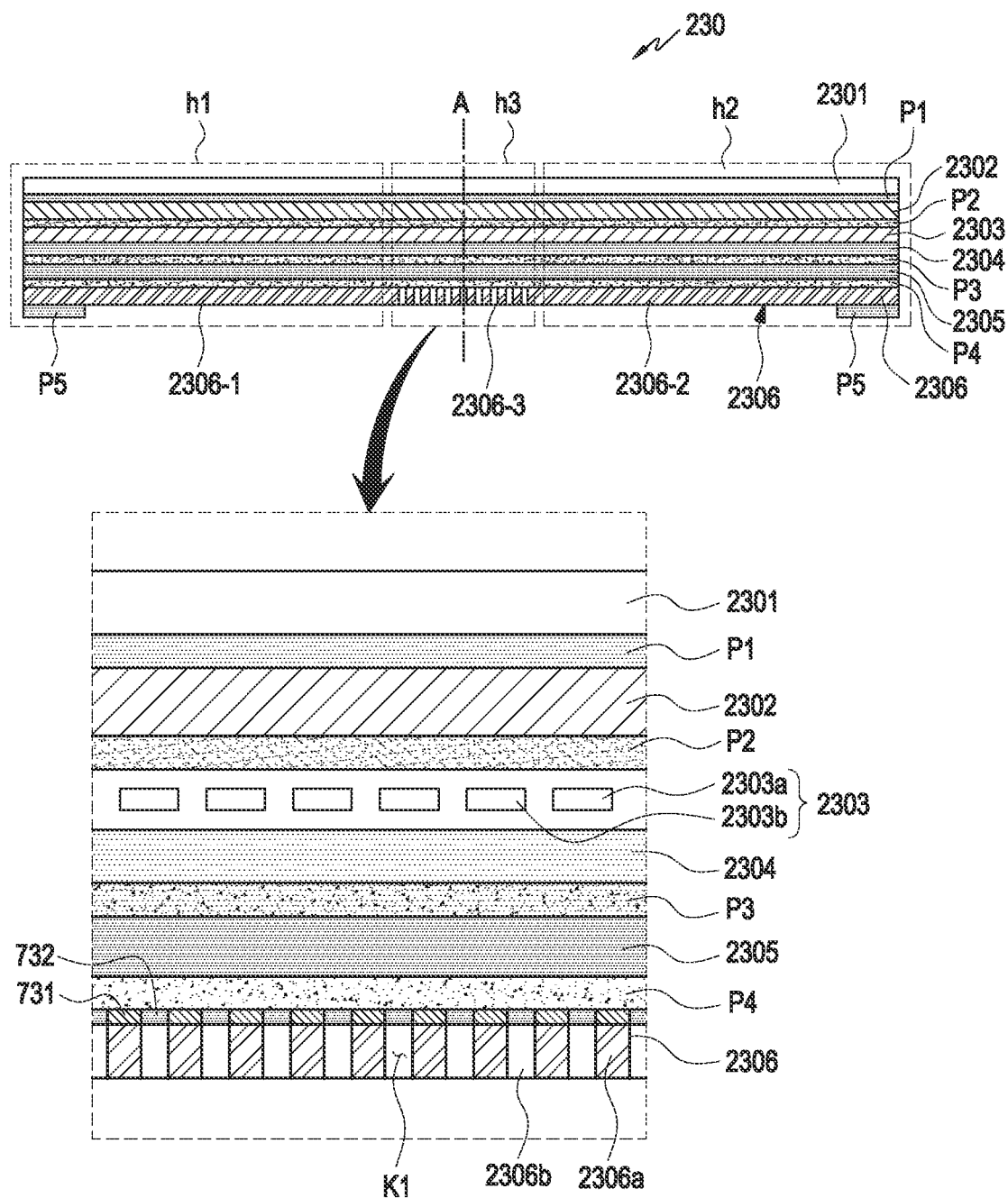
FIG. 5B is a cross-sectional view illustrating the laminated structure of the flexible display of the electronic device according to various embodiments.

FIG. 5A is an exploded perspective view illustrating the laminated structure of the flexible display 230 of an electronic device according to various embodiments of the disclosure. FIG. 5B is a cross-sectional view illustrating the laminated structure of the flexible display 230 of the electronic device according to various embodiments of the disclosure.

Referring to FIGS. 5A and 5B, the flexible display 230 may include a window 2301 (e.g., a polyimide (PI) film, a polyethylene terephthalate (PET), or an ultra-thin glass (UTG)), a polarizer 2302 (e.g., a polarizing film), and a touch panel 2303, a display panel 2304, a polymer member 2305, and a conductive plate 2306 which are sequentially disposed on the rear surface (e.g., the back surface) of the window 2301. According to an embodiment, the window 2301, the polarizer 2302, the touch panel 2303, the display panel 2304, the polymer member 2305, and the conductive plate 2306 may be arranged across at least a portion of a first surface (e.g., the first surface 211 in FIG. 1) of a first housing structure (e.g., the first housing structure 210 in FIG. 1) and at least a portion of a third surface (e.g., the third surface 221 in FIG. 1) of a second housing structure (e.g., the second housing structure 220 in FIG. 1). According to an embodiment, as at least a portion of a folding area h3 facing a hinge structure (e.g., the hinge structure 264 in FIG. 3) is folded or unfolded, the relative positions of a first area h1, which is a flat area corresponding to the first housing structure 210 of the electronic device (e.g., the electronic device 200 in FIG. 1), and a second area, h2, which is a flat area corresponding to the second housing structure 220 of the electronic device (e.g., the electronic device 200 in FIG. 1), may be changed. In an embodiment, a plurality of windows 2301 may be disposed. For example, a layer (e.g., the top surface) of one of the plurality of windows 2301 may be disposed via an adhesive having a weaker adhesive force or a thinner thickness than the adhesive material of another layer so as to be well-separated from the other layer. In an embodiment, the window 2301 may further include various coating layers provided on at least a portion of at least one of the top surface, the bottom surface, and/or the side surface thereof.

According to an embodiment, the window 2301, the polarizer 2302, the touch panel 2303, the display panel 2304, the polymer member 2305, and the conductive plate 2306 may be attached to each other are via adhesive members 2321, 2322, 2323, and 2324. For example, each of the adhesive members 2321, 2322, 2323, and 2324 may include at least one of an optical clear adhesive (OCA), a pressure-sensitive adhesive (PSA), a heat-responsive adhesive, a light-responsive adhesive, a general adhesive, and a double-sided tape. According to an embodiment, the flexible display 230 may include another adhesive member 2325 (e.g., a double-sided tape or a waterproof member) disposed along the peripheral edges thereof on one surface (e.g., the rear surface or the back surface) of the conductive plate 2306. According to an embodiment, the flexible display 230 may be attached to a support member assembly (e.g., the support member assembly 260 in FIG. 4) of an electronic device (e.g., the electronic device 200 in FIG. 4) via the other adhesive member 2325.

According to an embodiment, the polarizer (or a polarizing layer) 2302 (e.g., a polarizing film) may include a phase retardation layer (or a phase retarder). The polarizer and the phase retarder may improve outdoor visibility of a screen. According to an embodiment, the polarizer 2302 may allow light generated from a light source of the display panel 2304 and vibrating in a predetermined direction to selectively pass therethrough. According to various embodiments, a single layer obtained by combining a polarizer 2302 and a phase retarder may be provided, and such a layer may be defined as a "circular polarizer". According to an embodiment, an adhesive member 2321 (e.g., an optically transparent adhesive member) may be located between the window 2301 and the polarizer 2302, and may include, for example, OCA, optical clear resin (OCR), or super view resin (SVR).

According to an embodiment, the flexible display 230 may not include the polarizer 2302 (e.g., a circular polarizing plate (retarder)), and may include a color filter layer by a color filter on encapsulation (COE) method. For example, when the flexible display 230 does not include the polarizer 2302, transmittance may be increased and thickness may be reduced. According to an embodiment, the color filter layer may perform a function that is the same as or similar to that of the polarizer 2302 applied to a flexible display including organic light-emitting diodes (OLEDs).

According to an embodiment, the touch panel 2303 may include resistors (e.g., the first resistor 731-1 and the second resistor 732-2 in FIG. 9A) included in a pressure sensor (e.g., the pressure sensor 712 in FIG. 7A) to be described later. Respective resistors (e.g., the first resistor 731-1 or the second resistor 732-2) may be arranged in areas corresponding to support areas 2306a or spatial areas 2306b at different ratios.

According to an embodiment, the display panel 2304 may include organic light-emitting diodes (OLEDs). For example, the display panel may include an unbreakable (UB) type OLED display (e.g., a curved display).

According to various embodiments, the polymer member 2305 may be applied with a dark color (e.g., black) to help display a background when the flexible display is turned off. According to an embodiment, the polymer member 2305 may act as a cushion for preventing the flexible display 230 from being damaged by absorbing an impact from the exterior of the electronic device.

According to an embodiment, the conductive plate 2306 may be in the form of a metal sheet, wherein the conductive plate 2306 may be helpful in reinforcing the rigidity of the electronic device, and may be used to block ambient noise and dissipate heat emitted from surrounding heat emission components. According to an embodiment, the conductive plate 2306 may include at least one of Cu, Al, steel use stainless (SUS) (e.g., stainless steel (STS)), or a CLAD (e.g., a stacked member in which SUS and Al are alternately disposed). In another embodiment, the conductive plate 2306 may include other alloy materials. In another embodiment, at least a portion of the conductive plate 2306 may be implemented with an insulating material that does not conduct electricity. For example, a portion in which resistors (e.g., the first resistor 731 and the second resistor 732) of the conductive plate 2306 are arranged is implemented with an insulating material, and the remaining portion of the conductive plate 2306 may be implemented with any of the above-described other alloy materials. According to an embodiment, the conductive plate 2306 may be attached to the polymer member 2305 via the adhesive member 2324. For example, the adhesive member 2324 may include a plurality of adhesive members 2324 to provide a state change (e.g., an unfolded state, a folded state, or an intermediate state) of the conductive plate 2306. For example, the adhesive members 2324 may include an adhesive member corresponding to the first area 231a of the flexible display 230 and an adhesive member corresponding to the second area 231b of the flexible display 230. Respective adhesive members 2324 may be disposed to have an interval greater than the interval between the first flat portion 2306-1 and the second flat portion 2306-2 of the conductive plate 2306. Through this, when the state of the conductive plate 2306 changes (e.g., in the folded state), mutual interference between the plurality of adhesive members 2324 and/or invasion into the folding area h3 may be prevented.

According to various embodiments, the above-described conductive plate 2306 may include support areas 2306a and spatial areas 2306b. The spatial area 2306b may be defined as areas of the conductive plate 2306 in which openings K1 are provided, and the support areas 2306a may be defined as areas of the conductive plate 2306 other than the spatial areas 2306b. Resistors (the first resistor 731 and the second resistor 732) included in a pressure sensor 712 to be described later may be arranged on the conductive plate 2306. Respective resistors (the first resistor 731 and the second resistor 732) may be disposed on the openings K1 in different ratios, which will be described later.

According to various embodiments, the flexible display 230 may include at least one functional member disposed between the polymer member 2305 and the conductive plate 2306. According to an embodiment, the functional member may include a graphite sheet for heat dissipation, a force touch FPCB, a fingerprint sensor FPCB, an antenna radiator for communication, a heat dissipation sheet, a conductive/non-conductive tape, or an open cell sponge. According to an embodiment, when the functional member is bendable, the functional member may be arranged from the first housing structure (e.g., the first housing structure 210 in FIG. 3) to at least a portion of the second housing structure (e.g., the second housing structure 220 in FIG. 3) via the hinge structure (e.g., the hinge structure 264 in FIG. 3). As another embodiment, the flexible display 230 may further include a detection member configured to detect an input made by an electromagnetic induction type writing member (e.g., an electronic pen). According to an embodiment, the detection member may include a digitizer. For example, the detection member may include a coil member disposed on a dielectric substrate to detect a resonance frequency of an electromagnetic induction scheme applied from the writing member.

In an embodiment, in the flexible display 230, by removing (patterning) the laminated structures (e.g., the polymer member 2305, or the conductive plate 2306) disposed under the display panel 2304 in a portion overlapping the sensor module (e.g., the sensor module 281 in FIG. 4) and/or the camera module (e.g., the camera module 282 in FIG. 4) when viewed from the front surface (e.g., in the z-axis direction in FIG. 4), it is possible to increase the transmittance of the corresponding area.

Figure 6:
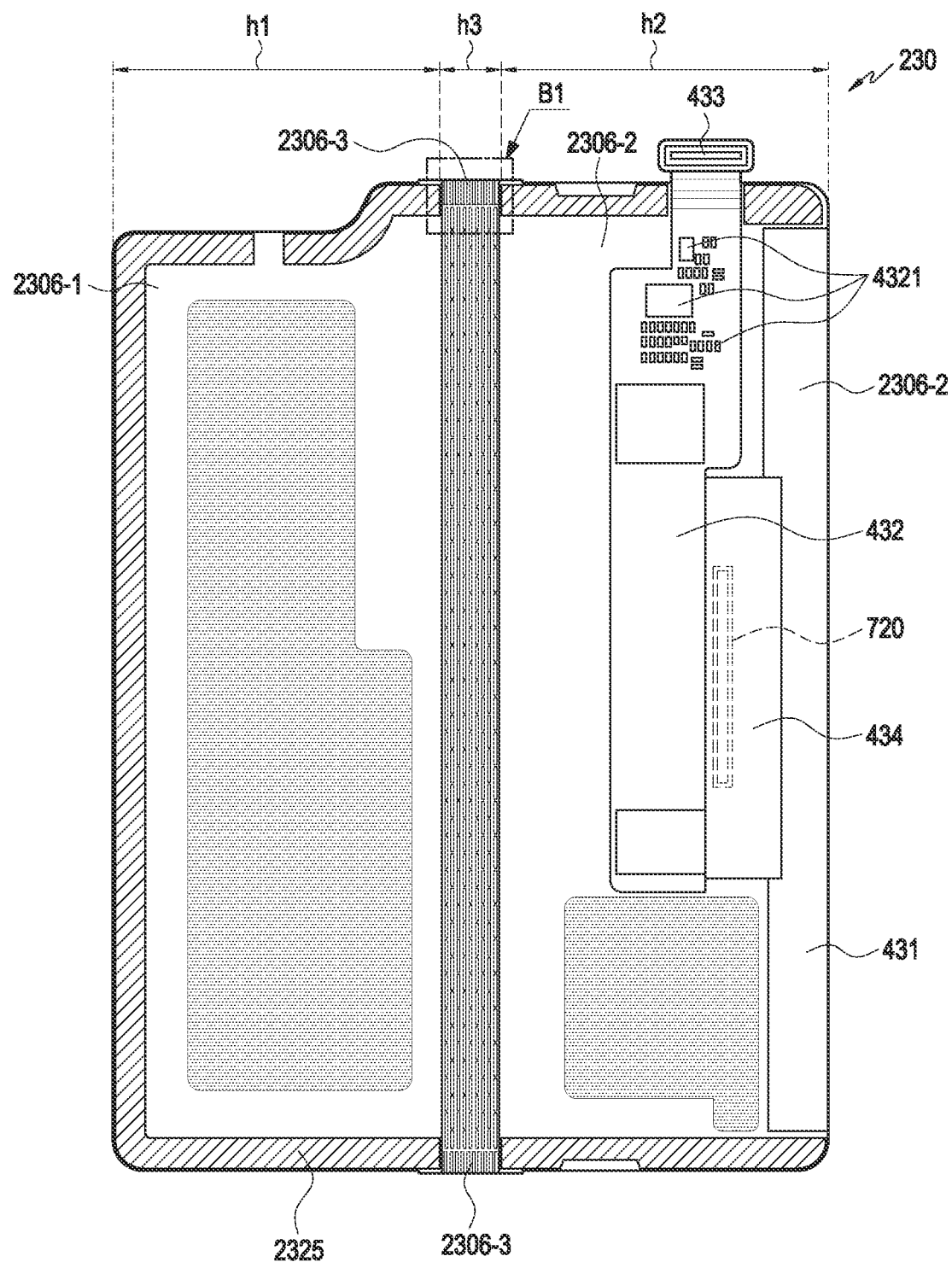
FIG. 6 is a configuration view illustrating a conductive plate among the components of a flexible display of an electronic device according to various embodiments.

FIG. 6 is a configuration view of a conductive plate in the configuration of the flexible display 230 of an electronic device (e.g., the electronic device 200 in FIG. 4) according to various embodiments of the disclosure. For example, FIG. 6 is a configuration view illustrating the flexible display 230 and the conductive plate when the rear surface (e.g., the back surface) of the flexible display 230 is viewed.

Referring to FIG. 6, the conductive plate 2306 may include a first flat portion 2306-1 facing the first area h1 of the flexible display 230, a second flat portion 2306-2 facing the second area h2 of the flexible display 230, and a bendable portion 2306-3 facing the folding area h3 of the flexible display 230.

According to various embodiments, the bendable portion 2306-3 included in the conductive plate 2306 is bendable together with the folding area h3 of the flexible display 230. According to an embodiment, the bendable portion 2306-3 may allow the rear surface of the display panel (e.g., the display panel 2304 in FIG. 5B) to be supported while being bent together with the folding area h3 of the flexible display 230.

According to various embodiments, openings (e.g., the openings K1 in FIG. 5B) may be provided in a partial area of the conductive plate 2306. For example, the openings K1 may be provided in at least a portion of the bendable portion 2306-3.

According to various embodiments, the flexible display 230 may include an extension 431 disposed in a manner of being folded from the display panel 2304 to at least a partial area of the rear surface of the flexible display 230. According to an embodiment, the flexible display 230 may include a connection pad 434 electrically connected to the extension 431 and having an electrical wiring structure including a control circuit 720 to be described later and a flexible printed circuit board (FPCB) 432 electrically connected to the connection pad 434. According to an embodiment, the control circuit 720 may include a display driver IC (DDI), a touch display driver IC (TDDI), a pressure sensor panel IC, or a touch sensor panel IC mounted on the connection pad 434 having the electrical wiring structure. According to an embodiment, the connection pad 434 may include a separate FPCB or film including the control circuit 720 disposed through a chip on film (COF) method. According to an embodiment, the control circuit 720 may be connected through anisotropic conductive film bonding of the FPCB or the film in the COF method. According to various embodiments, the control circuit 720 may be disposed on the film through tape automated bonding (TAB) in the COF method. As another embodiment, the control circuit 720 may have a chip on panel (COP) structure directly mounted on the extension 431 without the connection pad 434.

According to an embodiment, a plurality of elements 4321 may be mounted on the FPCB 432, and the FPCB may include an electrical connector 433 electrically connected to a second printed circuit board (e.g., the second printed circuit board 272 in FIG. 4) of an electronic device (e.g., the electronic device 200 in FIG. 4). According to an embodiment, the plurality of elements 4321 may include a passive element such as a touch sensor panel IC, a pressure sensor panel IC, a flash memory for a display, a diode for preventing electrostatic discharge (ESD), or a decap. As another embodiment, when the extension 431, the connection pad 434, and the FPCB 432 are disposed in an area of the flexible display 230 facing the first housing structure (e.g., the first housing structure 210 in FIG. 2), the electrical connector 433 may be electrically connected to a first printed circuit board (e.g., the first printed circuit board 271 in FIG. 4) of an electronic device (e.g., the electronic device 200 in FIG. 4).

Hereinafter, an example of components included in an electronic device (e.g., the electronic device 101 in FIG. 1 or the electronic device 200 in FIG. 4) according to various embodiments will be described.

Figure 7A:
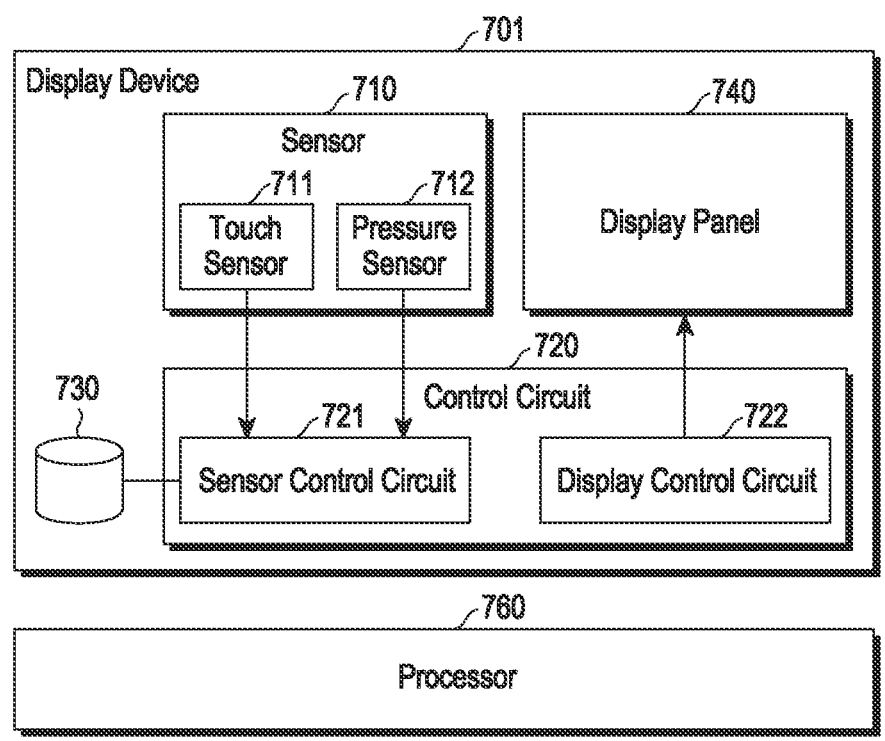
FIG. 7A is a view for describing an example of a configuration of an electronic device according to various embodiments.

FIG. 7A is a view for describing an example of a configuration of an electronic device (e.g., the electronic device 101 in FIG. 1 or the electronic device 200 of FIG. 4) according to various embodiments. The electronic device (e.g., the electronic device 101 in FIG. 1 or the electronic device 200 in FIG. 4) is not limited to that illustrated in FIG. 7A, and may include one or more components which may be more or less than those illustrated in FIG. 7A.

According to various embodiments, as illustrated in FIG. 7A, the electronic device (e.g., the electronic device 101 in FIG. 1 or the electronic device 200 of FIG. 4) may include a display device 701 (e.g., the display module 160 in FIG. 1) including sensors 710 including a touch sensor 711 and a pressure sensor 712, a control circuit 720 including a sensor control circuit 721 and a display control circuit 722, a memory 730 (e.g., the memory 130 in FIG. 1) and a display panel 740, and a processor 760 (e.g., the processor 120 in FIG. 1).

According to various embodiments, the sensor control circuit 721 may identify values associated with an input (e.g., a user's touch, collision with an object, or the like) made by an external object and received on the flexible display by using the sensors 710. For example, the sensor control circuit 721 may identify values associated with characteristics associated with a touch associated with an input made by an external object (e.g., a user's touch) (e.g., at least one of a touch position (coordinates), a touch area, touch sensitivity, a moving distance, or a duration time), and values associated with characteristics associated with pressure (e.g., pressure sensitivity). In addition, the sensor control circuit 721 may include components that are configured detect characteristics associated with a touch and characteristics associated with pressure, respectively. For example, the sensor control circuit 721 may include a touch sensor panel IC (TSP IC) configured to identify values related with characteristics associated with a touch and a pressure sensor panel IC configured to identify values associated with characteristics associated with pressure (e.g., pressure sensitivity).

According to various embodiments, the sensor control circuit 721 may identify values associated with an input (e.g., a user's touch, collision with an object, or the like) made by an external object and received on the flexible display by using the touch sensor 711. The sensor control circuit 721 may drive (e.g., apply power to) the touch sensor 711, and may identify an electrical value (e.g., at least one of a voltage value or a current value) generated from the touch sensor 711 by an input received based on applied power or a change in the electrical value. In other words, the touch sensor 711 may output an electrical value in response to the received input. The sensor control circuit 721 may identify at least one value associated with a touch (e.g., a value indicating the touch sensitivity, a value indicating the touch area, or values indicating touched coordinates) corresponding to the identified electrical value from the touch sensor 711 or a change in the electrical value and stored in advance in the electronic device 101. The touch sensor 711 may include a touch sensor such as a contact-type capacitance-type touch sensor, a pressure-type resistive film-type touch sensor, an infrared sensing-type touch sensor, a surface ultrasonic conduction-type touch sensor, or a piezo-effect-type touch sensor.

According to various embodiments, the sensor control circuit 721 may identify values associated with the pressure of an input (e.g., a user's touch, collision with an object, or the like) made by an external object and received on the flexible display by using the pressure sensor 712. The sensor control circuit 721 may drive (e.g., apply power to) the pressure sensor 712, and may identify an electrical value (e.g., at least one of a voltage value or a current value) generated from the pressure sensor 712 based on the applied power or a change in the electrical value. In other words, the pressure sensor 712 may output an electrical value in response to the received input. The sensor control circuit 721 may identify at least one value (e.g., a value indicating pressure sensitivity) associated with the pressure of the input stored in advance in the electronic device 101 and corresponding to the electrical value identified from the pressure sensor 712 or a change in the electrical value. The pressure sensor 712 may include a piezoresistive pressure sensor. An operation of the electronic device (e.g., the electronic device 101 in FIG. 1 or the electronic device 200 of FIG. 4) using the pressure sensor 712 will be described in detail later.

According to various embodiments, the sensor control circuit 721 may adjust at least one value associated with an electrical value identified from sensing circuits (e.g., the touch sensor 711 or the pressure sensor 712) or a pressure corresponding to the electrical value. For example, the sensor control circuit 721 may correct at least one value related to pressure by using correction values to identify at least one value associated with the corrected pressure. The correction values may include a gain value and an offset value, which will be described later. An expression for calculating at least one value associated with the corrected pressure of the sensor control circuit 721 (e.g., at least one value associated with corrected pressure=f(at least one value associated with corrected pressure and correction value) may be implemented as any linear or non-linear function. As an example, the sensor control circuit 721 may correct (adjust) at least one value associated with an input identified as gain value*(at least one value associated with identified input±offset value) and identify at least one value associated with a corrected (or adjusted) pressure (for example, at least one value associated with corrected pressure=gain value*(at least one value associated with identified input±offset value)). Meanwhile, an operation for correcting at least one value associated with the pressure of the sensor control circuit 721 is an example, and the sensor control circuit 721 may reflect a gain value and an offset value on at least one input value without being limited to the above description. For example, the sensor control circuit may use a gain value as a value for increasing the at least one value associated with the pressure and may reflect a gain value and an offset value on the at least one value with various calculation expressions using the offset value as a value for reducing the at least one value associated with the pressure. When a value identified from sensing circuits by the sensor control circuit 721 is adjusted by the gain value and/or the offset value, the identification of a value associated with pressure of an electronic device (e.g., the electronic device 101 in FIG. 1 or the electronic device 200 in FIG. 4) may be facilitated.

In addition, the sensor control circuit 721 may identify an event corresponding to a received input by using the adjusted value and a threshold value and may information related to the identified event to a processor 760 (e.g., the processor 120 in FIG. 1) so that the electronic device 101 is able to perform at least one operation corresponding to the event.

According to various embodiments, the memory 730 may store correction values (e.g., gain values and offset values to be described later) for adjusting a value associated with the pressure and information about events (e.g., threshold values configured for respective events). Although the memory 730 is illustrated as being included in the sensor control circuit 721, the memory 730 may be included in an electronic device (e.g., the electronic device 101 in FIG. 1 or the electronic device 200 in FIG. 4) separate from the sensor control circuit 721 without being limited to the illustration.

According to various embodiments, the display control circuit 722 may control the display panel 740 so that a graphic user interface (GUI) is displayed. The display control circuit 722 may be a display driver IC (DDI). According to various embodiments, the display device 701 may be a display driver IC (DDI) package. For example, the display driver IC (DDI) package may include a display driver IC (DDI) (or a DDI chip), a timing controller (T-CON), a graphics RAM (GRAM), or a power driver (power generating circuit).

According to various embodiments, the processor 760 (e.g., the processor 120 in FIG. 1) may generally controls components of an electronic device (e.g., the electronic device 101 in FIG. 1 or the electronic device 200 in FIG. 4). For example, the processor 760 (e.g., the processor 120 in FIG. 1) may control the components included in the electronic device (e.g., the electronic device 101 in FIG. 1 or the electronic device 200 in FIG. 4) to perform at least one operation corresponding to received information based on information about values associated with an input received from the sensor control circuit 721 or information about an event corresponding to the input.

Meanwhile, the operations of the above-described components may be configured to be executed in the processor 760 (e.g., the processor 120 in FIG. 1). For example, the sensor control circuit 721 may transmit an electrical value detected from sensing circuits or a value associated with an input characteristic to the processor 760 (e.g., the processor 120 in FIG. 1), and the processor 760 (e.g., the processor 120 in FIG. 1) may perform operations of compensating for a value associated with the electrical value and/or the value associated with the input characteristic of the above-described sensor control circuit 721 and comparing the value with a threshold value.

Figure 7B:
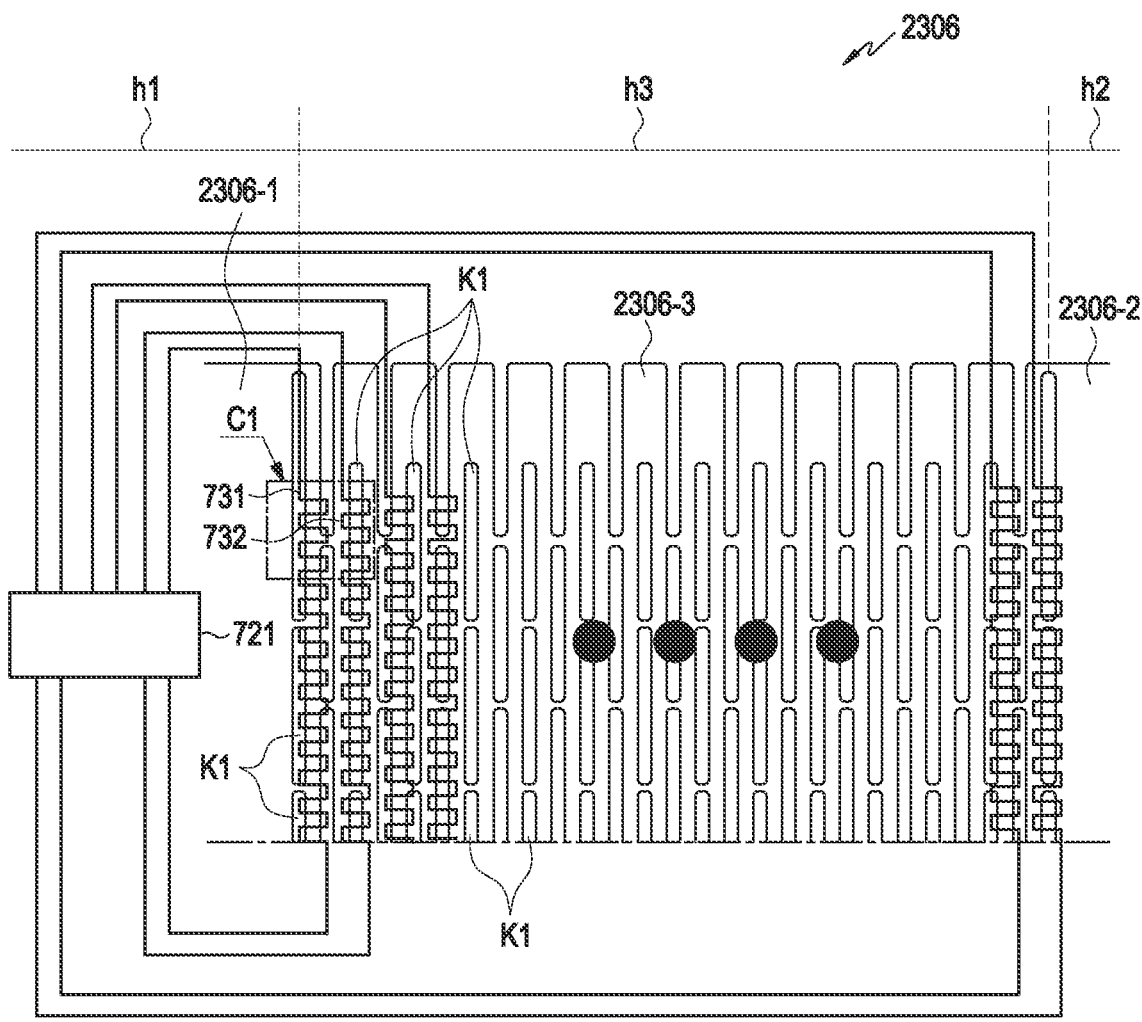
FIG. 7B is an enlarged view of the area B1 of FIG. 6 according to various embodiments.

FIG. 7B is a view illustrating a conductive plate 2306 is illustrated among the components of a flexible display (e.g., the flexible display 230 in FIG. 6) of an electronic device (e.g., the electronic device 200 in FIG. 4) including resistors 731 and 732 included in a pressure sensor according to various embodiments of the disclosure, wherein FIG. 7B is a view obtained by enlarging the area B1 of FIG. 6.

Referring to FIGS. 5B and 7B together, the conductive plate 2306 may be disposed on the rear surface of a polymer member of the flexible display 230 and may support the flexible display 230 so that the flexible display 230 can be folded or unfolded. For example, a plurality of openings K1 spaced apart from each other may be provided in the bendable portion (e.g., the bendable portion 2306-3 in FIG. 6) of the conductive plate 2306. According to an embodiment, the plurality of openings K1 may be provided in a metal plate (e.g., an SUS plate or a Cu plate) through a press process or a laser process. According to an embodiment, the plurality of openings K1 may be provided along a first direction of the bendable portion 2306-3 (e.g., a longitudinal direction) (e.g., the y-axis direction) and a second direction perpendicular to the first direction (e.g., a width direction) (e.g., the x-axis direction). According to an embodiment, the plurality of openings K1 may have various shapes. For example, the plurality of openings K1 may include at least one of an elongated bar-type shape, a circular shape, a square shape, a rectangular shape, a rhombus shape, or an oval shape. In this embodiment, shapes other than the above-mentioned shapes may be applied to the plurality of openings K1.

According to an embodiment, the plurality of openings K1 may be alternately arranged in a manner of being coincident with each other along the second direction of the bendable portion 2306-3 (e.g., the x-axis direction). According to an embodiment, the plurality of openings K1 may be arranged at regular or non-regular intervals along the first direction (e.g., the y-axis direction) and/or the second direction (e.g., the x-axis direction). According to an embodiment, the bendable portion 2306-3 may be deformable based on lattice structure punched with a plurality of openings K1 and after being deformed, the bendable portion 2306-3 may have an elastic force to be restored to its original shape. By the elastic force, the bendable portion 2306-3 may be bent together with the folding area h3 of the flexible display.

According to various embodiments, the degree to which the bendable portion 2306-3 is bent may be determined based on the intervals, shape, or arrangement density of the plurality openings K1. In other words, the elasticity of the bendable portion 2306-3 may be determined based on the intervals, shape, or arrangement density of the plurality openings K1. For example, the elasticity of the bendable portion 2306-3 may increase as the intervals between the plurality of openings K1 increase or the arrangement density of the plurality of openings K1 decreases. That is, when there are many openings K1, elasticity of the bendable portion 2306-3 may be lowered, and flexibility of the bendable portion 2306-3 may be increased.

The electronic device 200 according to various embodiments may include a touch panel including a plurality of touch sensors 2303a and 2303b and a control circuit (e.g., the control circuit 720 in FIG. 6). In various embodiments, the control circuit 720 may be implemented in a touch sensor driving circuit, but this is merely exemplary. At least some functions of the control circuit 720 may be implemented by a processor (e.g., the processor 120 in FIG. 1) of an electronic device (e.g., the electronic device 101 in FIG. 1). The plurality of touch sensors 2303a and 2303b may each include one or more first and second electrodes. The first electrodes 2303a may extend in a vertical direction, and the second electrodes 2303b may extend in a horizontal direction. The first and second electrodes 2303a and 2303b may be implemented, for example, in a mesh shape, and the number of the first and second electrodes 2303a and 2303b is not limited. According to an embodiment, the plurality of touch sensors 2303a and 2303b may be implemented as a transparent conductive layer (or film) based on various conductive materials such as an indium tin oxide (ITO).

In various embodiments, the plurality of touch sensors 2303a and 2303b may be implemented in a single layer or a plurality of layers. When the plurality of touch sensors 2303a and 2303b is implemented in a single layer, first and second electrodes 2303a and 2303b may be disposed on a substrate. In a portion in which at least one of the first electrodes 2303a and at least one of the second electrodes 2303b overlap, an insulating material may be located between the electrodes, and the first and second electrodes 2303a and 2303b may be connected via bridges, respectively. The plurality of touch sensors 2303a and 2303b may be implemented separately from the display panel (e.g., the display panel 2304 in FIG. 5B) or may be implemented integrally with the display panel 2304. For example, the plurality of touch sensors 2303a and 2303b may be implemented as on-cell touch active matrix organic light-emitting diodes (AMOLEDs) (OCTAs), and in this case, the plurality of touch sensors 2303a and 2303b may be deposited directly on an AMOLED display. In another example, the plurality of touch sensors 2303a and 2303b may be implemented as Youm-on-cell touch active matrix organic light-emitting diodes (AMOLEDs) (Y-OCTAs), and in this case, the plurality of touch sensors 2303a and 2303b may be deposited directly on a flexible AMOLED display. According to an embodiment, the touch sensors 2303a and 2303b may be disposed between a window (e.g., the window 2301 in FIG. 5B) and a polarizer (e.g., the polarizer 2302 in FIG. 5B) (e.g., an add-on type). According to another embodiment, the touch sensors 2303a and 2303b may be disposed between a polarizer (e.g., the polarizer 2302 in FIG. 5B) and a display panel (e.g., the display panel 2304 in FIG. 5B) (e.g., an on-cell type). According to another embodiment, the display panel (e.g., the display panel 2304 in FIG. 5B) may include touch sensors 2303a and 2303b or a touch detection function (e.g., an in-cell type). According to an embodiment, in the electronic device 200, the arrangement (e.g., a shape or positions) of the resistors (e.g., the first resistor 731-1 and the second resistor 731-2) included in a pressure sensor (e.g., the pressure sensor 712 in FIG. 7A) may be at least partially similar to the arrangement of the touch sensors 2303a and 2303b.

In an embodiment, a mutual capacitance may be formed between the first and second electrodes of the plurality of touch sensors 2303a and 2303b. When a user's finger is brought into contact with the vicinity of the first and second electrodes, capacitances may be formed between the user's finger and the first and second electrodes 2303a and 2303b. Accordingly, capacitance values formed between the first and second electrodes and other electrodes may be changed respectively. The control circuit 720 (e.g., the sensor control circuit 721 in FIG. 7A) may determine the position of a finger based on the difference in capacitance values.

According to an embodiment, among the plurality of resistor sensors included in a pressure sensor for detecting an input of an external object facing the front surface of the window (e.g., the window 2301 in FIG. 5B), the first resistor 731 and the second resistor 732 may be disposed in the plurality of openings K1.

According to an embodiment, the ratio of the portion of the first resistor 731 disposed on at least some of the plurality of openings K1 may be different from the ratio of the portion of the second resistor 732 disposed on at least some of the plurality of openings K1. For example, the ratio of the portion of the first resistor 731 disposed on at least some of the plurality of openings K1 may be smaller than the ratio of the portion of the second resistor 732 disposed on at least some of the plurality of openings K1. Accordingly, when a user input is received on an area (e.g., the bendable portion 2306-3) in which the first resistor 731 and the second resistor 732 are disposed, the second resistor 732 may be more deformed than the first resistor 731 based on the received user input.

According to an embodiment, the first resistor 731 may be disposed between the plurality of openings K1, for example, in the remaining area in which the openings K1 are not provided. For example, the first resistor 731 may be disposed on a support area 2306a between the plurality of openings K1. The second resistor 732 may be disposed on the plurality of openings K1.

According to an embodiment, when an external object touches the front surface of the window 2301 to make an input, the shape of the first resistor 731 and/or the second resistor 732 may be changed. The change amount of the portions of the first resistor 731 and/or the second resistor 732 that are disposed on the openings K1 may be different from the change amount of the portions of the first resistor 731 and the second resistor 732 that are not disposed on the openings K1. Since the portions disposed on the openings K1 are deformed into the plurality of openings K1 (e.g., bent simultaneously with being pressed), the change amount of the portions disposed on the openings K1 may be larger than the change amount of the portions which are not disposed on the openings K1. In other words, by a user input, the portions disposed on the openings K1 may be deformed to have a relatively smaller cross-sectional area and to be extended in length, compared to the portions not disposed on the openings K1. Accordingly, when the ratios of the portions of the resistors 731 and 732 disposed on the openings K1 are different from each other, the change amounts of the resistors 731 and 732 in shape are different from each other, and accordingly, the resistance change amounts may also be different from each other.

At this time, the control circuit 720 (e.g., the sensor control circuit 721 in FIG. 7A) may detect the pressure of a user input received on the folding area 2306-3 based on the difference in change amount between the first resistor and the second resistor. This will be described later with reference to FIGS. 16 and 17.

According to various embodiments, the first resistor 731 may be configured in a first pattern, and the second resistor 732 may be configured in a second pattern. For example, the first resistor and the second resistor may be configured in a zigzag pattern shape. In this embodiment, the first resistor and the second resistor may be configured in a pattern having a shape other than the zigzag pattern shape.

Figure 7C:
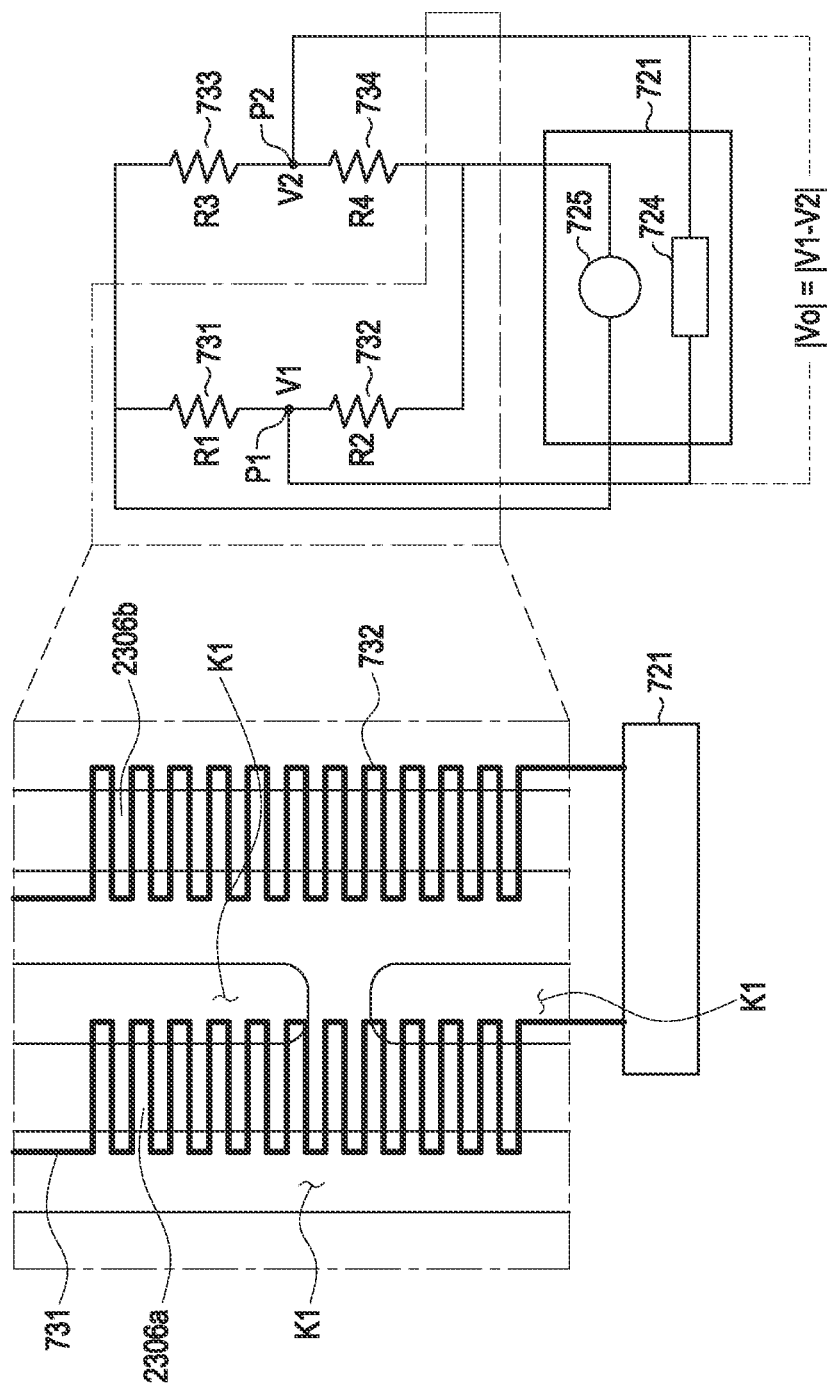
FIG. 7C is an enlarged view of the area C1 of FIG. 7B according to various embodiments, and is a view for describing resistors included in a pressure sensor and an operation of a sensor control circuit using the resistors.

FIG. 7C is an enlarged view of the area C1 of FIG. 7B according to various embodiments, and is a view for describing the resistors included in the pressure sensor 712 and the operation of the sensor control circuit 721 using the resistors.

According to various embodiments, the pressure sensor 712 may include a plurality of resistors. For example, as illustrated in FIG. 7C, the pressure sensor 712 may include a first resistor 731, a second resistor 732, a third resistor 733, and a fourth resistor 734, and the resistors may be connected to each other in the form of a Wheatstone bridge. At this time, the resistors included in the pressure sensor 712 may be implemented to satisfy a relationship as follows: the resistance values of the resistors are substantially the same (R1=R2=R3=R4), or the resistance values that are diagonal to each other on the Wheatstone bridge circuit are the same (R1=R2 and R3=R4). In addition, the relationship of|resistance value R1 of first resistor 731×resistance value R3 of third resistor 733|=|resistance value R2 of second resistor 732×resistance value R4 of fourth resistor 734|may be satisfied. For example, when the resistance value R1 of the first resistor and the resistance value R2 of the second resistor are determined, it is possible to determine the resistance value R3 of the third resistor and the resistance value R4 of the fourth resistor to satisfy the above-mentioned relationships. Some of the resistors included in pressure sensor 712 may be disposed on a conductive plate 2306 to identify a user input. For example, referring to FIG. 7C, among the plurality of resistors included in the pressure sensor 712, the first resistor 731 and the second resistor 732 may be disposed on the conductive plate 2306, and the remaining third resistor 733 and the fourth resistor 734 may be disposed at positions where the resistance values thereof are not changed by a user input (e.g., inside the sensor control circuit 721 or on a flexible circuit board). When the first resistor 731 and the second resistor 732 are disposed on the bendable portion 2306-3 including a support area 2306a and a spatial area 2306b, the first resistor 731 may be disposed on the openings K1 at a first proportion, and the second resistor 732 may be disposed on the openings K1 at a second proportion greater than the first proportion. According to an embodiment, the pressure sensor 712 may include a piezoresistive strain gauge pressure sensor. For example, a strain gauge configured to recognize strain due to a pressure may be used, and may be connected to a Wheatstone bridge.

According to an embodiment, the second resistor 732 may be disposed on the bendable portion 2306-3 to be relatively more deformed compared to the first resistor 731 by a user input. In contrast, the first resistor 731 may be disposed on the bendable portion 2306-3 to be relatively less deformed compared to the second resistor 732 by a user input. As an example, the first resistor 731 may be disposed on the bendable portion 2306-3 such that the first proportion of the first resistor 731 disposed on the plurality of openings K1 becomes a predetermined value (e.g., 0). However, the disclosure is not limited thereto, and a plurality of resistors included in the pressure sensor 712 may be disposed on the conductive plate. For example, the first resistor 731 and the third resistor 733 may be disposed on the openings K1 at the first portion, and the second resistor 732 and the fourth resistor 734 may be disposed on the openings K1 at the second proportion greater than the first proportion. Hereinafter, an example will be described assuming that the third resistor 733 and the fourth resistor 734 are disposed at positions where the resistance values thereof are not changed by a user input (e.g., inside the sensor control circuit 721 or on a flexible circuit board). Accordingly, the third resistor 733 described below may be defined as a first fixed resistor (Rref 1 to be described later,) of which the resistance value does not change, and the fourth resistor 734 may also be defined as a second fixed resistor (Rref,2 to be described later) of which the resistance value does not change.

According to various embodiments, the sensor control circuit 721 may include a power generator configured to apply power and a measuring instrument 724 configured to measure a value of an electrical signal according to the change amount of a resistor included in the pressure sensor 712. For example, the power generator 725 may be connected to a first point P1 between the first resistor 731 and the second resistor 732 disposed on a conductive plate, and a second point P2 between the first fixed resistor and the second fixed resistor to apply power. In this case, a first potential V1 may be generated at the first point P1, and a second potential V2 may be generated at the second point P2. A measuring unit may be connected in series or parallel to the first point P1 and the second point P2 to measure the current value flowing between the first point P1 and the second point P2 or the voltage value between the first point P1 and the second point P2 ($|Vo=V1-V2|$, where V1 is a voltage value or potential at the first point P1, and V2 is a voltage value at the second point P2 or potential). Since the resistors included in the pressure sensor 712 are connected in the form of a Wheatstone bridge, the potential difference between the first point P1 and the second point P2 becomes 0 or a specific value (e.g., a value close to 0), so that in the state in which a user input is not received, the current value and the voltage value measured by the measuring unit in the state in which no input is received may be 0 or a specific value (e.g., a value close to 0).

According to various embodiments, the sensor control circuit 721 may identify a value associated with the pressure of an input based on values corresponding to the first resistor 731 and the second resistor 732. When a user input is received at a position corresponding to the pressure sensor 712 on the flexible display, the first resistor 731 and the second resistor 732 are deformed by the pressure of the user input. Thus, the resistance value of the first resistor 731 and the resistance value of the second resistor 732 may be changed. In response to the changed resistance value of the first resistor 731 and the changed resistance value of the second resistor 732, a potential difference between the first point P1 and the second point P2 may be generated. Accordingly, when a user input is received, the measuring unit may measure the current value and the voltage value generated by the potential difference generated between the first point P1 and the second point P2. The sensor control circuit 721 may process a measured electrical values (the current value or the voltage value) to identify a value indicating a pressure characteristic (e.g., sensitivity or strength) corresponding to the electrical value. For example, the sensor control circuit 721 may identify a value indicating a pressure characteristic corresponding to the identified electrical value among a plurality of values indicating pressure characteristics stored in advance in the electronic device (e.g., the memory 730). Alternatively, without being limited thereto, the identified electrical value itself may be identified as a value indicating the pressure characteristic. Based on the fact that the resistance change amount of the second resistor 732 by a user input is greater than the resistance change amount of the first resistor 731, the electrical value is measured from the pressure sensor 712, which will be described later with reference to FIGS. 16 and 17.

Figure 8A:
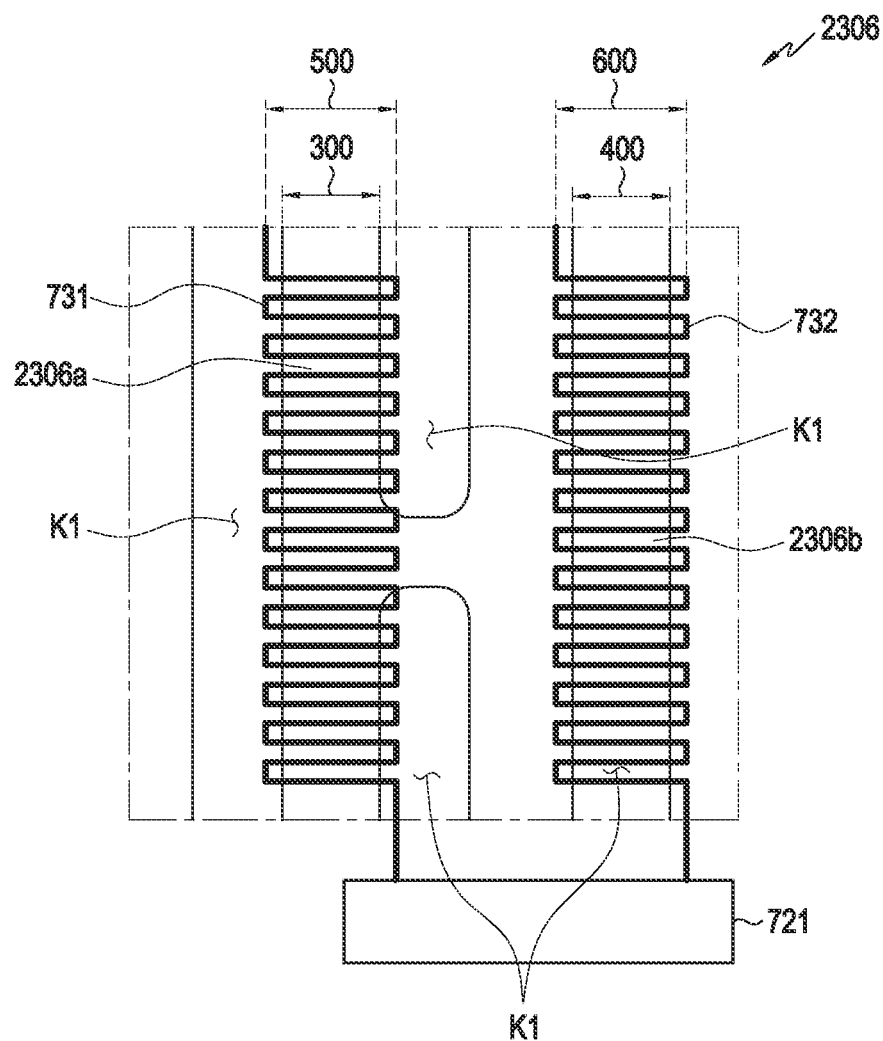
FIG. 8A is a view illustrating a first resistor and a second resistor disposed on a conductive plate according to various embodiments.
Figure 8B:
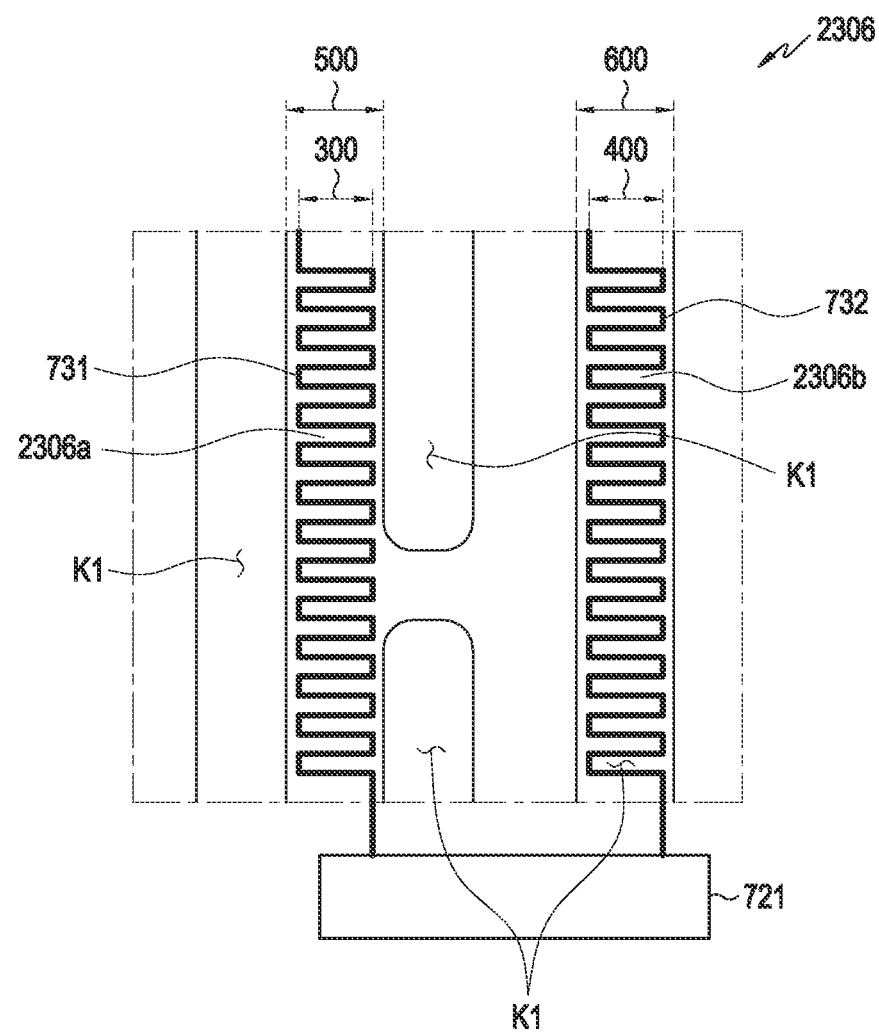
FIG. 8B is a view illustrating another embodiment of the first resistor and the second resistor disposed on the conductive plate according to various embodiments.
Figure 8C:
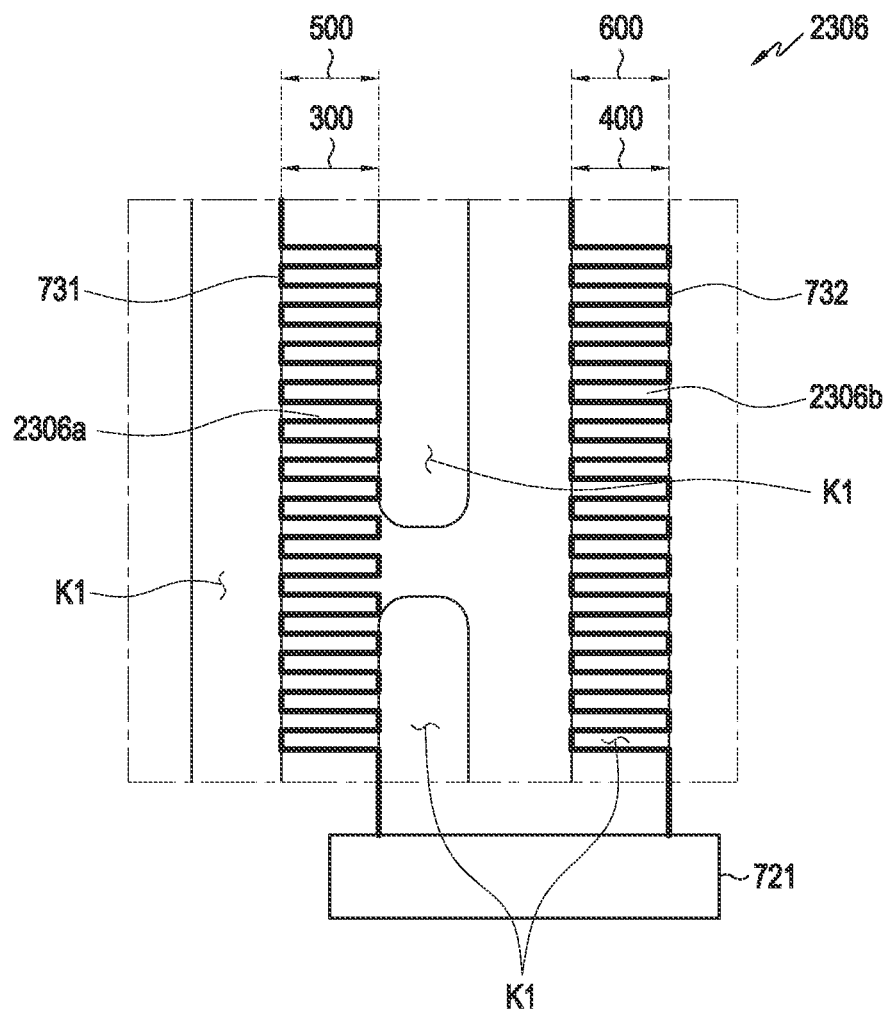
FIG. 8C is a view illustrating another embodiment of the first resistor and the second resistor disposed on the conductive plate according to various embodiments.
Figure 8D:
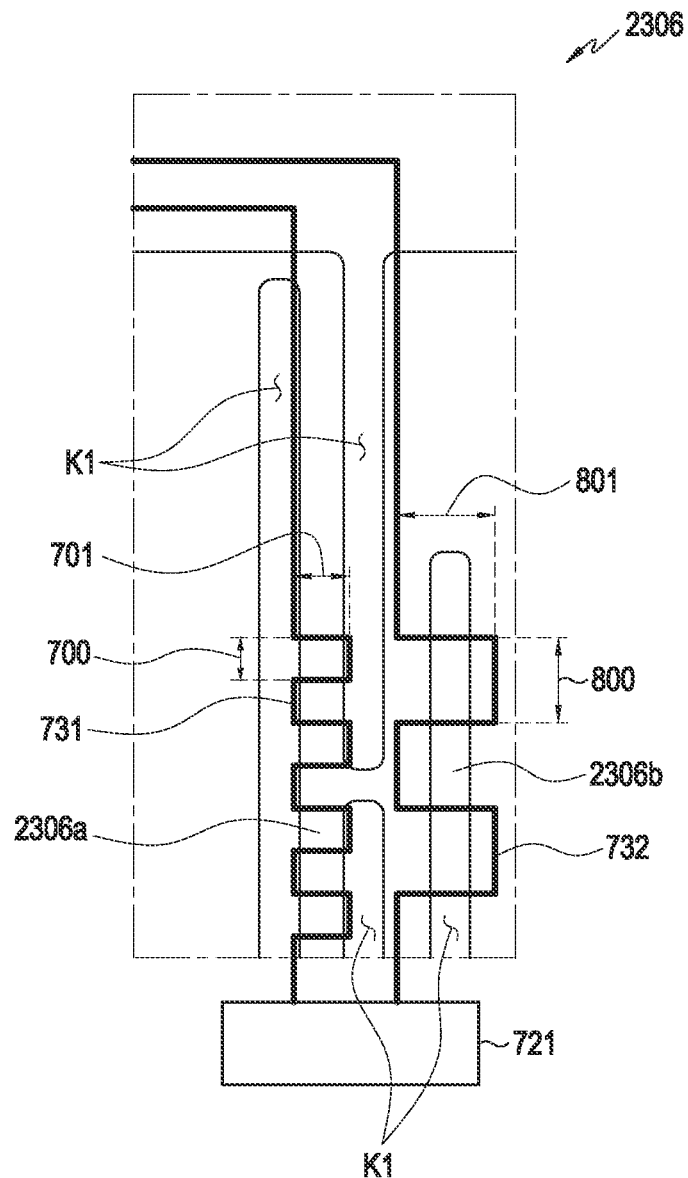
FIG. 8D is a view illustrating still another embodiment of the first resistor and the second resistor disposed on the conductive plate according to various embodiments.
Figure 8E:
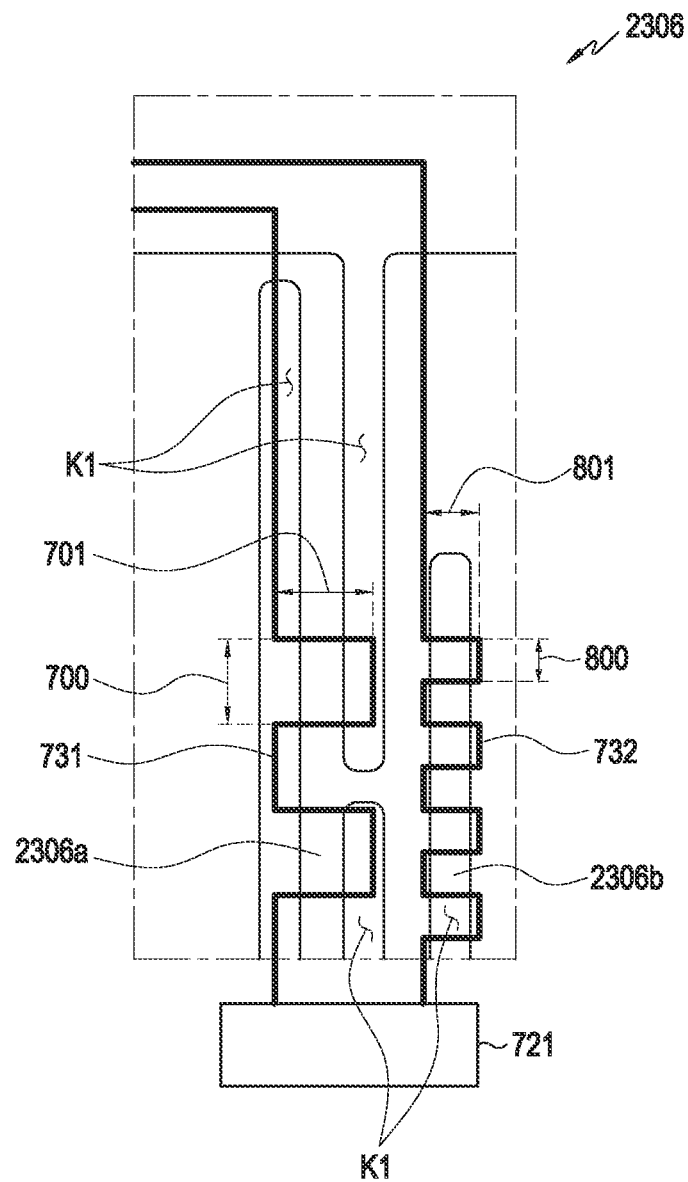
FIG. 8E is a view illustrating still another embodiment of the first resistor and the second resistor disposed on the conductive plate according to various embodiments.
Figure 8F:
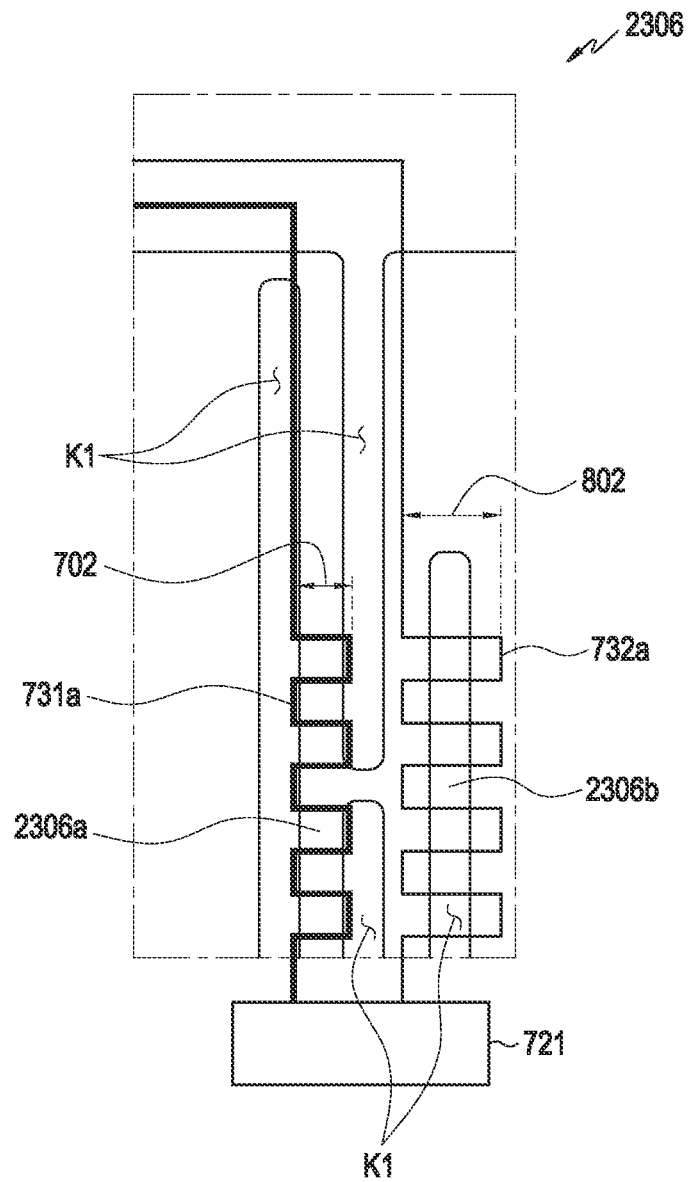
FIG. 8F is a view illustrating still another embodiment of the first resistor and the second resistor disposed on the conductive plate according to various embodiments.
Figure 8G:
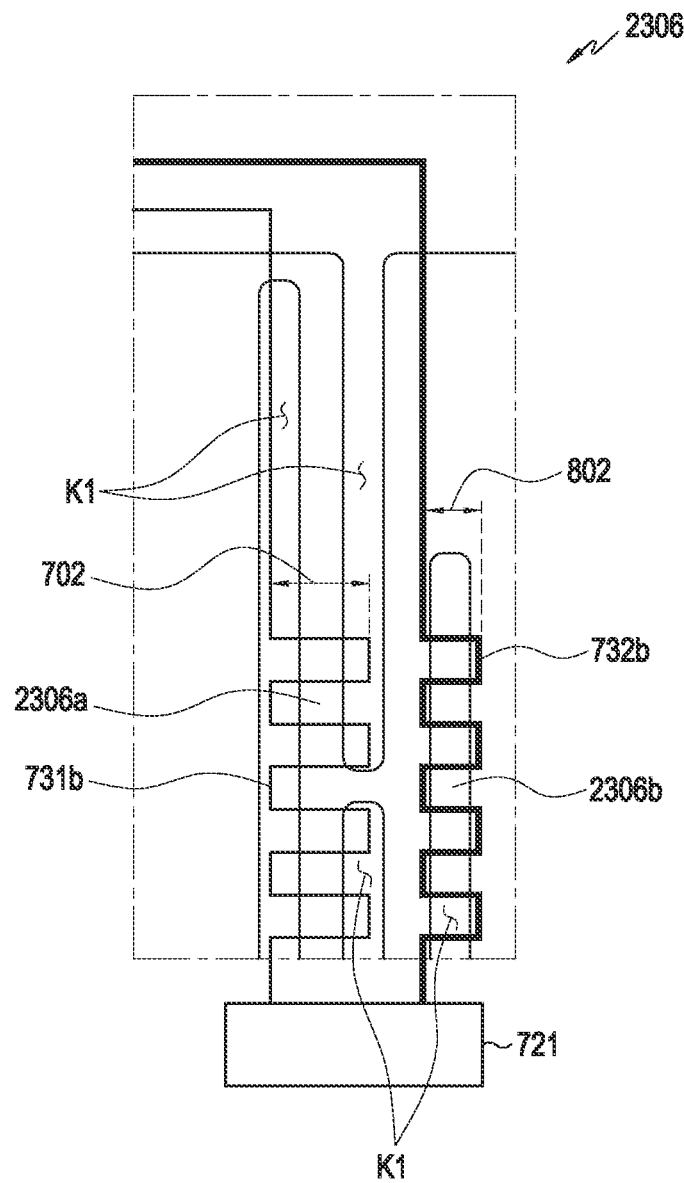
FIG. 8G is a view illustrating still another embodiment of the first resistor and the second resistor disposed on the conductive plate according to various embodiments.

FIG. 8A is a view illustrating a first resistor 731 and a second resistor 732 disposed on a conductive plate (e.g., the conductive plate 2306 in FIG. 5B) according to various embodiments, wherein FIG. 8A is an enlarged view of the area C1 in FIG. 7B, FIG. 8B is a view illustrating another embodiment of the first resistor 731 and the second resistor 732 disposed on the conductive plate 2306 according to various embodiments, FIG. 8C is a view illustrating another embodiment of the first resistor 731 and the second resistor 732 disposed on the conductive plate 2306 according to various embodiments, FIG. 8D is a view illustrating still another embodiment of the first resistor 731 and the second resistor 732 disposed on the conductive plate 2306 according to various embodiments, FIG. 8E is a view illustrating still another embodiment of the first resistor 731 and the second resistor 732 disposed on the conductive plate 2306 according to various embodiments, FIG. 8F is a view illustrating still another embodiment of the first resistor 731 and the second resistor 732 disposed on the conductive plate 2306 according to various embodiments, and FIG. 8G is a view illustrating still another embodiment of the first resistor 731 and the second resistor 732 disposed on the conductive plate 2306 according to various embodiments.

As illustrated in FIG. 8A described above, the width 500 (or the area or width of the cross-section) of the first resistor 731 may be greater than the width 300 of a support area 2306a between the plurality of openings K1, and the width 600 of the second resistor 732 may be greater than the width 400 of a spatial area 2306b between the plurality of openings K1. For example, the structure of the widths 500 and 600 of the first resistor 731 and the second resistor 732 may facilitate the generation of a difference between a first change amount in the resistance of the first resistor 731 and a second change amount in the resistance of the second resistor 732. Accordingly, with the structure of the widths 500 and 600 of the first resistor 731 and the second resistor 732, it is possible not only to improve the detection of a touch pressure applied to the flexible display 230, but also to improve touch pressure sensitivity for a small force.

According to various embodiments, as illustrated in FIG. 8A described above, the width 300 of the first resistor 731 may be smaller than the width 500 of the support area 2306a between the plurality of openings K1, and the width 400 of the second resistor 732 may be smaller than the width 600 of the spatial area 2306b between the plurality of openings K1. For example, the structure of the widths 300 and 400 of the first resistor 731 and the second resistor 732 may also similarly facilitate the occurrence of a difference between the first resistance change amount of the first resistor 731 and the second resistance change amount of the second resistor 732. As a result, it is possible not only to improve the detection of a touch pressure applied to the flexible display 230, but also to improve touch pressure sensitivity for a small force.

According to various embodiments, as illustrated in FIG. 8C, the width 300 of the first resistor 731 may be equal to the width 500 of the support area 2306a between the plurality of openings K1, and the width 400 of the second resistor 732 may be substantially the same as the width 600 of the spatial area 2036b between the plurality of openings K1. For example, with the structure of the substantial equal widths 300 and 400 of the first resistor 731 and the second resistor 732 may further facilitate the generation of a difference between a first change amount in the resistance of the first resistor 731 and a second change amount in the resistance of the second resistor 732. Accordingly, with the structure of the substantially equal widths 300 and 400 of the first resistor 731 and the second resistor 732, it is possible not only to further improve the detection of a touch pressure applied to the flexible display 230, but also to further improve touch pressure sensitivity for a small force.

According to various embodiments, as illustrated in FIG. 8D, the interval 700 in the zigzag pattern of the first resistor 731 may be narrower than the interval 800 in the zigzag pattern of the second resistor 732. For example, the interval 700 in the zigzag patterns of first resistors 731 may be narrow, and the interval 800 in the zigzag pattern of the second resistor 732 may be wide. In this case, the width 701 of the first resistor 731 may be smaller than the width 801 of the second resistor 732. For example, in order to match the total resistance values of the first and second resistors 731 and 732, when the interval 700 in the zigzag pattern of the first resistor 731 smaller than the interval 800 in the zigzag pattern of the second resistor 732, the width 801 of the second resistor 732 may be made greater than the width 701 of the first resistor 731. For example, the number of bent portions in the zigzag pattern of the first resistor 731 may be greater than the number of bent portions in the zigzag pattern of the second resistor 732, and in this case, the width 801 of the second resistor 732 may be made greater than the width 701 of the first resistor 731. Accordingly, the first and second resistors 731 and 732 may be designed to have substantially equal resistances with the total lengths thereof which are substantially the same depending on the interval structures 700 and 800 and the width structures 701 and 801 of the zigzag patterns.

In contrast, as illustrated in FIG. 8E, the interval 800 in the zigzag pattern of the second resistor 732 may be narrower than the interval 700 in the zigzag pattern of the first resistor 731. For example, the interval 800 in the zigzag pattern of the second resistor 732 may be narrow, and the interval 700 in the zigzag pattern of the first resistor 731 may be wide. In this case, the width 801 of the second resistor 732 may be smaller than the width 701 of the first resistor 731. For example, in order to match the total resistance values of the first and second resistors 731 and 732, when the interval 800 in the zigzag pattern of the second resistor 732 is smaller than the interval 700 in the zigzag pattern of the first resistor 731, the width 701 of the first resistor 731 may be made greater than the width 801 of the second resistor 732. For example, the number of bent portions in the zigzag pattern of the second resistor 732 may be greater than the number of bent portions in the zigzag pattern of the first resistor 731, and in this case, the width 701 of the first resistor 731 may be made greater than the width 801 of the second resistor 732. Accordingly, the first and second resistors 731 and 732 may be designed to have substantially equal resistances with the total lengths thereof which are substantially the same depending on the interval structures 700 and 800 and the width structures 701 and 801 of the zigzag patterns.

According to various embodiments, when the width 702 of the first resistor 731a is smaller than the width of the second resistor 732a, the thickness (or the area or width of the cross section) of the first resistor 731a may be made greater than the thickness of the second resistor 732a, as illustrated in FIG. 8F. For example, the thickness of the first resistor 731a may be greater than the thickness of the second resistor 732a, and the width 702 of the first resistor 731a may be smaller than the width 802 of the second resistor 732a. For example, when the thickness of the first resistor 731a is greater than the thickness of the second resistor 732a, the width 802 of the second resistor 732a may be made greater than the width 702 of the first resistor 731a in order to match the total resistance values of the first and second resistance values of the first and second resistors 731a and 732a. Accordingly, the first and second resistors 731a and 732a may be designed to have substantially equal resistances with the total lengths thereof which are substantially the same depending on the thickness structures and the width structures 702 and 802 of the first and second resistors 731a and 732a.

In contrast, as illustrated in FIG. 8G, when the thickness of the second resistor 732b may be made greater than that of the first resistor 731b when the width 802 of the second resistor 732b is smaller than the width 702 of the first resistor 731b. For example, the thickness of the second resistor 732b may be made greater than the thickness of the first resistor 731b. In this case, the width 802 of the second resistor 732b may be made smaller than the width 702 of the first resistor 731b. For example, when the thickness of the second resistor 732b is greater than the thickness of the first resistor 731b, the width 702 of the first resistor 731b may be made greater than the width 802 of the second resistor 732b in order to match the total resistance values of the first and second resistance values of the first and second resistors 731b and 732b. Accordingly, the first and second resistors 731b and 732b may be designed to have substantially equal resistances with the total lengths thereof which are substantially the same depending on the thickness structures and the width structures 702 and 802 of the first and second resistors 731b and 732b.

The resistors (e.g., the first resistor 731, 731a, or 731b, the second resistor 732, 732a, or 732b, the third resistor, and the fourth resistor described with reference to FIGS. 8A to 8G may be connected to each other in the form of a Wheatstone bridge as described above with reference to FIG. 7C. In this case, the resistors described with reference to FIGS. 8A to 8G may be implemented to satisfy the relationship in which the resistance values of the resistors are substantially equal to each other (resistance value R1 of first resistor 731, 731a, or 731b=resistance value R2 of second resistor 732, 732a, or 732b=resistance value R3 of third resistor=resistance value R4 of fourth resistor), or the relationship in which the resistance values in the diagonal directions on the Wheatstone bridge are equal to each other (resistance value R1 of first resistance 731, 731a, or 731b=resistance value R2 of second resistor 732, 732a, or 732b, and resistance value R3 of third resistor=resistance value R4 of resistor). In addition, the relationship of|resistance value R1 of first resistor 731, 731a, or 731b×resistance value R3 of third resistor|=|resistance value R2 of second resistor 732, 732a, or 732b×resistance value R4 of fourth resistor|may be satisfied. For example, when the resistance value R1 of the first resistor 731, 731a, or 731b and the resistance value R2 of the second resistor 732, 732a, or 732b are determined, it is possible to determine the resistance value R3 of the third resistor and the resistance value R4 of the fourth resistor to satisfy the above-mentioned relationships.

Figure 9A:
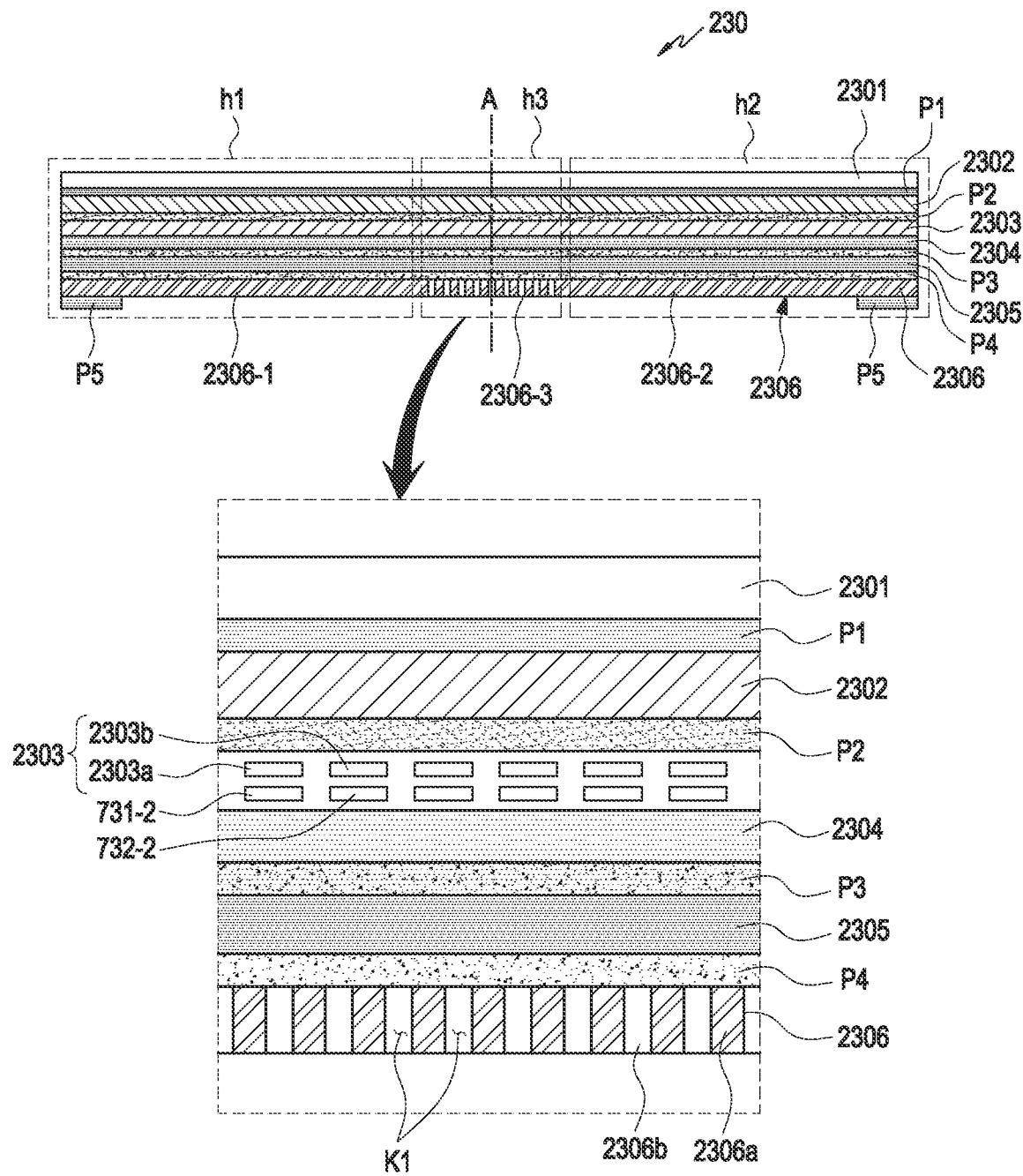
FIG. 9A is a cross-sectional view illustrating the laminated structure of a flexible display of an electronic device according to various embodiments.
Figure 9B:
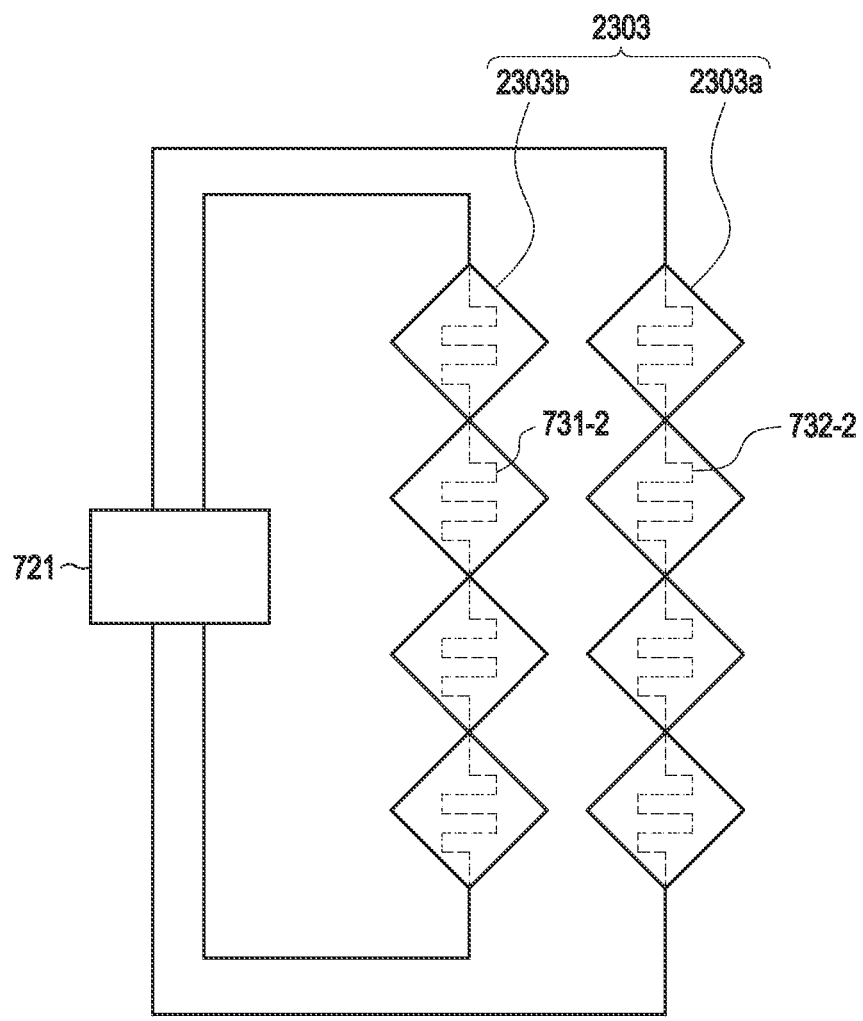
FIG. 9B is a view illustrating a plurality of touch sensors, a first resistor, and a second resistor among the components of a flexible display of an electronic device according to various other embodiments.

FIG. 9A is a cross-sectional view illustrating a laminated structure of a flexible display 230 of an electronic device (e.g., the electronic device 200 in FIG. 4) according to various embodiments, and FIG. 9B is a view illustrating a plurality of touch sensors 2303a and 2303b, a first resistor 731-2, and a second resistor 732-2 among the components of the flexible display 230 of the electronic device 200 according to various other embodiments.

Referring to FIGS. 9A and 9B, the flexible display 230 of the electronic device 200 may include a window 2301, a polarizer 2302, a touch panel 2303, a display panel 2304, a polymer member 2305, a conductive plate 2306, and a control circuit 720. For example, the touch panel 2303 may include a plurality of touch sensors 2303a and 2303b, and a plurality of first resistors 731-1 and a plurality of second resistors R2-2 included in a pressure sensor. For example, the window 2301 may be disposed on the front surface of the display panel 2304, and the polarizer 2302 may be disposed between the window 2301 and the display panel 2304. The touch panel 2303 may be disposed between the polarizer 2302 and the display panel 2304. The plurality of touch sensors 2303a and 2303b may be disposed on the touch panel 2303 and may be configured to detect a touch of an external object directed to the front surface of the window 2301. The plurality of first and second resistors 731-1 and 732-2 included in the pressure sensor may be disposed to be spaced apart from and overlap the rear surfaces of the plurality of touch sensors 2303a and 2303b, and may be configured to detect a touch pressure. The polymer member 2305 may be disposed on the rear surface of the display panel 2304. The conductive plate 2306 may support the flexible display 230 to be folded or unfolded. For example, a bendable portion 2306-3 of the conductive plate 2306 may include a plurality of openings K1 disposed to be spaced apart from each other.

The conductive plate 2306 may include support areas 2306a and spatial areas 2306b provided between the plurality of openings K1.

The control circuit 720 may be electrically connected to the plurality of touch sensors 2303a and 2303b and the plurality of first resistors 731-1 and second resistors 732-2, and the control circuit 720 may be configured to detect touch information based on the change amount in capacitance between the plurality of touch sensors 2303a and 2303b with respect to a touch pressure of an external object with respect to the plurality of touch sensors 2303a and 2303b.

Based on a first change amount and a second change amount in the resistances of the plurality of first resistors 731-1 and second resistors 732-2 generated by the pressure of an input of an external object to the first resistors 731-1 and the second resistors 732-2, the control circuit 720 may detect information associated with the pressure of the input.

At least one of the components of the flexible display 230 may be the same as or similar to at least one of the components of the flexible display 230 of FIG. 5B, and a redundant description will be omitted below.

According to various embodiments, the widths of the plurality of first and second resistors 731-1 and 732-2 may be greater or smaller than the widths of the plurality of touch sensors. For example, as in FIG. 9B described above, when the widths of the plurality of first resistors 731-1 and the second resistors 732-2 are smaller than the widths of the plurality of touch sensors 2303a and 2303b, the plurality of first resistors 731-1 and the second resistors 732-2 may be disposed inside the plurality of touch sensors 2303a and 2303b. Accordingly, the plurality of first resistors 731-1 and the plurality of second resistors 732-2 may further facilitate the generation of a difference between the first and second change amounts in resistances, and the plurality of first resistors 731-1 and the plurality of second resistors 732-2 may improve detection of pressure based on forces of various magnitudes applied to the flexible display. Due to this, for example, the plurality of first resistors 731-1 and the plurality of second resistors 732-2 may easily detect an input even when the input is made with pressure based on a force of a small magnitude.

Hereinafter, an example of operations of an electronic device (e.g., the electronic device 101 in FIG. 1 or the electronic device 200 in FIG. 4) according to various embodiments will be described.

According to various embodiments, an electronic device (e.g., the electronic device 101 in FIG. 1 or the electronic device 200 in FIG. 4) may detect an input made by an external object (e.g., a part of a user's body (finger)), and execute at least one operation corresponding to values associated with the detected input.

Figure 10:
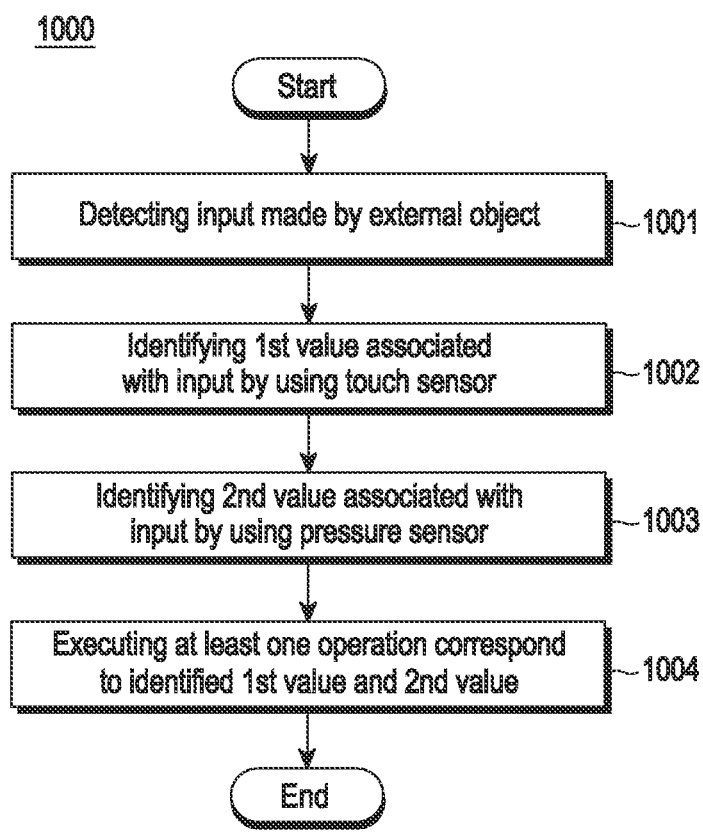
FIG. 10 is a flowchart for describing an example of operations of an electronic device according to various embodiments.

FIG. 10 is a flowchart 1000 for describing an example of operations of an electronic device according to various embodiments. According to various embodiments, the operations illustrated in FIG. 10 are not limited to the illustrated order and may be executed in various orders. In addition, according to various embodiments, a greater or smaller number of operations compared to the operations illustrated in FIG. 10 may be executed. Hereinafter, the operations of FIG. 10 will be described with reference to FIG. 11.

Figure 11:
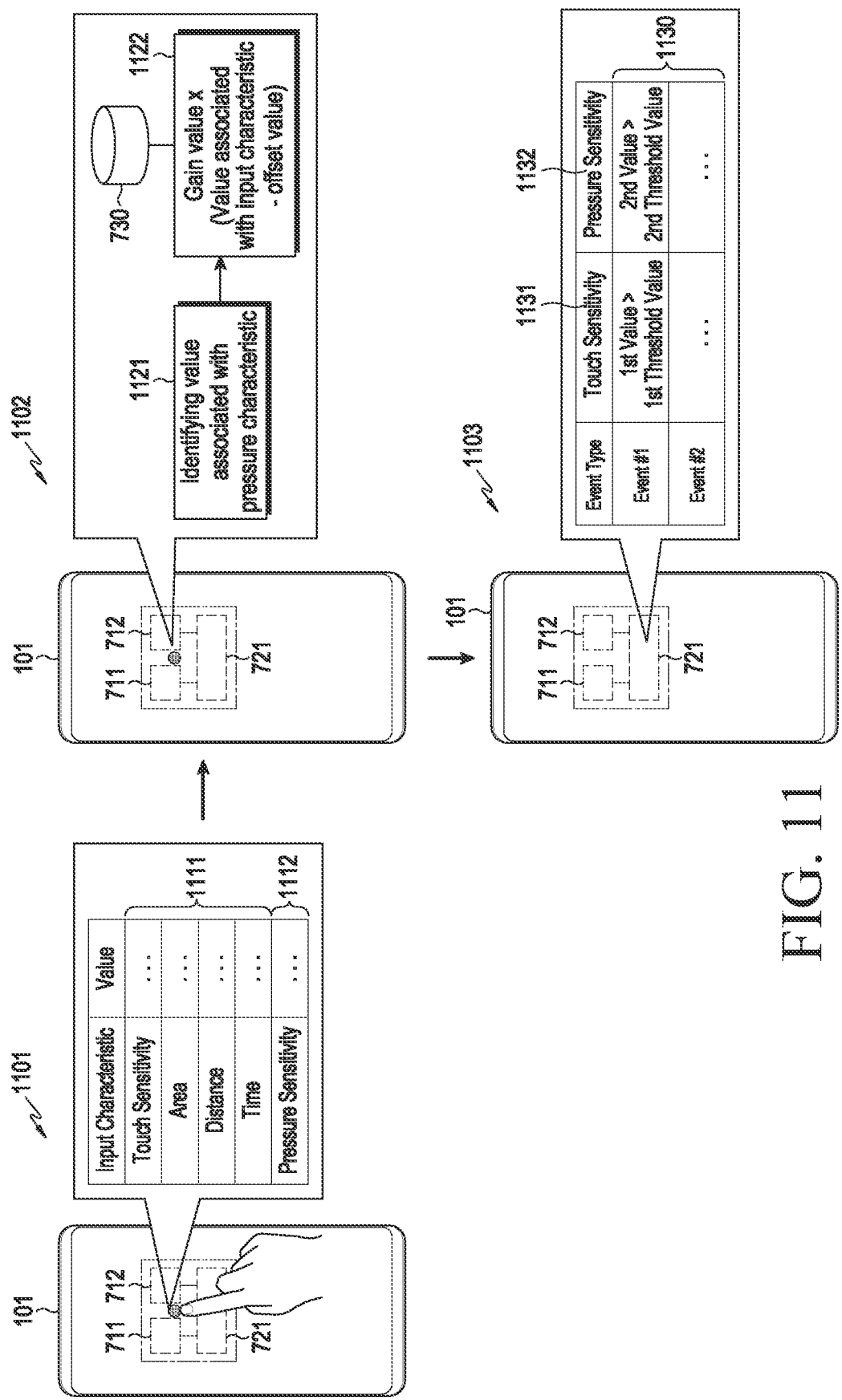
FIG. 11 is a view for describing an example of operations of executing operations corresponding to values associated with detected inputs of an electronic device according to various embodiments.

FIG. 11 is a view for describing an example of operations of executing operations corresponding to values associated with detected inputs of an electronic device according to various embodiments.

According to various embodiments, an electronic device 101 (e.g., the sensor control circuit 721) may detect an input made by an external object in operation 1001. For example, as illustrated in 1101 of FIG. 11, the electronic device 101 may receive a contact by a user's body on a flexible display. In addition, although not illustrated, for example, the electronic device 101 may receive a contact by an external object (e.g., various objects) other than a user's body on the flexible display.

According to various embodiments, the sensor control circuit 721 may identify electrical values (e.g., voltage or current) associated with inputs output from sensors 710 (e.g., the touch sensor 711 or the pressure sensor 712) based on inputs by an external object (e.g., inputs by a portion of a user's body). For example, the sensor control circuit 721 may measure electrical values generated from each of the touch sensor 711 and the pressure sensor 712 in response to user inputs, as illustrated in 1101 of FIG. 11. The sensor control circuit 721 may identify values 1111 and 1112 associated with characteristics of inputs corresponding to measured electrical values. The characteristics associated with the inputs may include characteristics associated with a touch (e.g., at least one of a touch position (coordinates), a touch area, touch sensitivity, a moving distance, or a duration time) 1111 and characteristics associated with pressure (e.g., pressure sensitivity) 1112. According to an embodiment, the sensor control circuit 721 may transmit values (e.g., an electronic value or a digital value) associated with characteristics associated with an identified touch (e.g., at least one of a touch position (coordinates), a touch area, touch sensitivity, a moving distance, or a duration time) 1111, and values associated with the characteristics associated with an identified pressure (e.g., pressure sensitivity) 1112 together to a processor (e.g., the processor 760 in FIG. 7A) to be processed (e.g., identifying a corresponding event and executing at least one operation). The values transmitted from the sensor control circuit 721 to the processor (e.g., the processor 760 in FIG. 7A) according to the above-described embodiment may be as follows.

Value transmitted to the processor (e.g., processor 760 of FIG. 7A) are as follows: "[P]tID:0x:3437y:2403 p:33 major:8 minor:8 tc:1 type:0 noise:0".

According to various embodiments, without being limited to those described above, the sensor control circuit 721 may transmit values associated with characteristics associated with an identified touch (e.g., at least one of a touch position (coordinates), a touch area, touch sensitivity, a moving distance, or a duration time) 1111 to the processor (e.g., the processor 760 in FIG. 7A), and may transmit values associated with an identified pressure (e.g., pressure sensitivity) 1112 in addition to the values associated with the characteristics associated with a touch to the processor (e.g., the processor 760 in FIG. 7A). For example, a touch sensor panel IC included in the sensor control circuit 721 may transmit the values associated with a touch to the processor (e.g., the processor 760 in FIG. 7A), and a pressure sensor panel IC included in the sensor control circuit 721 may transmit values related to characteristics associated with pressure to the processor (e.g., the processor 760 in FIG. 7A). According to various embodiments, the electronic device 101 (e.g., the sensor control circuit 721) may identify first values associated with an input by using the touch sensor 711 in operation 1002, and may identify second values associated with an input by using the input sensor 712 in operation 1003.

According to various embodiments, the first values associated with an input are values indicating characteristics associated with a touch, and may be defined as values identified by using the touch sensor 711. For example, the electronic device 101 may identify the first values indicating characteristics associated with the touch of an input based on electrical values identified from the touch sensor 711. For example, the electronic device 101 may identify electrical values output from the touch sensor 711 and may identify values indicating the sensitivity (or magnitude or intensity) of a touch corresponding to the identified electrical values. In addition, for example, the electronic device 101 may sequentially apply power to electrodes for driving the touch sensor 711, and based on the applied power, the electronic device 101 may detect an electrical value associated with at least one electrode among the plurality of electrodes or a change amount in the electrical value. As a result, the electronic device 101 may identify a value indicating at least one of the position (or coordinates), area, duration time, or moving distance of the touch of an input based on specific electrodes, of which the electrical value or the change amount of the electrical value is detected, among the plurality of electrodes.

According to various embodiments, the second values associated with an input are values indicating characteristics associated with pressure, and may be defined as values identified by using the pressure sensor 712. For example, the electronic device 101 may identify the second values indicating characteristics associated with the pressure of an input based on electrical values identified from the pressure sensor 712. For example, the electronic device 101 may identify electrical values identified from the pressure sensor 712 and may identify values indicating the sensitivity (or magnitude or intensity) of a pressure corresponding to the identified electrical values.

According to various embodiments, the electronic device 101 (e.g., the sensor control circuit 721) may adjust a value associated with a characteristic of an identified input to more accurately determine the characteristic of the received input. For example, as illustrated in 1102 of FIG. 11, the sensor control circuit 721 may identify a value associated with an input characteristic (1121), and may perform adjustment by reflecting (e.g., subtracting) an offset value from the value associated with the identified input characteristic and reflecting (multiplying or adding) a gain value on the subtracted value (1122) (gain value*(value associated with input characteristic−offset value)). The offset value reflection operation and the gain value reflection operation of the electronic device may be executed depending on the folded state of the electronic device or may be executed for each area, which will be described later with reference to FIGS. 18A to 23. Gain value*(value associated with input characteristic−offset value), which is a calculation expression (or a function) for calculating a value associated with the corrected input characteristic, is merely an example, and as described above in the description of the sensor control circuit 721, a value associated with a corrected input characteristic may be calculated by using various calculation expressions.

According to various embodiments, the electronic device 101 (e.g., the sensor control circuit 721) may perform at least one operation corresponding to an identified first value and an identified second value in operation 1004. For example, the electronic device 101 may identify an event corresponding to a value associated with a touch and a value associated with pressure, and may perform an operation corresponding to the identified event. The event may be at least one of information indicating the operation of the electronic device 101 to be performed in response to the identified input or information indicating the type of the identified input (e.g., single touch, drag, flickering, force touch, normal touch, or the like). For example, the event may include a first event indicating that the received input is an invalid input, and when the first event is identified, the electronic device 101 may execute an operation of ignoring the received input. For example, the event may include a second event indicating that the received input is a valid input and is of a drag type, and when the second event is identified, the electronic device 101 may switch (e.g., scroll) the currently displayed screen. The event may include an event indicating that a force touch is generated and an event indicating that a normal touch is generated. Examples of operations of the electronic device 101 will be described later with reference to FIGS. 14 to 15C.

According to various embodiments, as illustrated in 1103 of FIG. 11, for respect events 1130, values 1131 indicating characteristics (e.g., a touch area, touch sensitivity, a moving distance, and a duration time) associated with an identified touch corresponding to respective events and values 1132 indicating characteristics associated with pressure (e.g., pressure sensitivity) may be pre-configured.

For example, respective events 1130 may be configured to correspond to values of pre-configured ranges for respective input characteristics 1131 and 1132. The values in the pre-configured ranges may be configured to values in a high range or values in a low range with reference to a pre-configured threshold value. For example, as illustrated in 1103 of FIG. 11, a specific event (e.g., event #1) may be configured to be identified when a value indicating a characteristic 1131 associated with a touch (e.g., touch sensitivity) is greater than a first threshold value and a value indicating a characteristic 1132 associated with pressure (e.g., pressure sensitivity) is greater than a second threshold value. The electronic device 101 may compare each of a value associated with an identified touch and a value associated with an identified pressure with threshold values pre-configured for a specific event, and may execute an operation corresponding to the identified event based on the comparison result. For example, based on a result of comparing values associated with an identified input (e.g., the first value and the second value) with the threshold values associated with respective values, when identifying that the first value is greater than the first threshold value and the second value is greater than the second threshold value, the electronic device 101 may execute an operation corresponding to the first event. Without being limited the above description, the values in the pre-configured range may be configured to values in a range between a pre-configured maximum value and a pre-configured minimum value, instead of the values in the range based on the threshold values.

The above-described threshold values (or minimum and maximum values) may be pre-configured in the electronic device 101 for each event. In addition, the pre-configured threshold values may be configured, adjusted, or reset for respective folding state of the electronic device 101 and for respective areas of the bendable portion 2306-3, which will be described later with reference to FIGS. 16 to 18B.

In addition, for example, respective events 1130 may be configured to correspond to specific values pre-configured for respective input characteristics 1131 and 1132. For example, for a specific event, a value indicating a characteristic related to a touch may be configured to a third value, and a value indicating a characteristic associated with pressure may be configured to a fourth value. The electronic device 101 may compare each of a value associated with an identified touch and a value associated with an identified pressure with threshold values associated with an event, and may execute an operation corresponding to the identified event based on the comparison result.

As described above, by executing an operation by identifying not only a characteristic associated with a touch associated with a received user input but also a characteristic associated with pressure various, the electronic device 101 may provide various types of operations in response to user inputs.

Hereinafter, another example of operations of an electronic device (e.g., the electronic device 101 in FIG. 1 or the electronic device 200 in FIG. 4) according to various embodiments will be described.

According to various embodiments, an electronic device (e.g., the electronic device 101 in FIG. 1 or the electronic device 200 in FIG. 4) may identify a value associated with a touch of an identified input and configured a threshold value to be compared with a value associated with pressure according to the value associated with the identified touch.

Figure 12:
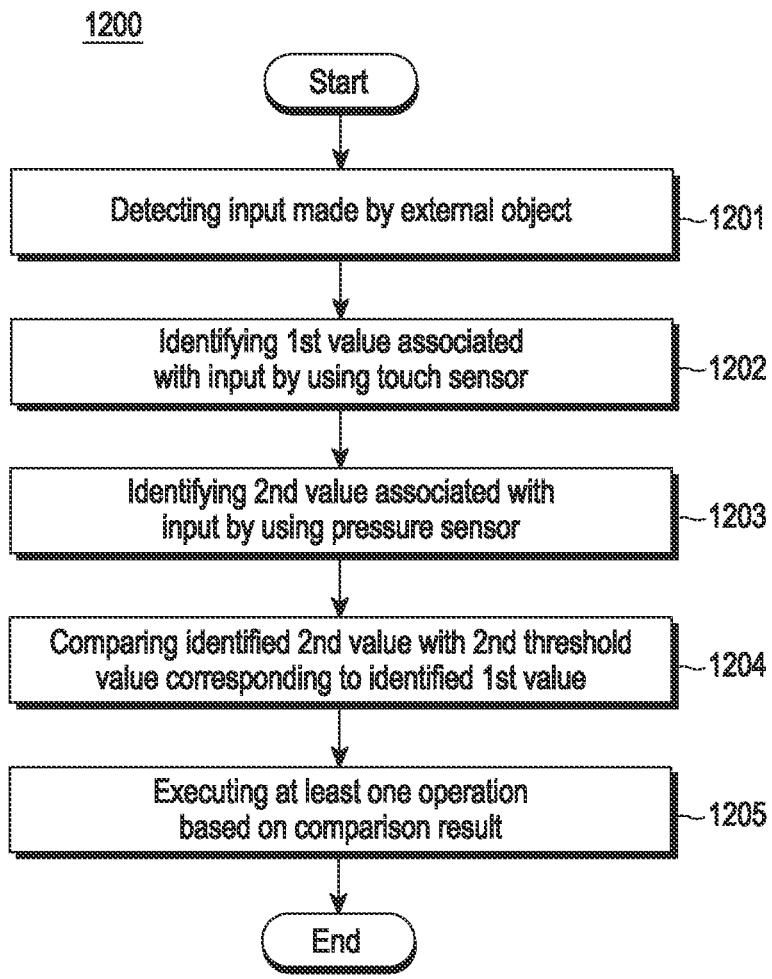
FIG. 12 is a flowchart for describing another example of operations of an electronic device according to various embodiments.

FIG. 12 is a flowchart 1200 for describing another example of operations of an electronic device according to various embodiments. According to various embodiments, the operations illustrated in FIG. 12 are not limited to the illustrated order and may be executed in various orders. In addition, according to various embodiments, a greater or smaller number of operations compared to the operations illustrated in FIG. 12 may be executed. Hereinafter, FIG. 12 will be described with reference to FIG. 13.

Figure 13:
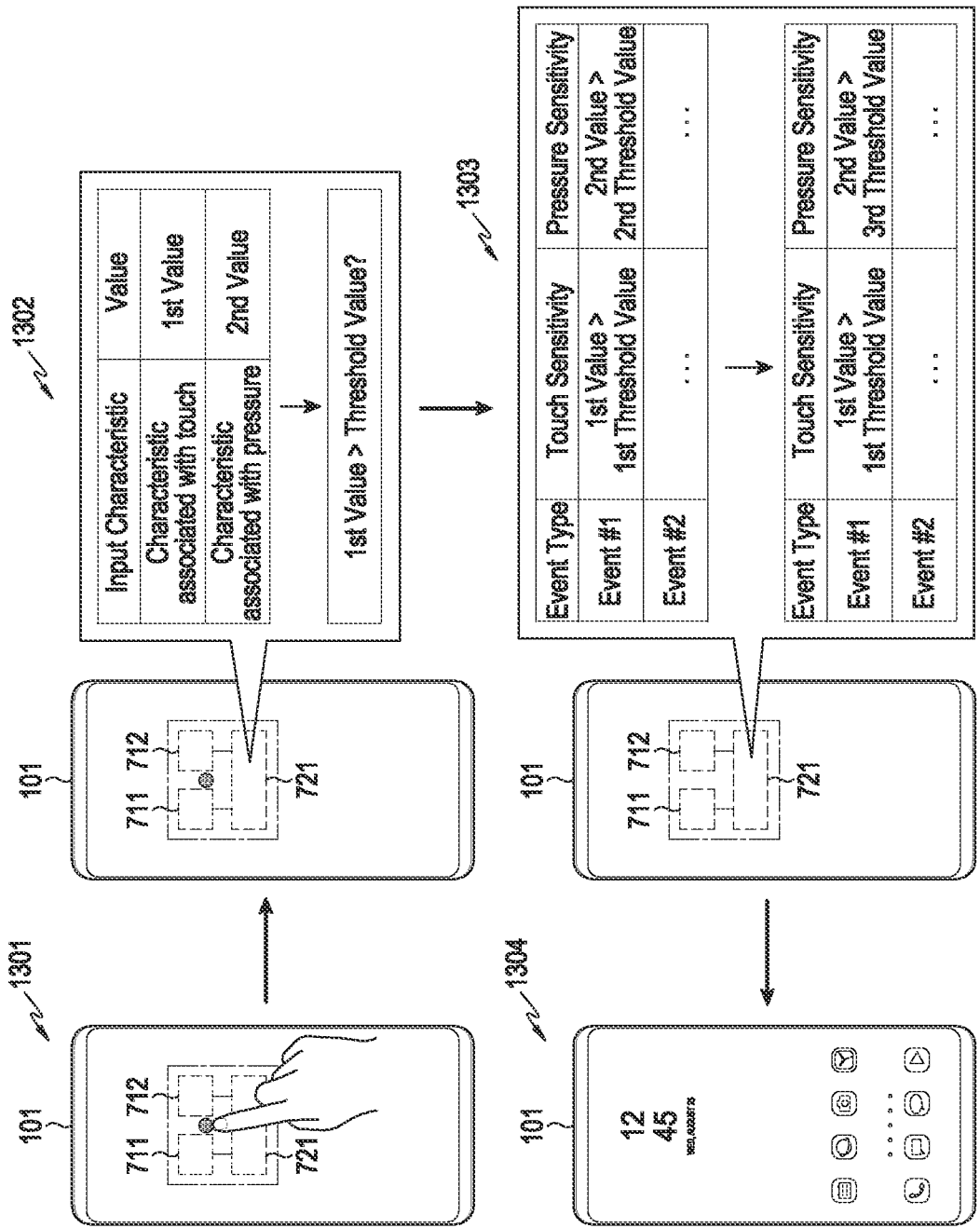
FIG. 13 is a view for describing an example of an operation of configuring a threshold value to be compared with a value associated with pressure according to a value associated with an identified touch of an electronic device according to various embodiments.

FIG. 13 is a view for describing an example of an operation of configuring a threshold value to be compared with a value associated with pressure according to a value associated with an identified touch of an electronic device according to various embodiments.

According to various embodiments, an electronic device 101 (e.g., the sensor control circuit 721) may detect an input made by an external object in operation 1201. For example, as illustrated in 1301 of FIG. 13, the electronic device 101 may receive a contact by a user's body (e.g., a finger). Since operation 1201 of the electronic device 101 may be executed in the same manner as the above-described operation 1001 of the electronic device 101, a redundant description will be omitted.

According to various embodiments, the electronic device 101 (e.g., the sensor control circuit 721) may identify a first value associated with an input by using the touch sensor 711 in operation 1202, and may identify a second value associated with an input by using the input sensor 712 in operation 1203. For example, the sensor control circuit 721 may identify a value associated with a touch that corresponds to an electrical value identified by using the touch sensor 711, and may identify a value associated with pressure corresponding to the electrical value identified by using the pressure sensor 712. Since operations 1202 and 1203 of the electronic device 101 may be executed in the same manner as operations 1002 and 1003 of the electronic device 101 described above, a redundant description thereof will be omitted.

According to various embodiments, the electronic device 101 (e.g., the sensor control circuit 721) may compare the identified second value with a second threshold value corresponding to the identified first value in operation 1204.

According to various embodiments, the electronic device 101 (e.g., the sensor control circuit 721) may compare a value associated with an identified touch with a pre-configured first threshold value, and may configure a threshold value to be compared with the pressure based on the comparison result. For example, when identifying values indicating an input characteristic as illustrated in 1302 of FIG. 13, the sensor control circuit 721 may identify a magnitude relationship between the value associated with the identified touch (e.g., touch sensitivity) and the first threshold value. The first threshold value may be a value pre-configured to be compared with a value associated with a touch to be associated with a specific event (e.g., an event indicating that the above-mentioned force touch is generated). When the first value is smaller than or equal to (or not greater than) the first threshold value as illustrated in 1303 of FIG. 13, the sensor control circuit 721 may adjust a second threshold value pre-configured in order to compare with a value associated with pressure pre-configured in a first event to a smaller third threshold value. As a result, the criterion for determining whether a received input is valid is lowered, and thus it is possible to detect a user input, which has a small value indicating a characteristic associated with a touch, as a valid input. Alternatively, in contrast, when the first value is greater than the first threshold, the sensor control circuit 721 may adjust the second threshold pre-configured for comparing with a value associated with pressure pre-configured in a first event to a greater third threshold.

Without being limited to the above description, the electronic device 101 (e.g., the sensor control circuit 721) may pre-configure, for the same type of events, threshold values to be compared with values associated with different pressures according to the magnitude relation between a value associated with an identified touch and a pre-configured first threshold value. For example, a first event indicating that the input is valid may be configured such that a value associated with a touch is greater than the first threshold value and a value associated with pressure is greater than the second threshold value, and a second event indicating that another input is valid may be set such that a value associated with a touch is smaller than (or not greater than) the first threshold value and a value associated with pressure is greater than the third threshold value.

According to various embodiments, the electronic device 101 (e.g., the sensor control circuit 721) may execute at least one operation in operation 1205 based on the comparison result. For example, as illustrated in 1304 of FIG. 13, the electronic device 101 may identify that a received user input is a valid input and may execute an operation (e.g., displaying an execution screen) corresponding to the user input. Since operation 1205 of the electronic device 101 may be executed in the same manner as the above-described operation 1004 of the electronic device 101, a redundant description will be omitted.

Without being limited to the above description, the electronic device 101 (e.g., the sensor control circuit 721) may set a threshold value to be compared with a value associated with a touch based on a value associated with pressure. The electronic device 101 may adjust the threshold value to be compared with the value associated with a touch according to the comparison result of the value associated with a pressure and the second threshold value.

As described above, by adjusting the threshold value to be compared with a characteristic value associated with the pressure of an input based on a characteristic value associated with the touch of the input, the electronic device 101 may identify various types of valid user inputs and based on this, the electronic device 101 may execute various types of operations.

Hereinafter, another example of operations of an electronic device (e.g., the electronic device 101 in FIG. 1 and the electronic device 200 in FIG. 4) according to various embodiments will be described.

According to various embodiments, the electronic device (e.g., the electronic device 101 in FIG. 1 or the electronic device 200 in FIG. 4) may execute at least one operation based on the comparison result of the value associated with an identified touch and the threshold value associated with the touch and the comparison result of the value associated with a pressure and the threshold value associated with the pressure.

Figure 14:
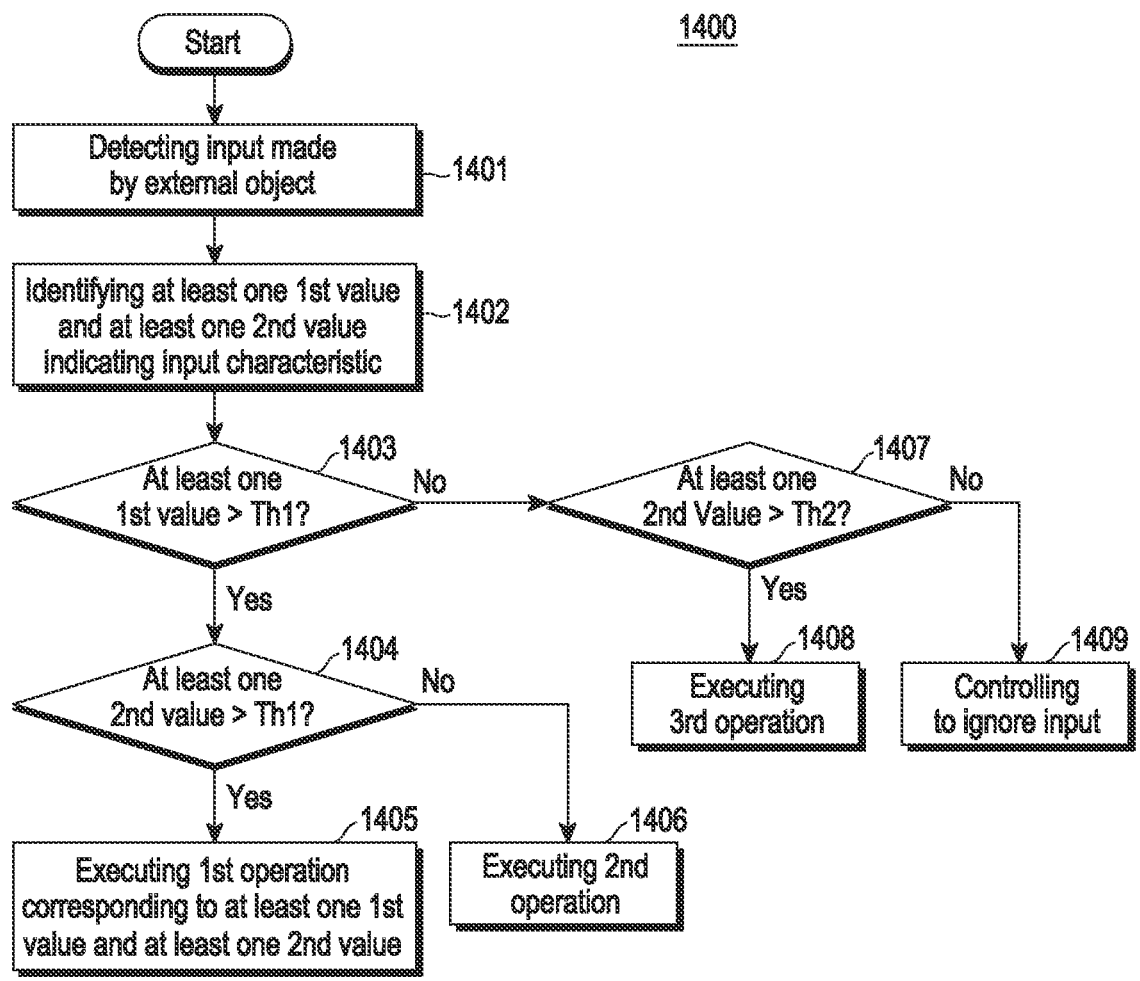
FIG. 14 is a flowchart for describing still another example of operations of an electronic device according to various embodiments.

FIG. 14 is a flowchart 1400 for describing still another example of operations of the electronic device according to various embodiments. According to various embodiments, the operations illustrated in FIG. 14 are not limited to the illustrated order, and may be performed in various orders. In addition, according to various embodiments, a greater or smaller number of operations compared to the operations illustrated in FIG. 14 may be executed.

Hereinafter, FIG. 14 will be described with reference to FIGS. 15A to 15C.

Figure 15A:
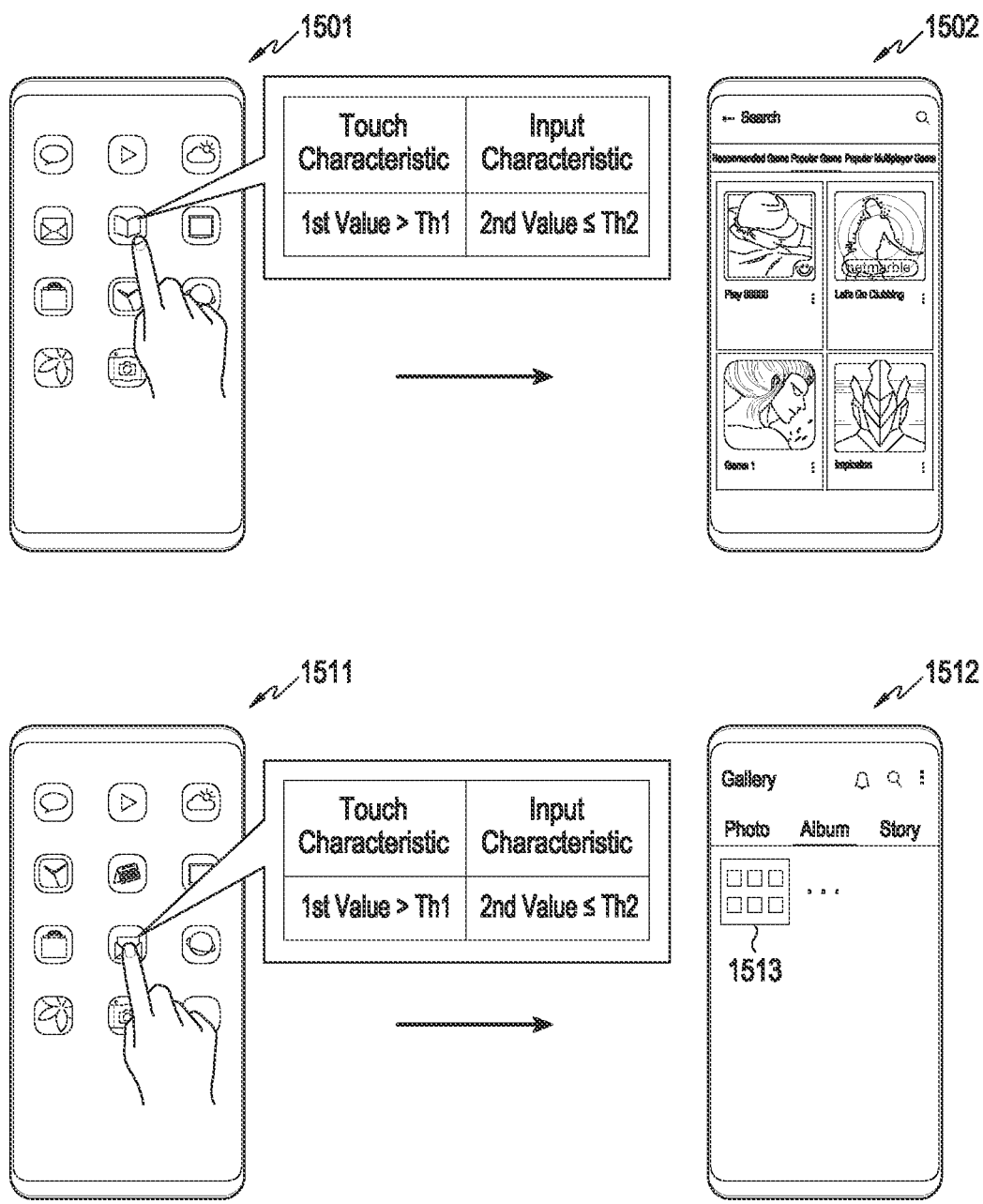
FIG. 15A is a view for describing an example of operations executed based on a comparison result of a value and a threshold value associated with an input of an electronic device according to various embodiments.
Figure 15B:
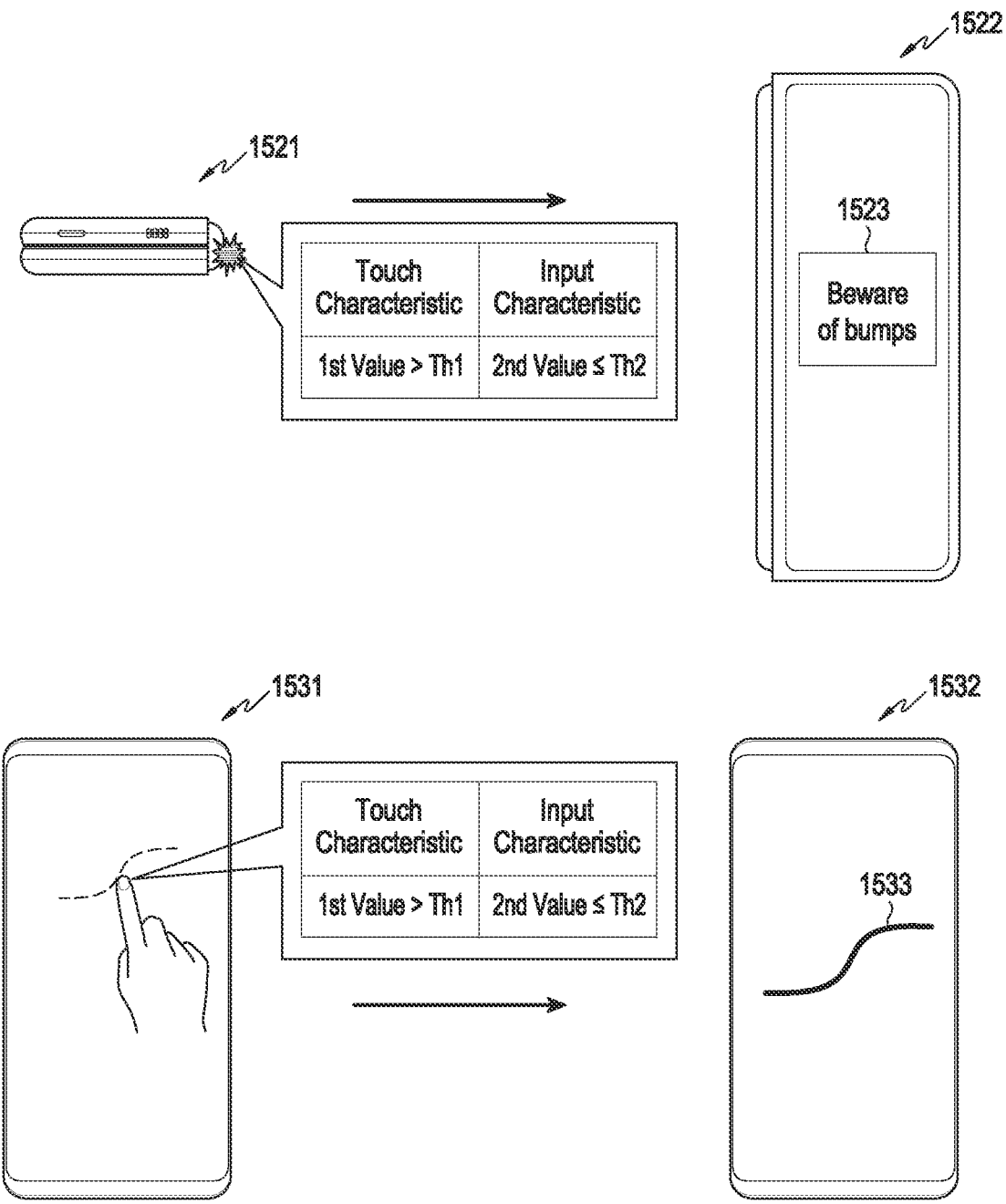
FIG. 15B is a view for describing another example of operations executed based on a comparison result of a value and a threshold value associated with an input of an electronic device according to various embodiments.
Figure 15C:
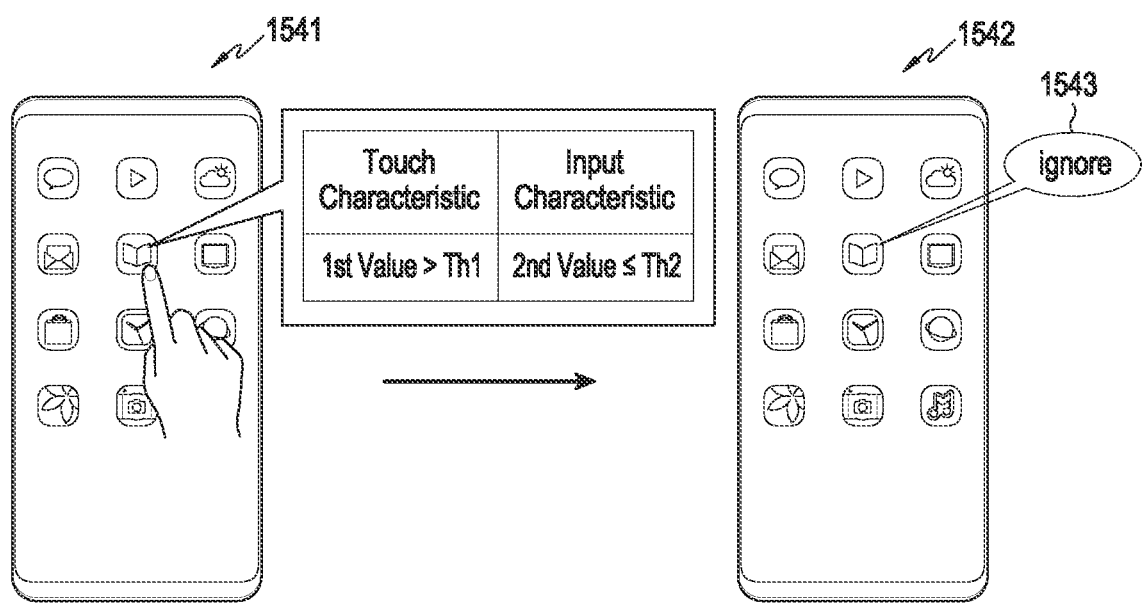
FIG. 15C is a view for describing still another example of operations executed based on a comparison result of a value and a threshold value associated with an input of an electronic device according to various embodiments.

FIG. 15A is a view for describing an example of operations executed based on a comparison result of a value and a threshold value associated with an input of an electronic device according to various embodiments. FIG. 15B is a view for describing another example of operations executed based on a comparison result of a value and a threshold value associated with an input of an electronic device according to various embodiments. FIG. 15C is a view for describing still another example of operations executed based on a comparison result of a value and a threshold value associated with an input of an electronic device according to various embodiments.

According to various embodiments, an electronic device 101 (e.g., the sensor control circuit 721) may detect an input made by an external object in operation 1401. For example, as illustrated in FIGS. 15A to 15C (e.g., 1501, 1511, 1521, 1531, and 1541), the electronic device 101 may receive a contact performed by a portion of a user's body (e.g., a finger) or an object. Since operation 1401 of the electronic device 101 may be executed in the same manner as operations 1001 and 1201 of the electronic device 101 described above, a redundant description will be omitted.

According to various embodiments, the electronic device 101 (e.g., the sensor control circuit 721) may identify at least one first value and at least one second value indicating characteristics associated with an input in operation 1402. For example, the electronic device 101 may identify at least one first value indicating a characteristic of a touch (e.g., touch sensitivity, a touch area, a moving distance, or a duration time) and at least one second value indicating a characteristic of a pressure (e.g., pressure sensitivity). Since operation 1402 of the electronic device 101 may be executed in the same manner as the above-described operations 1002 and 1003 of the electronic device 101 and the above-described operations 1202 and 1203 of the electronic device 101, a redundant description will be omitted.

According to various embodiments, the electronic device 101 (e.g., the sensor control circuit 721) may compare the at least one first value with a first threshold value Th1 in operation 1403, and when the first value is greater than the first threshold value Th1, the electronic device 101 may compare the at least one second value with a second threshold value Th2 in operation 1404. For example, the electronic device 101 may compare at least one value associated with the touch of a received user input with the first threshold value Th1, and when the value is greater than the first threshold value Th1 as a result of comparison, the electronic device 101 may compare at least one value associated with a pressure with the second threshold value Th2. For example, the electronic device 101 may compare a value indicating a touch sensitivity with the first threshold value Th1, and when the value indicating the touch sensitivity is greater, the electronic device 101 may compare a value indicating pressure sensitivity with the second threshold value Th2. As another example, the electronic device 101 may compare each of a value indicating a touch sensitivity and a value indicating a touch area with the first threshold value Th1, and when each of the value indicating the touch sensitivity and the value indicating the touch area is greater than the first threshold value Th1, the electronic device 101 may compare the value indicating the pressure sensitivity with the second threshold value Th2.

According to various embodiments, when the at least one second value is greater than the second threshold value Th2 as a result of the comparison in operation 1404, the electronic device 101 may execute a first operation corresponding to the at least one first value and the at least one second value in operation 1405. For example, the electronic device 101 may determine that a force touch input has occurred, and may execute an operation corresponding to the force touch input. The second threshold value may be set to, for example, a value based on which it is possible to determine whether the received input is a force touch. As an example, as illustrated in 1501 of FIG. 15A, when identifying that a first value associated with the touch of a received user input (e.g., a value indicating a touch sensitivity) is greater than the first threshold value Th1 and a second value associated with a pressure (e.g. a value indicating pressure sensitivity) is greater than the second threshold value Th2, the electronic device 101 (e.g., the sensor control circuit 721) may identify that a force touch input has occurred. As shown in 1502 of FIG. 15A, in response to the force touch input, the electronic device 101 may identify an icon associated with the position of the identified force touch and may execute an application corresponding to the identified icon.

According to various embodiments, when the at least one second value is smaller than or equal to (or not greater than) the second threshold value Th2, in operation 1406, the electronic device 101 may execute a second operation corresponding to the at least one first value and the at least one second value. For example, the electronic device 101 may determine that a normal touch input has occurred, and may execute an operation corresponding to the normal touch input. As an example, as illustrated in 1511 of FIG. 15A, when the first value associated with the touch of a received user input is greater than the first threshold value Th1 and the second value associated with a pressure is smaller than or equal to (or not greater than) the second threshold value Th2, the electronic device 101 (e.g., the sensor control circuit 721) may identify that a first normal touch input causing a second operation (e.g., a screen capture operation) has occurred. As illustrated in 1512 of FIG. 15A, in response to the first normal touch input, the electronic device 101 may capture the currently displayed screen and may acquire an image file corresponding to the currently displayed screen (1513).

According to various embodiments, the electronic device 101 may compare the at least one first value with the first threshold value Th1 in operation 1403, and when the at least one first value is smaller than or equal to (or not greater than) the first threshold value, the electronic device 101 may compare the at least one second value with the second threshold value Th2 in operation 1407. Since operation 1407 of the electronic device 101 may be executed in the same manner as operation 1404 of the electronic device 101, a redundant description will be omitted. The second threshold value Th2 in operation 1407 of the electronic device 101 may be different from the second threshold value Th2 in operation 1404. For example, for a purpose similar to that described above with reference to FIGS. 12 and 13, in order to more accurately determine whether an input is valid, the electronic device 101 may set the second threshold value Th2 in operation 1407 to be relatively greater than that in the case of operation 1403 (e.g., the operation in the case where the at least one first value related to a touch is smaller than or equal to the first threshold value Th1). In contrast, without being limited to the above description, the second threshold value Th2 in operation 1407 may be set to be relatively smaller than that in operation 1404.

According to various embodiments, when the at least one second value is greater than the second threshold value Th2 as a result of the comparison in operation 1407, the electronic device 101 (e.g., the sensor control circuit 721) may execute a third operation corresponding to the at least one first value and the at least one second value in operation 1408.

For example, the electronic device may identify that a touch input (e.g., a danger input) for inducing a third operation (e.g., an operation of displaying a warning text) has occurred. As an example, as illustrated in 1521 of FIG. 15B, when the first value associated with the touch of a received input (e.g., a value indicating a touch sensitivity) made by an external object is smaller than or equal to (or not greater than) the first threshold value Th1 and the second value associated with a pressure (e.g. a value indicating pressure sensitivity) is greater than the second threshold value Th2, the electronic device 101 (e.g., the sensor control circuit 721) may identify an event as a touch input causing an operation of displaying a warning phrase 1523 has occurred. As illustrated in 1522 of FIG. 15B, the electronic device 101 may display the warning phrase 1523 based on the identified event. As a specific example, when the electronic device 101 collides with another object or when a contact that may damage the electronic device 101 is caused, the electronic device 101 may detect an input in which a touch sensitivity is smaller than or equal to (or not greater than) the first threshold value Th1 and pressure sensitivity is higher than the second threshold value Th2. In this case, the electronic device 101 may display a notification message including the warning phrase 1523 to warn a user of a situation in which the electronic device 101 may be damaged.

In addition, for example, the electronic device may identify that a second normal touch input for causing a fourth operation (e.g., a drawing operation) has occurred. As an example, as illustrated in 1531 of FIG. 15B, when the first value associated with the touch of a received input (e.g., a value indicating a touch area) made by an external object is smaller than or equal to (or not greater than) the first threshold value Th1 and the second value associated with a pressure (e.g. a value indicating pressure sensitivity) is greater than the second threshold value Th2, the electronic device 101 (e.g., the sensor control circuit 721) may identify an event as a second normal touch input causing a drawing operation has occurred. Accordingly, in response to the second normal touch input, the electronic device 101 may display a linear graphic object 1533 at a position corresponding to the moving path of the received input, as illustrated in 1532 of FIG. 15B. For example, when a value associated with a pressure (e.g., a value indicating pressure sensitivity) is greater than the second threshold value Th2, the electronic device 101 may identify the user input received by the electronic device 101 as a force touch or normal touch input that causes the electronic device 101 to execute a specific operation.

According to various embodiments, when the at least one second value is smaller than or equal to (or not greater than) the second threshold value Th2 as a result of comparison in operation 1407, the electronic device 101 (e.g., the sensor control circuit 721) may ignore the input and terminate the operation in operation 1409. For example, the electronic device 101 may identify that an invalid input has occurred. As an example, as illustrated in 1541 of FIG. 15C, when a first value (e.g., a value indicating touch sensitivity) associated with a received touch input (e.g., a value indicating a touch sensitivity) made by an external object smaller than or equal to (or not greater than) the first threshold value Th1 and a second value associated with a pressure (e.g., a value indicating pressure sensitivity) is smaller than or equal to (or not greater than) the second value Th2, the electronic device 101 may identify an event as an invalid input has occurred. As illustrated in 1542 of FIG. 15C, in response to identifying the invalid input, the electronic device 101 may perform control such that an operation corresponding to the received input is not executed (1543).

Hereinafter, another example of operations of an electronic device (e.g., the electronic device 101 in FIG. 1 and the electronic device 200 in FIG. 4) according to various embodiments will be described.

According to various embodiments, the electronic device (e.g., the electronic device 101 in FIG. 1 or the electronic device 200 in FIG. 4) may identify the second value associated with a pressure based on a change, which is caused by the pressure applied by an external object, in resistance values of resistors included in the pressure sensor.

Figure 16:
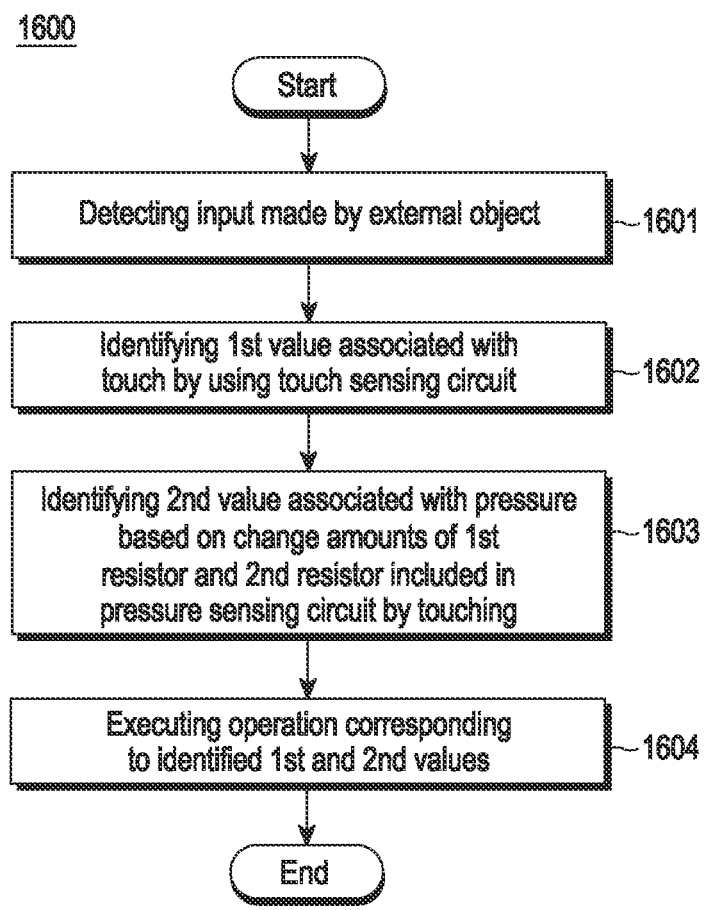
FIG. 16 is a flowchart for describing still another example of operations of an electronic device according to various embodiments.

FIG. 16 is a flowchart 1600 for describing still another example of operations of the electronic device according to various embodiments. According to various embodiments, the operations illustrated in FIG. 16 are not limited to the illustrated order, and may be executed in various orders. In addition, according to various embodiments, a greater or smaller number of operations compared to the operations illustrated in FIG. 16 may be executed. Hereinafter, FIG. 16 will be described with reference to FIG. 17.

Figure 17:
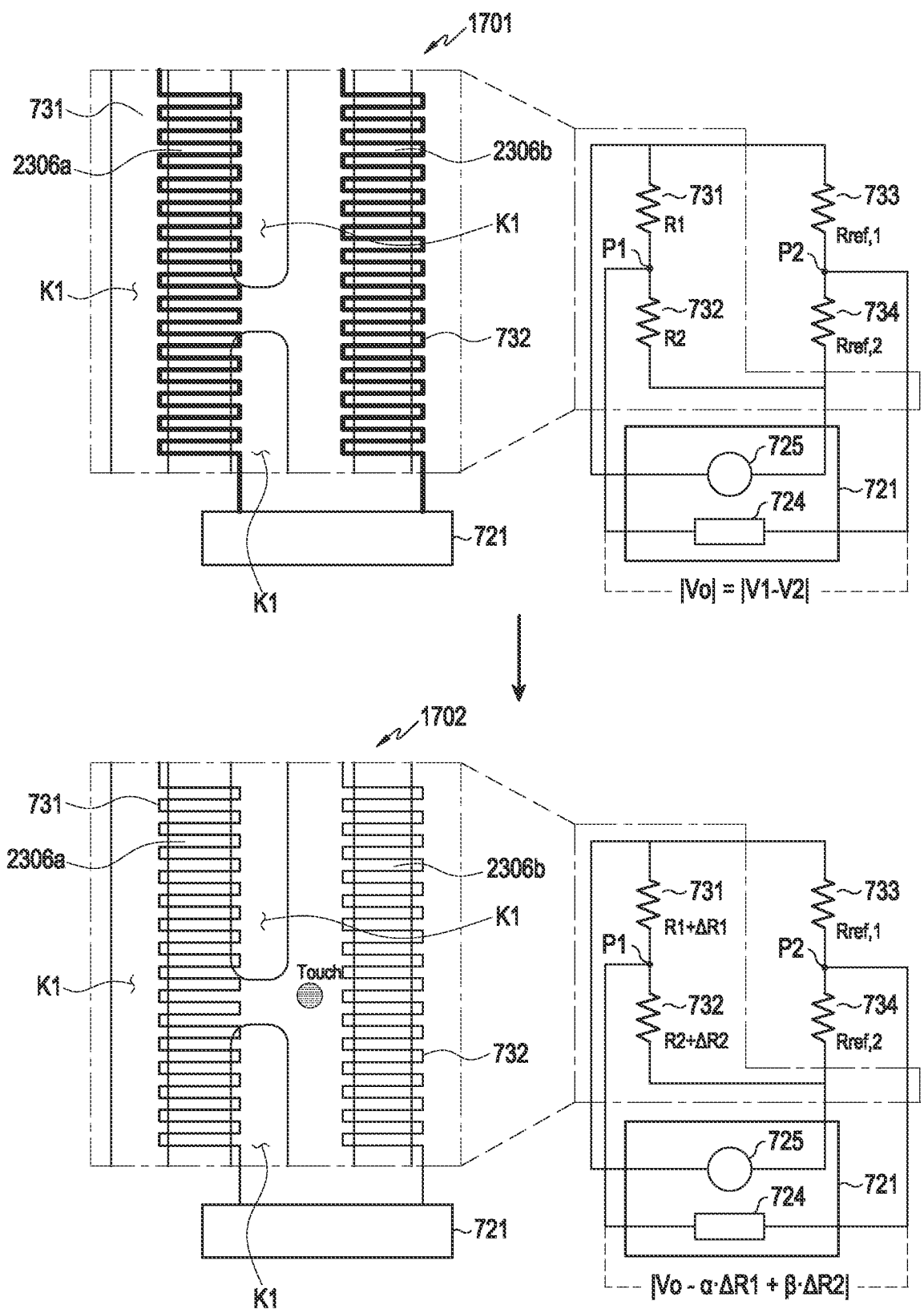
FIG. 17 is a view for describing an example of an operation of identifying a second value associated with pressure based on a change in resistance values of resistors included in a pressure sensor of an electronic device according to various embodiments.

FIG. 17 is a view for describing an example of an operation of identifying a second value associated with a pressure based on a change in resistance values of resistors included in a pressure sensor of an electronic device according to various embodiments.

According to various embodiments, an electronic device 101 (e.g., the sensor control circuit 721) may detect an input made by an external object in operation 1601. For example, the electronic device 101 may receive an input made by a portion of a user's body on the folding area 231c. Since operation 1601 of the electronic device 101 may be executed in the same manner as the above-described operations 1001, 1201 and 1401 of the electronic device 101, a redundant description will be omitted.

According to various embodiments, the electronic device 101 (e.g., the sensor control circuit 721) may identify the first value associated with a touch by using the touch sensor 711 in operation 1602. For example, the sensor control circuit 721 may identify an electrical value output from the touch sensor 711, and may identify at least one value indicating a characteristic associated with a touch corresponding to the identified electrical value. Since operation 1602 of the electronic device 101 may be executed in the same manner as operation 1002 of the electronic device 101 and operation 1202 of the electronic device 101 described above, a redundant description will be omitted.

According to various embodiments, the electronic device 101 (e.g., the sensor control circuit 721) may identify the second value associated with a pressure based on change amounts, which are caused by a touch, in operation 1603 in the first resistor 731 and the second resistor 732 included in the pressure sensor 712. For example, when the sensor control circuit 721 receives a user's touch on the folding area 231c, the sensor control circuit 721 may identify a value indicating a characteristic associated with a pressure (e.g., pressure sensitivity) based on change amounts caused by the user's touch in the first resistor 731 and the second resistor 732 included in the pressure sensor 712.

According to various embodiments, as illustrated in 1701 of FIG. 17, the power generator 725 (e.g., a voltage or current generator) included in the sensor control circuit 721 may be connected to one end of each of the first resistor 731, which is disposed on the bendable portion 2306-3, and the second fixed resistor 734, which is disposed such that the shape thereof is not deformed by a user input, among the plurality of resistors included in the pressure sensor 712. The power generator 725 may apply power through each end. The measuring instrument 724 included in the sensor control circuit 721 may be connected in parallel or series to a first point P1 between the first resistor 731 and the second resistor 732 and a second point P2 between the first fixed resistor 733 and the second fixed resistor 734, and may identify a voltage value (an output voltage value) generated between the first point P1 and the second point P2 by the applied power (e.g., $|V_o = V_1 - V_2|$, where V1 is a voltage value or potential at the first point P1, V2 is a voltage value or potential at the second point P2) or a current value (an output current value) flowing between the first point P1 and the second point P2. In this case, as illustrated in 1701 of FIG. 17, when the user's touch is not received, based on the fact that the resistance values of the resistors are equal to each other or the relationship of $|R_1 \times R_{ref,2}| = |R_2 \times R_{ref,1}|$, the voltage value between the first point P1 and the second point P2 or the current value flowing between the first point P1 and the second point P2 may be detected by the measuring instrument 724 as zero or a specific value (e.g., a value close to zero). As illustrated in 1702 of FIG. 17, when a user input is received, the resistance value R1 of the first resistor 731 is changed by a first resistance change amount and the resistance value R2 of the second resistor 732 is changed by a second resistor change amount. Accordingly, the voltage value or current value between the first point P1 and the second point P2 is changed (e.g., increased) to a non-zero value. Thus, the sensor control circuit 721 (e.g., the measuring instrument 724) may identify the changed voltage value between the first point P1 and the second point P2 or the changed current value between the first point P1 and the second point P2, and may identify a value indicating a characteristic associated with a pressure (e.g., pressure sensitivity) corresponding to the identified electrical value (e.g., the voltage value or the current value). As an example, the potential at the first point P1 is changed from V1 to V1−α:ΔR1+β·ΔR2 (where α and β are proportional constants or variables) based on the change amount in the first resistor 731 and the change amount in the second resistor 732, and the potential of the second point P2 is maintained at V0. As a result, the voltage value (e.g., the output voltage value) between the first point P1 and the second point P2 is changed from |Vo| to |Vo−α:ΔR1+β·ΔR2|. For example, the voltage value between the first point P1 and the second point P2 may be changed in proportion to |β·66 R2−α·ΔR1|. In this case, since the proportion of the second resistor 732 disposed on the openings K1 is greater than the proportion of the first resistor 731 disposed on the openings K1, the shape of the second resistor 732 is more changed than that of the first resistor 731 by a user input. Thus, since the second resistor change amount becomes larger than the first resistor change amount, the output voltage value measured by the measuring instrument increases. Similarly, since the voltage value between the first point P1 and the second point P2 is increased, the current value between the first point P1 and the second point P2 and measured by the measuring instrument is increased. As a result, based on the fact that the second resistance change amount of the second resistor 732 disposed on the openings K1 is greater than the first resistance change amount of the first resistor 731, the electronic device 101 may identify an electrical value (e.g., a voltage value or a current value) generated by the pressure of a user input or a change in the electrical value.

When only a single resistor is disposed (e.g., only the second resistor 732 is disposed) on the bendable portion 2306-3, a resistance change in the disposed resistor may be caused by a temperature (e.g., a body temperature) generated by a user input. Accordingly, since an error is generated in the voltage value identified by the resistance change amount due to the temperature, the value associated with the pressure of the input may not be accurately identified. However, as described above, when the first resistor 731 is disposed on the conductive plate 2306 and the second resistor 732 is disposed on the openings K1, resistance change amounts are caused in the first resistor 731 and the second resistor 732 by substantially the same temperature, and the change in output voltage values based on respective resistance change amounts may be canceled each other (due the change by |β·ΔR2−α·ΔR1|). Accordingly, a value associated with the pressure of an input may be more accurately identified.

In addition, when the first resistor 731 and the second resistor 732 are both disposed on the support area 2306a or both disposed on the openings K1 (or the spatial area 2306b), no difference or a slight difference is caused by a user input between the change amount in the first resistor 731 and the change amount in the second resistor 732. Thus, since the output voltage value detected from the pressure sensor 712 when receiving the user input is small or the change of voltage is small, it may be difficult to identify a value associated with the user input (e.g., a value indicating pressure sensitivity). In other words, as described above, by disposing the first resistor 731 on the conductive plate 2306 and disposing the second resistor 732 on the openings K1, the output voltage value detected from the pressure sensor 712 is greatly changed, and thus a value associated with the pressure of the user input (e.g., a value indicating pressure sensitivity) may be more easily identified.

According to various embodiments, in operation 1604, the electronic device 101 (e.g., the sensor control circuit 721) may execute at least one operation corresponding to the identified first value and second values. For example, the electronic device 101 may execute an operation corresponding to a value indicating a characteristic associated with a touch (e.g., a value indicating a touch sensitivity) and a value indicating a characteristic associated with a pressure (e.g., a value indicating pressure sensitivity). Since operation 1604 of the electronic device 101 may be executed in the same manner as the above-described operations 1004, 1205, 1405, 1406, 1408, and 1409 of the electronic device 101, a redundant description will be omitted.

Hereinafter, still another example of operations of an electronic device (e.g., the electronic device 101 in FIG. 1 or the electronic device 200 in FIG. 4) according to various embodiments will be described.

According to various embodiments, when the folding state is changed, an electronic device (e.g., the electronic device 101 of FIG. 1 or the electronic device 200 of FIG. 4) may initiate a value associated with a pressure generated by the changed folding state, so that it is possible to accurately identify whether an input received by the folding area is valid.

Figure 18A:
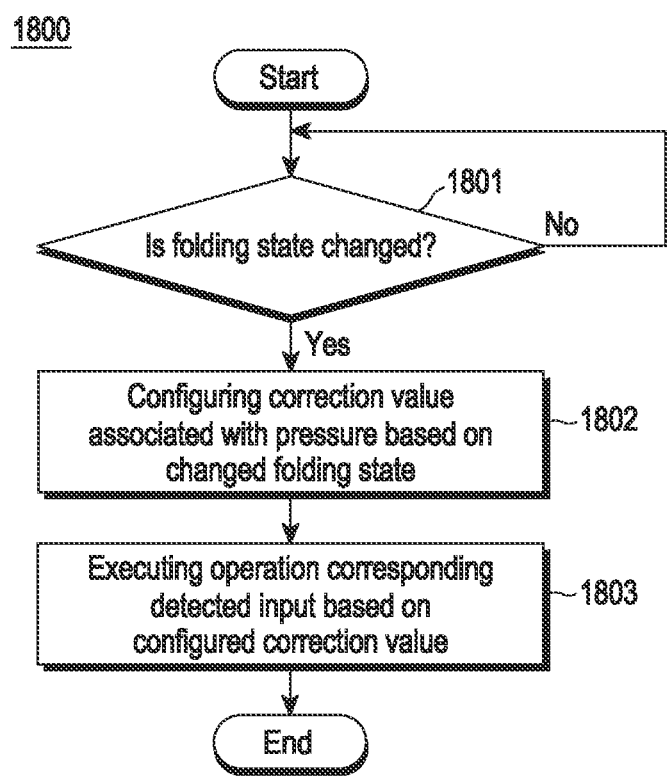
FIG. 18A is a flowchart for describing still another example of operations of an electronic device according to various embodiments.
Figure 18B:
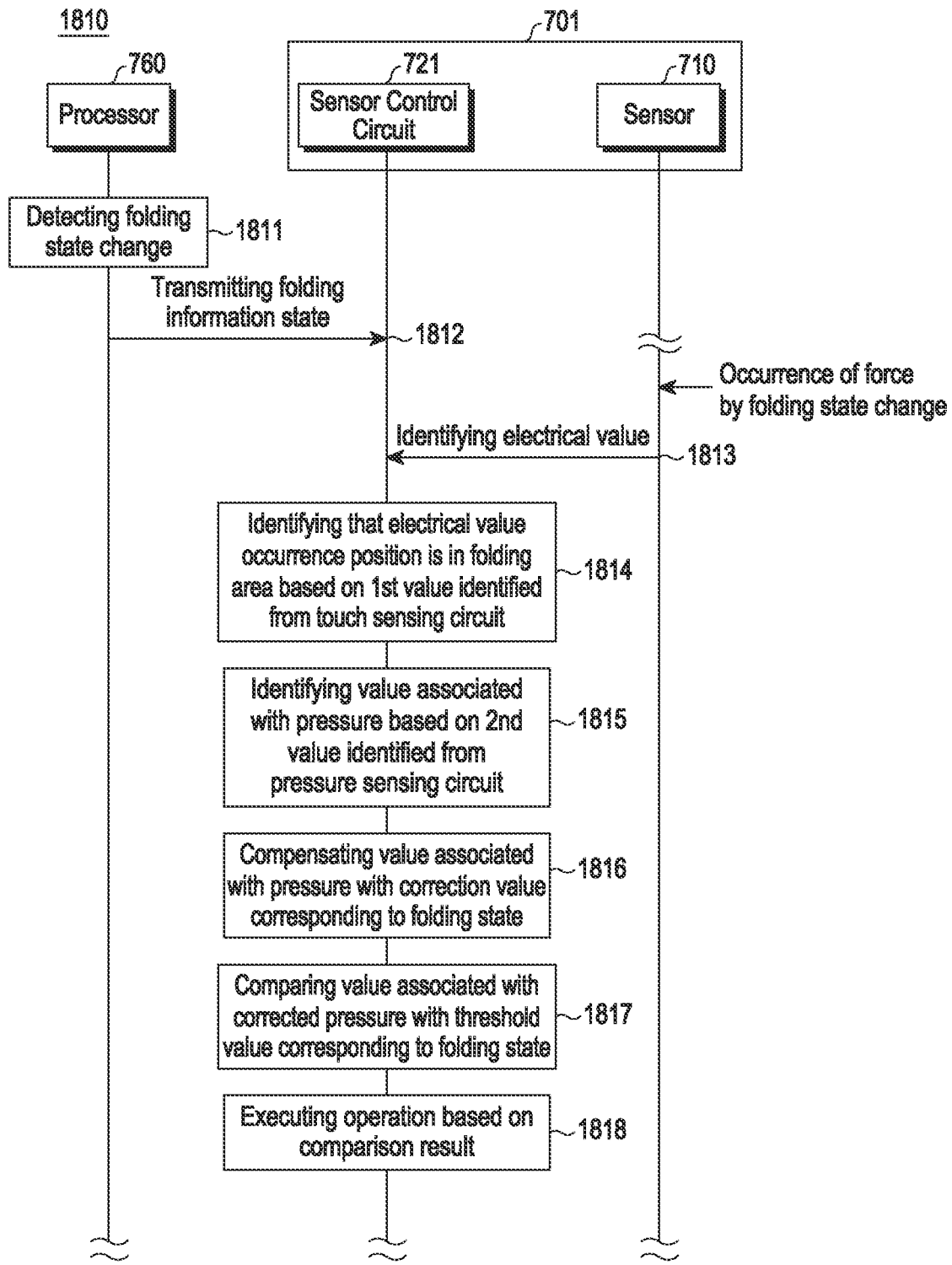
FIG. 18B is a flowchart for describing an example of operations of a processor, a sensor control circuit, and a sensing circuit included in an electronic device according to various embodiments.

FIG. 18A is a flowchart 1800 for describing still another example of operations of the electronic device according to various embodiments. FIG. 18B is a flowchart 1810 for describing an example of operations of a processor, a sensor control circuit, and a sensing circuit included in an electronic device according to various embodiments. According to various embodiments, the operations illustrated in FIGS. 18A and 18B are not limited to the illustrated order, and may be executed in various orders. In addition, according to various embodiments, a greater or smaller number of operations compared to the operations illustrated in FIGS. 18A and 18B may be executed. Hereinafter, FIGS. 18A and 18B will be described with reference to FIG. 19.

Figure 19:
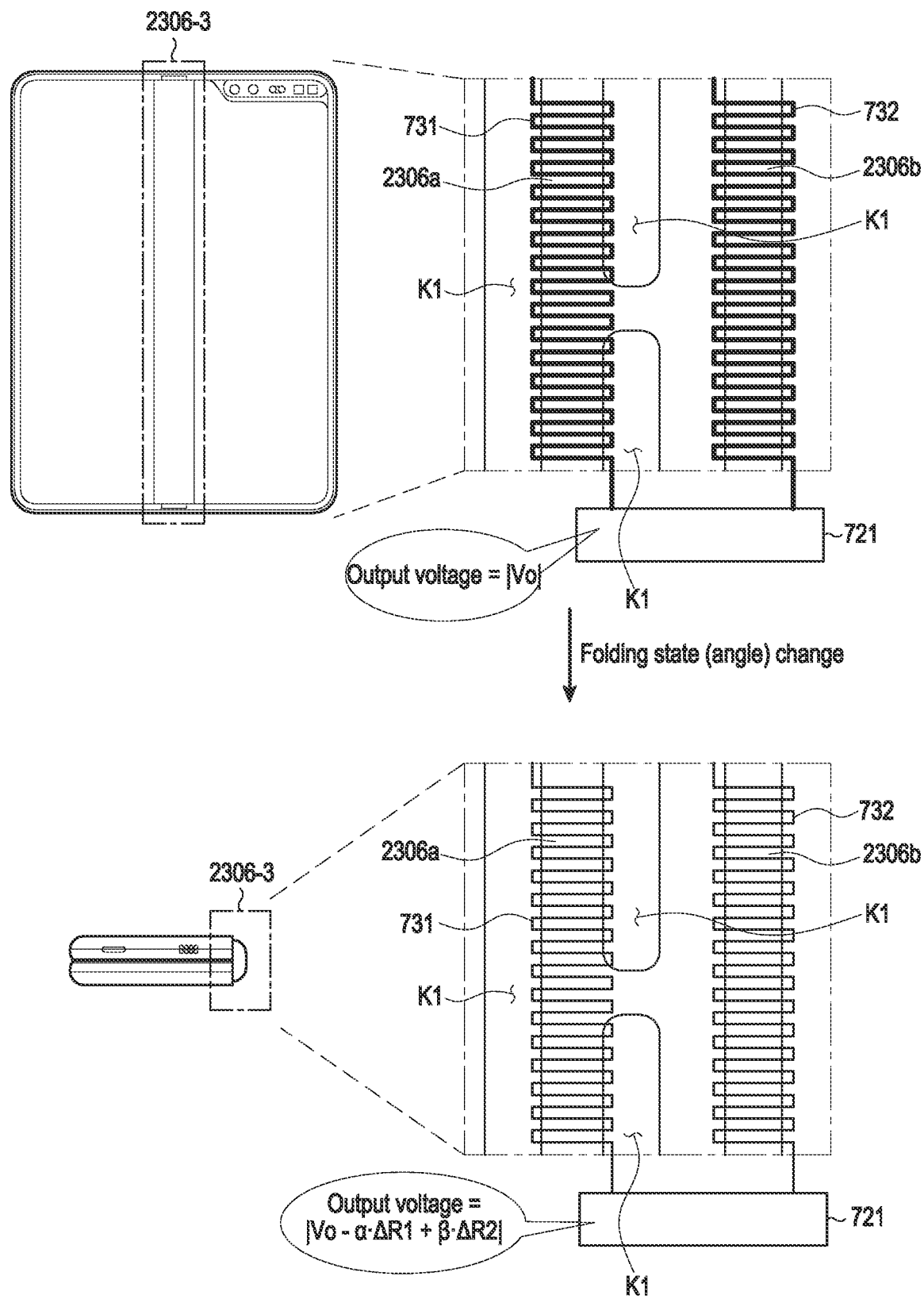
FIG. 19 is a view for describing an operation of configuring a threshold value associated with a folding area when the folding state of an electronic device according to various embodiments is changed.

FIG. 19 is a view for describing an operation of configuring a threshold value associated with a folding area when the folding state of an electronic device according to various embodiments is changed.

According to various embodiments, in operation 1801, the electronic device 101 (e.g., the sensor control circuit 721) may identify whether the folding state of the electronic device 101 is changed. The folding state may include at least one of whether the first housing structure 210 and the second housing structure 220 included in the electronic device 101 are in contact with each other (or state) (e.g., whether the electronic device is in the unfolded state (flat state or open state), in the folded state, or in the intermediate state), the angle between the first housing structure 210 and the second housing structure 220, or an angle range. The electronic device 101 may identify the contact state between the first housing structure 210 and the second housing structure 220 by using a Hall sensor included in the electronic device 101, or may identify the angle between the first housing structure 210 and the second housing structure 220 rotated about the rotation axis with the hinge structure 264 by using a gyro sensor or the like.

According to various embodiments, when detecting a change in the folding state in operation 1811 of FIG. 18B, the processor 760 of the electronic device 101 may transmit folding state information indicating the changed folding state in operation 1812 to the sensor control circuit 721. For example, as described above, the processor 760 may determine whether there is folding based on data from a sensor capable of detecting folding (e.g., a Hall sensor). The folding state information is information indicating whether the first housing structure 210 and the second housing structure 220 are in contact with each other (or state), information indicating the angle between the first housing structure 210 and the second housing structure 220, or information indicating an angle range. For example, the folding state information may include information indicating a closed state or folded state corresponding to the state in which the first housing structure 210 and the second housing structure 220 are in contact with each other, information indicating an unfolded state/an open state corresponding to the state in which the first housing structure 210 and the second housing structure 220 is not in contact with each other (e.g., the angle between the first and second housing structures is about 180 degrees), or information indicating the state in which the first housing structure 210 and the second housing structure 220 form an acute and/or obtuse angle therebetween (a half-folded state or an unfolded state). For example, the folding state information may include information indicating an angle value between the first housing structure 210 and the second housing structure 220 sensed by the processor 760.

According to various embodiments, in operation 1802, the electronic device 101 (e.g., the sensor control circuit 721) may set a correction value (an offset value) associated with a pressure based on the changed folding state, and in operation 1803, the electronic device 101 may execute an operation corresponding to an input detected based on the set correction value (e.g., the offset value). Referring to FIG. 19, as the folding state of the electronic device 101 is changed, the shapes of resistors (e.g., the first resistor 731 and the second resistor 732) disposed on the bendable portion 2306-3 are changed (e.g., the lengths of the resistors are changed or the cross-sectional areas of the resistors are changed), whereby the resistance values of the resistors are changeable (e.g., R1 and R2). In this case, based on the changed resistance values, the sensor control circuit 721 may identify a change in an electrical value identified from the pressure sensor 712 (e.g., the output voltage value is changed in proportion to $|\beta \cdot \Delta R2 - \alpha \cdot \Delta R1|$, where $\alpha$ and $\beta$ are proportional constants or variables), and may identify a value associated with a pressure (e.g., a value indicating pressure sensitivity) corresponding to the identified electrical value. Accordingly, when a user input is not received but the folding state of the electronic device 101 is changed, a predetermined input (e.g., the above-mentioned force touch input, or the above-mentioned second normal touch) made by a user may be misidentified by the sensor control circuit 721 as being received by the electronic device 101. The electronic device 101 may pre-store or pre-configure an offset for correcting a value associated with a pressure for each folding state so that a malfunction of the electronic device 101 is not performed due to a misidentified value associated with a pressure for each folding state. The offset value may be set to a value generated according to a folding state and may have, for example, the same unit as a value associated with a pressure. When corrected by an offset value corresponding to a corresponding folding state, a value associated with a pressure may be corrected to a default value (e.g., 0 or a value close to 0). Accordingly, the electronic device 101 may compensate for the value associated with a misidentified pressure with an offset value by preventing an electrical value (e.g., an output voltage value) identified from the pressure sensor 712 by a change of the folding state from being identified as a valid input (e.g., a force touch input or a second normal touch input).

According to various embodiments, when a force is generated in the folding area 231c by a change of the folding state, the sensor control circuit 721 may identify at least one electrical value from the touch sensor 711 and the pressure sensor 712 disposed in the area corresponding to the folding area 231c as in operation 1813 of FIG. 18B. The sensor control circuit 721 may identify that the electric value is generated in the folding area 231c based on a first value identified from the touch sensor 711 in operation 1814. As an example, the sensor control circuit 721 may identify the position where the input has occurred by identifying an electrode connected to the touch sensor 711 that returns an electrical value in response to the application of power. The sensor control circuit 721 may identify a value associated with a pressure (e.g., a value indicating pressure sensitivity) based on a second value identified from the pressure sensor 712 in operation 1815, and may compensate for the value associated with the pressure with the correction value (e.g., an offset value) corresponding to the folding state in operation 1816. For example, in order to remove a value associated with the pressure identified by the change of the folding state, the sensor control circuit 721 may subtract a pre-stored offset value corresponding to the currently changed folding state from the value associated with the pressure (e.g., value associated with pressure—offset value). As an example, when the foldable electronic device 101 is in a closed state (or a folded state), in order to remove a value (e.g., 1) associated with the pressure identified by using the pressure sensor 712 disposed in the bendable portion 2306-3, the sensor control circuit 721 may subtract an offset value (e.g., 1) from the value associated with the identified pressure. The sensor control circuit 721 may compare a threshold value with the corrected value associated with the pressure in operation 1817, and executed an operation based on the comparison result in operation 1818. For example, the sensor control circuit 721 may compare the value associated with the corrected pressure with the threshold value. For example, the threshold value may be a value set to determine whether the detected input is an invalid input or whether the detected input is a force touch input as described above with reference to FIGS. 15A to FIG. 15C. That is, as an example, when the value associated with the corrected pressure is smaller than or equal to the threshold value, the sensor control circuit 721 may determine (or identify an event) that the input detected by the folding state change is an invalid input described in FIG. 15C. As another example, the sensor control circuit 721 may not identify that the force touch input described above with reference to FIG. 15A has not occurred. In response to the fact that an invalid input is identified, the sensor control circuit 721 may not transmit information associated with the corresponding input such that the input identified by the processor 760 is not processed. Accordingly, the malfunction of the electronic device 101 according to the change of the folding state may be prevented in advance. Without being limited thereto, some operations of the sensor control circuit 721 may be performed by the processor 760. For example, operation 1814 and operations 1816 to 1818 may be executed by the processor 760. That is, the sensor control circuit 721 may transmit a value associated with a touch (e.g., a value indicating a touch sensitivity) and a value associated with a pressure (e.g., a value indicating pressure sensitivity) to the processor 760, and when the processor 760 identifies that the current input is positioned in the folding area 231*c*, the sensor control circuit 721 may execute an operation of compensating for the value associated with the pressure with the offset value corresponding to the folding state and determining whether the input is valid. According to various embodiments, the electronic device 101 (e.g., the sensor control circuit 721) may store and identify offset values corresponding to a plurality of folding states, respectively. For example, the electronic device 101 may stores different offset values for each of whether the first housing structure 210 and the second housing structure 220 are in contact with each other, an angle range between the first housing structure 210 and the second housing structure 220, and an angle between the first housing structure 210 and the second housing structure 220, and may identify whether a value associated with an identified pressure is valid. For example, the offset value corresponding to a state in which the first housing structure 210 and the second housing structure are in contact with each other (e.g., a folded state) may be different from that corresponding to a state in which the first housing structure 210 and the second housing structure 220 are not in contact with each other (e.g., an unfolded state/open state) (for example, the offset value may be small in the unfolded state/open state). As another example, considering that, as the angle between the first housing structure 210 and the second housing structure 220 is smaller, the second resistor 732 included in the pressure sensor 712 is more deformed and the resistance of the second resistor 732 is more changed, offset values may be pre-stored in the electronic device 101 to correspond to a plurality of folding states, respectively, so that the smaller the angle or angle range between the first housing structure 210 and the second housing structure 220, the greater the offset value is set. However, this is merely an example.

According to various embodiments, without being limited to the above description, the electronic device 101 (e.g., the sensor control circuit 721) may execute an operation of determining whether an input is valid by adjusting the threshold value to be compared to an identified pressure without correcting the value associated with the identified pressure with an offset value. In other words, the electronic device 101 (e.g., the sensor control circuit 721) may adjust the threshold value in order to prevent misidentification of pressure due to a value associated with the pressure generated by the changed folding state (e.g., the folded state) when the folding state is changed. For example, the electronic device 101 (e.g., the sensor control circuit 721) may set different threshold values for respective folding states (e.g., a folded state and an unfolded state). For example, for an unfolded state, the electronic device 101 (e.g., the sensor control circuit 721) may set a first threshold value to be compared with a value associated with a pressure to be identified, and for a folded state, the electronic device 101 may set a second threshold value greater than the first threshold value in order to prevent the identification of a value (e.g., 1) associated with a pressure to be identified by using the pressure sensor 712 disposed in the bendable portion 2306-3 by the folded state. For example, the second threshold value may be greater than the first threshold value by a value (e.g., 1) associated with a pressure to be identified by using the pressure sensor 712 by the folded state. The electronic device 101 may store different threshold values for respective folding states (e.g., a folded state and an unfolded state) and when comparing a value associated with a pressure with a threshold value, the electronic device 101 may use a corresponding threshold value for each identified folding state.

Hereinafter, still another example of operations of an electronic device (e.g., the electronic device 101 in FIG. 1 or the electronic device 200 in FIG. 4) according to various embodiments will be described.

According to various embodiments, when the folding state is changed, the electronic device (e.g., the electronic device 101 in FIG. 1 or the electronic device 200 in FIG. 4) may reset the threshold value to be compared with the pressure associated with the folding area so as to make it possible to accurately identify whether an input is valid from the folding area.

Figure 20A:
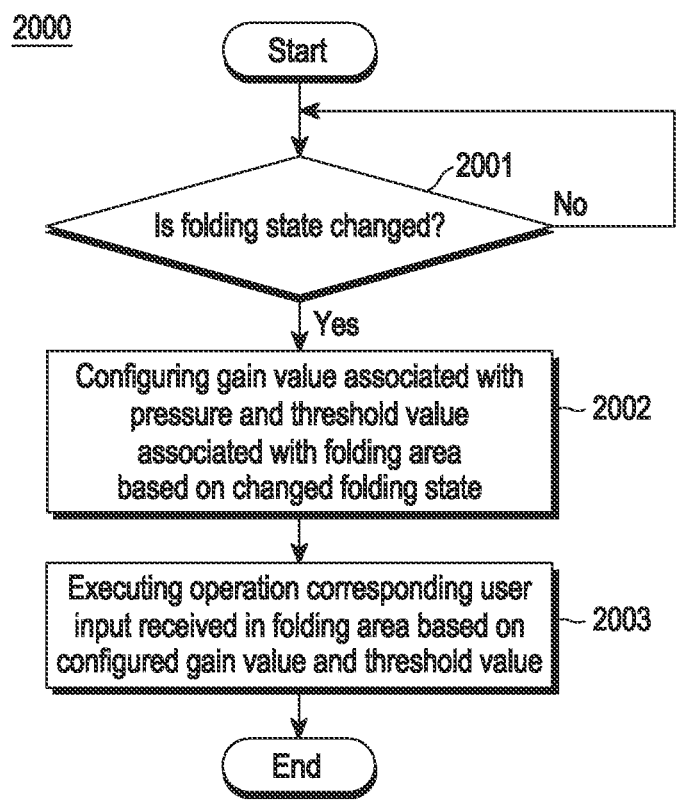
FIG. 20A is a flowchart for describing still another example of operations of an electronic device according to various embodiments.
Figure 20B:
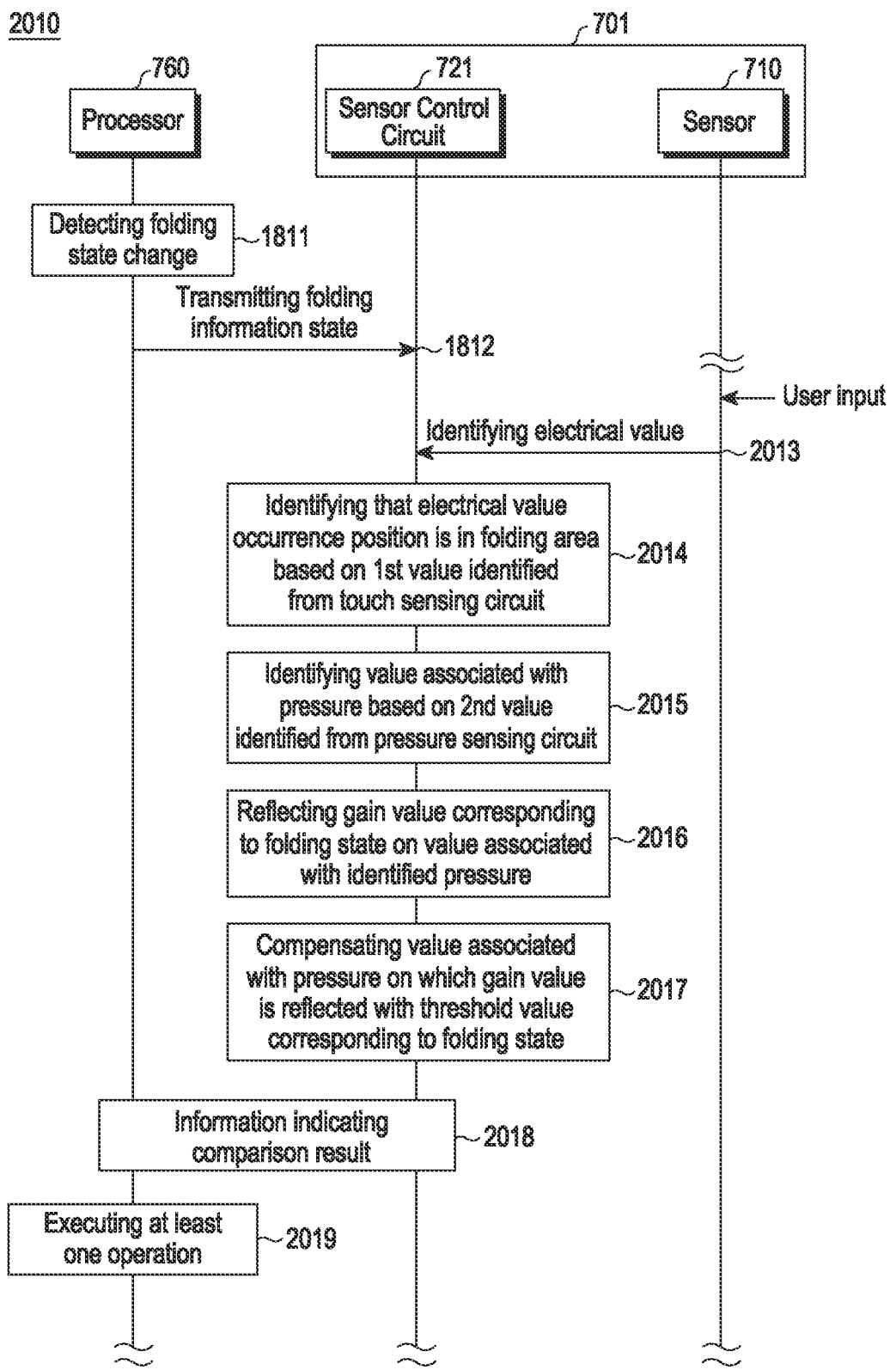
FIG. 20B is a flowchart for describing an example of operations of a processor, a sensor control circuit, and a sensing circuit included in an electronic device according to various embodiments.

FIG. 20A is a flowchart 2000 for describing still another example of operations of the electronic device according to various embodiments. FIG. 20B is a flowchart 2010 for describing an example of operations of a processor, a sensor control circuit, and a sensing circuit included in an electronic device according to various embodiments. According to various embodiments, the operations illustrated in FIGS. 20A and 20B are not limited to the illustrated order, and may be executed in various orders. In addition, according to various embodiments, a greater or smaller number of operations compared to the operations illustrated in FIGS. 20A and 20B may be executed. Hereinafter, FIGS. 20A and 20B will be described with reference to FIG. 21.

Figure 21A:
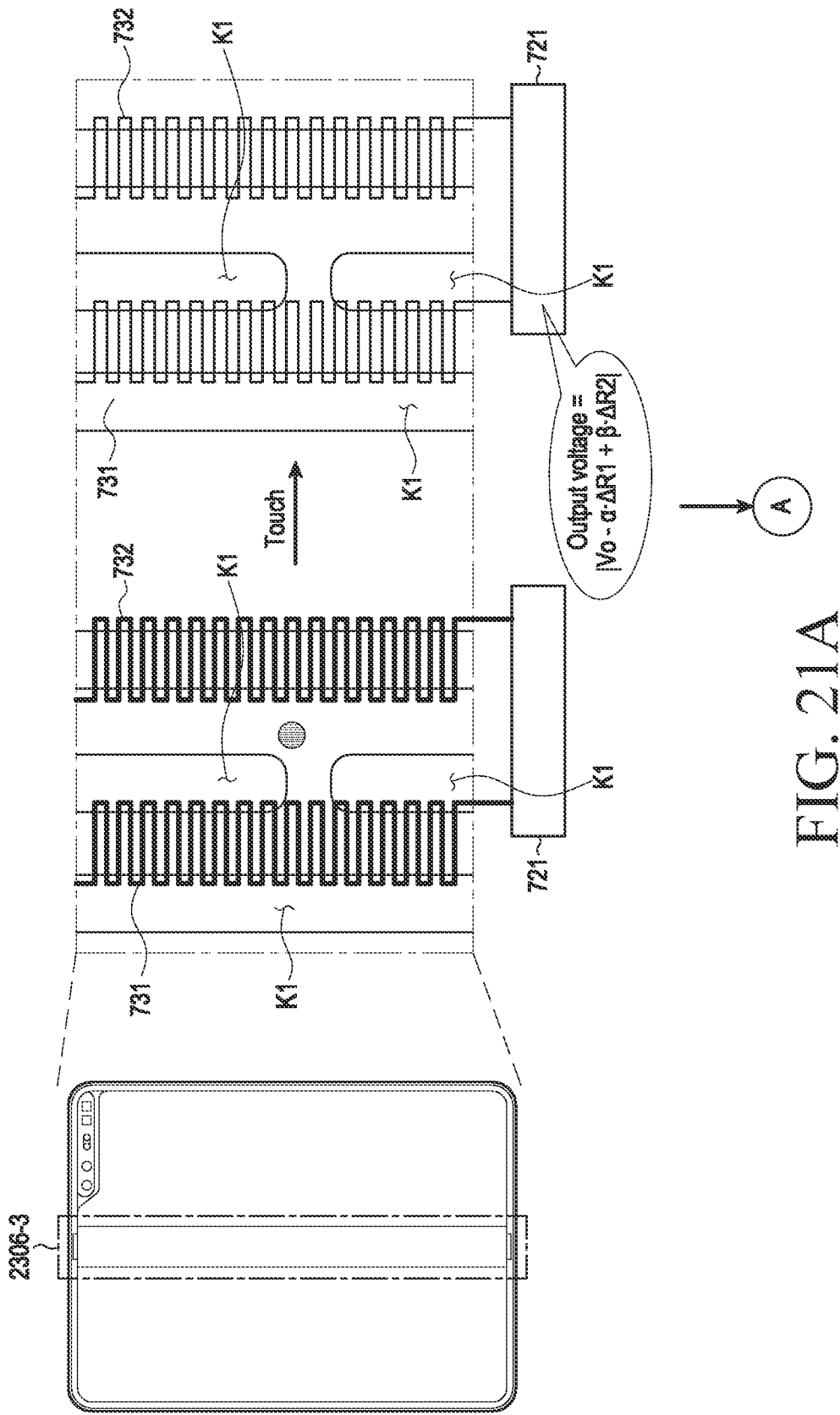
FIG. 21A is a view for describing an operation of configuring a gain value or a threshold value when the folding state of an electronic device according to various embodiments is changed.
Figure 21B:
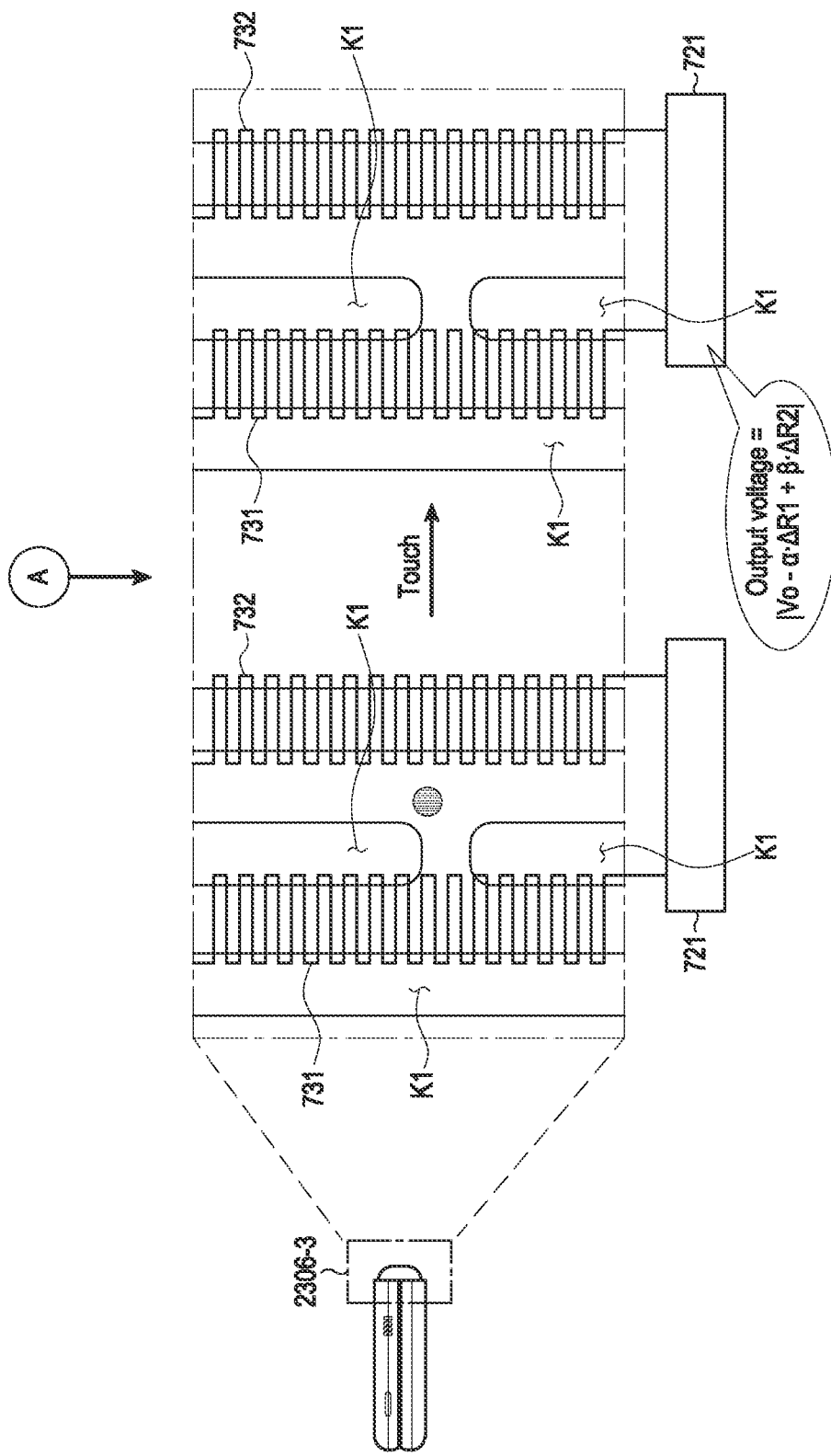
FIG. 21B is a view for describing an operation of configuring a gain value or a threshold value when the folding state of an electronic device according to various embodiments is changed.

FIG. 21A is a view for describing an operation of configuring a gain value or a threshold value when the folding state of an electronic device according to various embodiments is changed. FIG. 21B is a view for describing an operation of configuring a gain value or a threshold value when the folding state of an electronic device according to various embodiments is changed.

According to various embodiments, in operation 2001, the electronic device 101 (e.g., the sensor control circuit 721) may identify whether the folding state of the electronic device 101 is changed. Since operation 2001 of the electronic device 101 may be executed in the same manner as the above-described operation 1801 of the electronic device 101, a redundant description will be omitted.

According to various embodiments, when detecting a change in the folding state in operation 2011 of FIG. 20B, the processor 760 of the electronic device 101 may transmit folding state information indicating the changed folding state in operation 2012 to the sensor control circuit 721. Since operations 2011 and 2012 may be executed in the same manner as above-described operations 1811 and 1812, a redundant description will be omitted.

According to various embodiments, in operation 2002, the electronic device 101 (e.g., the sensor control circuit 721) may set a gain value or a threshold value associated with a pressure based on the changed folding state, and in operation 2003, the electronic device 101 may execute an operation corresponding to a user input received in the folding area based on the set gain value and threshold value. Referring to FIG. 19, the amount by which a resistor disposed in the bendable portion 2306-3 is changed by a user input may vary depending on the folding state (e.g., whether the first housing structure 210 and the second housing structure 220 are in contact with each other). Accordingly, for the same input received on the folding area, the electrical values identified from the pressure sensor 712 may be different for respective folding states. As a result, for the same input received on the folding area, the sensor control circuit 721 may identify values associated with different pressures for respective folding states. For example, referring to FIGS. 21A and 21B, compared to the resistors included in the pressure sensor 712 disposed at a position corresponding to the folding area when the angle between the first housing structure 210 and the second housing structure 220 is a first angle (e.g., about 180°), the resistors (e.g., the first resistor 731 and the second resistor 732) included in the bendable portion 2306-3 may be more deformed in shape when the angle between the first housing structure 210 and the second housing structure 220 is a second angle (e.g., out-folded to about 0° to about 360°). For example, compared to the case where the angle between the first housing structure 210 and the second housing structure 220 is a first angle (e.g., about 180°) as illustrated in FIG. 21A, when the angle between the first housing structure 210 and the second housing structure 220 is a second angle (e.g., out-folded to about 0° to about 360°) as illustrated in FIG. 21B, the resistance change amount of the second resistor 732 deformed by an input is small so that the electrical value identified by the sensor control circuit 721 may be smaller. Accordingly, in order to ensure that the electronic device 101 executes substantially the same operation in response to the same input for each folding state, the electronic device 101 may execute at least one of an operation of compensating for a value associated with the pressure with a gain value associated with the folding state (e.g., reflecting the gain value on the pressure sensitivity in the case of a folding state where the resistance change amount is small) or configuring a threshold value associated with the pressure corresponding to the folding state (e.g., lowering the threshold value in the case of a folding state where the resistance change amount is small). Hereinafter, it is described that both the operation of compensating with a gain value and the operation of configuring a threshold value are executed, but this is merely an example. At least one of an operation of compensating for a value associated with the pressure with a gain value associated with the folding state or an operation of configuring a threshold value associated with the pressure corresponding to the folding state may be executed.

For example, when a user input is received in the folding area, as in operation 2013 in FIG. 20B, the sensor control circuit 721 may identify at least one electrical value from the touch sensor 711 and the pressure sensor 712 disposed in the area corresponding to the folding area. In operation 2014, the sensor control circuit 721 may identify that the electrical value is generated in the folding area based on a first value identified from the touch sensor 711. In operation 2015, the sensor control circuit 721 may identify a value associated with the pressure (e.g., a value indicating pressure sensitivity) based on a second value identified from the pressure sensor 712, and in operation 2016, the sensor control circuit may reflect (e.g., multiplying or adding) a gain value corresponding to the folding state on the value associated with the identified pressure. When the electronic device 101 is in a folding state in which a resistance change amount is small and thus a value associated with a small pressure (e.g., pressure sensitivity) is identified, the electronic device 101 may reflect a larger gain value on the value associated with the pressure. For example, in the unfolded state/open state, the electronic device 101 may reflect a first gain value to the identified pressure sensitivity, and in the folded state, the electronic device 101 may reflect a second gain value smaller than the first gain value in the identified pressure sensitivity. In operation 2016, the sensor control circuit 721 may compare the threshold value corresponding to the folding state with the value associated with the pressure on which the gain value is reflected. When the sensor control circuit 721 is in a folding state in which a resistance change amount is small and thus a value associated with a small pressure (e.g., pressure sensitivity) is identified, the sensor control circuit 721 may set a threshold value for identifying the force touch input described above with reference to FIG. 15A or the second normal touch described above with reference to FIG. 15B to a relatively lower value. As an example, in the unfolded state/open state, the sensor control circuit 721, the sensor control circuit 721 may set a first threshold value to identify a force touch, and in the folded state, the sensor control circuit 721 may reflect a second threshold value smaller than the first threshold value in order to identify the force touch. This is an example, and without executing the operation of reflecting a gain value as described above, the sensor control circuit 721 may execute the operation of comparing a value associated with the identified pressure (e.g., a value indicating pressure sensitivity) with a threshold value set depending on the folding state. Based on the comparison result in operation 2017, the sensor control circuit 721 may transmit information indicating the comparison result. The information indicating the comparison result may include information indicating an event corresponding to an input (e.g., information indicating that a received input is a force touch). For example, the sensor control circuit 721 may transmit information indicating the comparison result to the processor 760 (operation 2018) or may execute at least one operation (e.g., the operations in FIG. 15A) in response to the event corresponding to the input. For example, in operation 2019, the processor 760 may execute at least one operation (e.g., the operations in FIG. 15A) in response to the event corresponding to the input. Meanwhile, without being limited thereto, some operations of the sensor control circuit 721 may be performed by the processor 760. For example, operation 2014 and operations 2016 to 2017 may be executed by the processor 760. That is, the sensor control circuit 721 may transmit a value associated with a touch (e.g., a value indicating a touch sensitivity) and a value associated with a pressure (e.g., a value indicating pressure sensitivity) to the processor 760, and when the processor 760 identifies that the current input is positioned in the folding area, the sensor control circuit 721 may execute an operation of determining the event of the input by comparing the threshold value corresponding to the folding state with the value associated with the pressure.

According to various embodiments, the electronic device 101 (e.g., the sensor control circuit 721) may store and identify gain values and/or threshold values corresponding to a plurality of folding states, respectively. For example, the electronic device 101 may stores different gain values and/or threshold values for each of whether the first housing structure 210 and the second housing structure 220 are in contact with each other, an angle range between the first housing structure 210 and the second housing structure 220, and an angle between the first housing structure 210 and the second housing structure 220.

For example, as described above, the gain value or the threshold value corresponding to a state in which the first housing structure 210 and the second housing structure are in contact with each other (e.g., a folded state) may be different from that corresponding to a state in which the first housing structure 210 and the second housing structure 220 are not in contact with each other (e.g., an unfolded state/ open state) (for example, the gain value may be smaller or the threshold value may be greater in the unfolded state/open state). As another example, considering that, as the angle between the first housing structure 210 and the second housing structure 220 is smaller, the second resistor 732 included in the pressure sensor 712 is more deformed and the resistance change amount of the second resistor 732 is reduced, offset values may be pre-stored in the electronic device 101 to correspond to a plurality of folding states, respectively, so that the smaller the angle or angle range between the first housing structure 210 and the second housing structure 220, the greater the gain value is set or the smaller the threshold value is set. However, this is merely an example.

According to various embodiments, the electronic device 101 (e.g., the sensor control circuit 721) may sequentially execute the above-described operations of adjusting a value associated with a pressure with an offset value or a gain value. For example, the electronic device 101 may subtract an offset value from a value associated with a pressure, and may identify a value compensated for by multiplying the subtracted result value by a gain value (e.g., pressure sensitivity−offset value→gain value*(pressure sensitivity−offset value)→gain value*(pressure sensitivity−offset value) >threshold value?). For example, when a value associated with a sensed pressure is a value identified when the electronic device is folded, the value may be subtracted by the offset value and become 0. Since the corrected value becomes 0, even if the gain value is multiplied, the resultant value is 0. Thus, it is possible to solve a problem of misidentifying the problem due to the increase of the pressure sensitivity corrected by the gain value.

Hereinafter, still another example of operations of an electronic device (e.g., the electronic device 101 in FIG. 1 or the electronic device 200 in FIG. 4) according to various embodiments will be described.

According to various embodiments, the electronic device (e.g., the electronic device 101 in FIG. 1 or the electronic device 200 in FIG. 4) may set a gain value or a threshold value for each sub-area included in the folding area.

Figure 22:
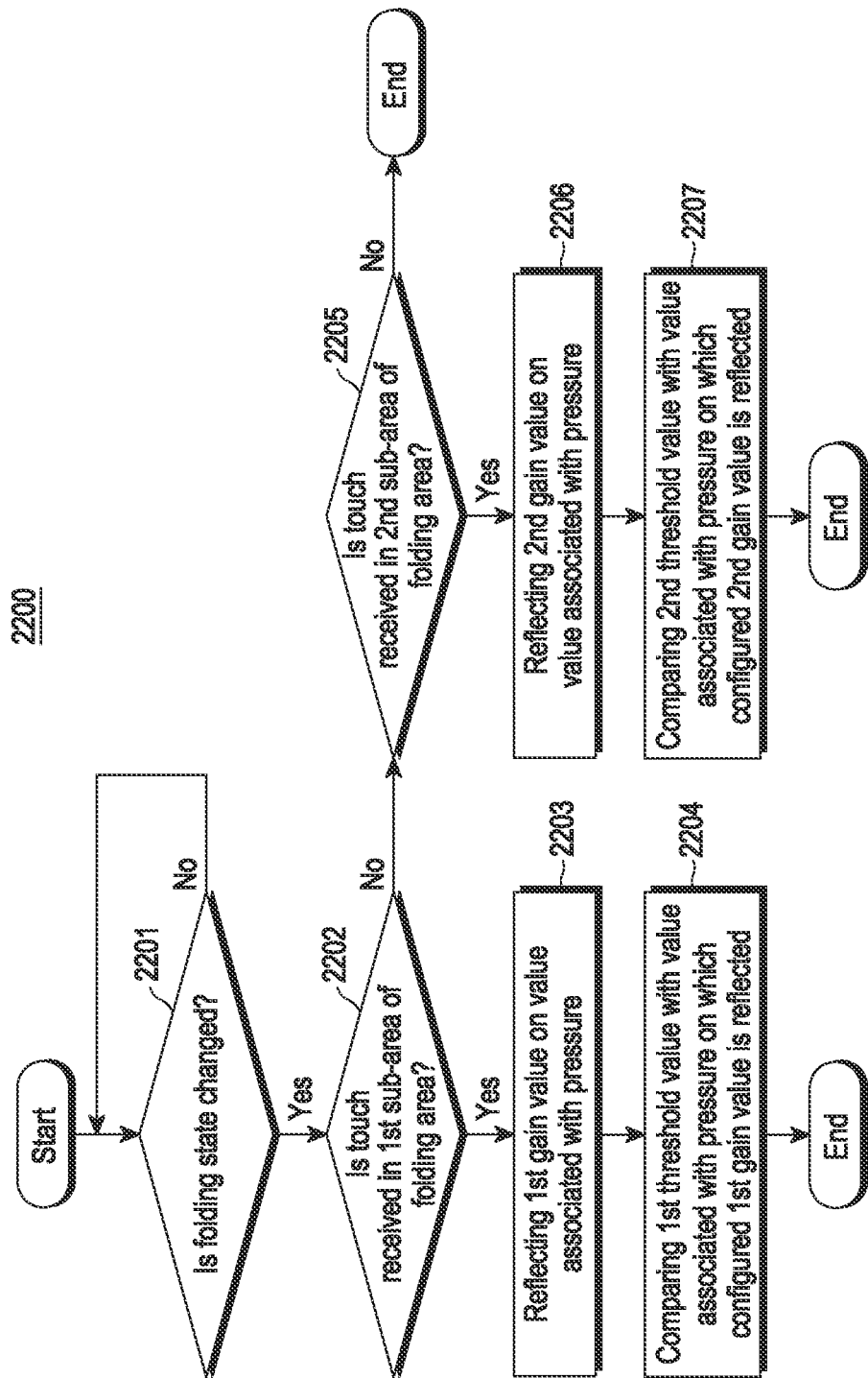
FIG. 22 is a flowchart for describing still another example of operations of an electronic device according to various embodiments.

FIG. 22 is a flowchart 2200 for describing still another example of operations of the electronic device according to various embodiments. According to various embodiments, the operations illustrated in FIG. 22 are not limited to the illustrated order, and may be executed in various orders. In addition, according to various embodiments, a greater or smaller number of operations compared to the operations illustrated in FIG. 22 may be executed. Hereinafter, FIG. 22 will be described with reference to FIG. 23.

Figure 23:
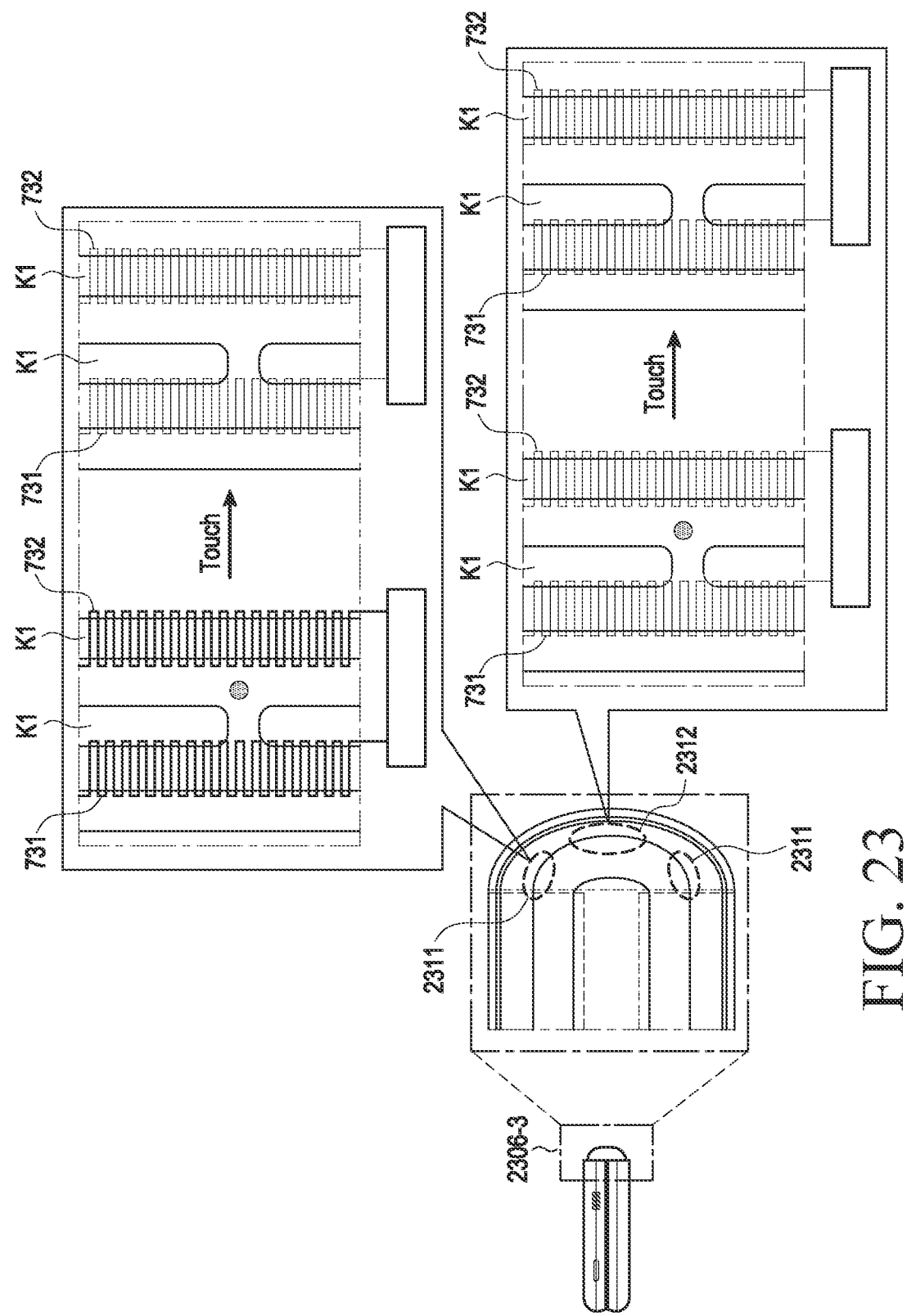
FIG. 23 is a view for describing an operation of configuring a gain value or a threshold value for each sub-area included in a folding area of an electronic device according to various embodiments.

FIG. 23 is a view for describing an operation of configuring a gain value or a threshold value for each sub-area included in a folding area of an electronic device according to various embodiments is changed.

According to various embodiments, in operation 2201, the electronic device 101 (e.g., the sensor control circuit 721) may identify whether the folding state of the electronic device 101 is changed. Since operation 2201 of the electronic device 101 may be executed in the same manner as the above-described operation 1801 of the electronic device 101, a redundant description will be omitted.

According to various embodiments, when it is identified that a touch is received in the first sub-area in operation 2202, the electronic device 101 (e.g., the sensor control circuit 721) may reflect a first gain value on a value associated with the pressure in operation 2203 and compare a value associated with the pressure on which the set first gain value is reflected with a first threshold value in operation 2204. For example, in an out-folded state (e.g., an out-folded and collapsed state), the electronic device 101 may receive a first user input on an area of a flexible display corresponding to a first sub-area 2301 included in a bendable portion 2306-3. The electronic device 101 may set the first gain value to a value (e.g., pressure sensitivity) associated with the pressure identified by the received first user input. Alternatively, the electronic device 101 may compare the value associated with the pressure with the first threshold value for identifying a specific event (e.g., a force touch).

According to various embodiments, when it is identified that a touch is received in the second sub-area in operation 2205, the electronic device 101 (e.g., the sensor control circuit 721) may reflect a second gain value on a value associated with the pressure in operation 2206 and compare a value associated with the pressure on which the set second gain value is reflected with a second threshold value in operation 2207. For example, in the out-folded state, the electronic device 101 may receive a second user input on an area of a flexible display corresponding to a second sub-area 2302 included in the bendable portion 2306-3. The electronic device 101 may set a second gain value greater than the above-described first gain value to a value associated with the pressure (e.g., pressure sensitivity) identified by the received second user input. Alternatively, the electronic device 101 may compare the value associated with the pressure with the second threshold value smaller than the above-described first threshold value for identifying a specific event (e.g., a force touch).

According to various embodiments, the electronic device 101 (e.g., the sensor control circuit 721) may store and/or set different gain values and different threshold values such that the gain values and the threshold values are associated with respective sub-areas (e.g., 2311 and 2312) included in the bendable portion 2306-3 corresponding to the folding area 231c of the flexible display. Referring to FIG. 23, the bendable portion 2306-3 may include a plurality of sub-areas including first sub-areas 2311 and a second sub-area 2312. Compared with the second sub-area 2312, the first sub-areas 2311 may be defined as areas of the conductive plate that is further deformed according to the change of the folding state of the electronic device 101. For example, the second sub-area 2312 may be an area closer to the rotation axes of the first housing structure 210 and the second housing structure 220 compared with the first sub-areas 2311. Accordingly, for a plurality of respective sub-areas, the degrees to which the resistors (e.g., the first resistors 731 and second resistors 732) included in the pressure sensor 712 are deformed by a user input may be different between the first and second sub-areas 2311 and 2312. For example, as illustrated in FIG. 23, when the electronic device 101 is out-folded, the degree to which the resistors (e.g., the first resistor 731 and the second resistors 732) disposed in the first sub-areas 2311 are deformed by a user input may be greater than the degree to which the resistors (e.g., the first resistors 731 and the second resistors 732) disposed in the second sub-area 2312 are deformed by the user input. Accordingly, the amounts by which the resistors (e.g., the first resistors 731 and the second resistors 732) disposed in the second sub-area 2312 are changed by an input received on the folding area 231c corresponding to the second sub-area 2302 may be smaller than the amounts by which the resistors (e.g., the first resistors 731 and the second resistors 732) disposed in the second sub-area 2312 are changed by the input received in the folding area 231c corresponding to the first sub-areas 2311. Accordingly, a value associated with a pressure (e.g., a value indicating pressure sensitivity)

identified from the pressure sensor 712 by substantially the same input may be relatively smaller in the second sub-area 2312. The electronic device 101 may set a gain value for compensating for a value associated with a pressure corresponding to the second sub-area 2302 to be relatively greater than that of the first sub-areas 2301, and may set the threshold value corresponding to the second sub-area 2312 to be smaller than that of the first sub-areas 2311, so that the electronic device 101 may execute the same operation by substantially the same input received on the first sub-areas 2301 and the second sub-areas 2312. In other words, for substantially the same input received in each of the sub-areas 2311 and 2312, the electronic device 101 may adjust a value associated with a pressure identified for each sub-area to the same value or to one of values in a similar range, or may adjust a threshold value for identifying a specific value so that the same operation is executed in response to an input sensed by the electronic device 101. Without being limited to the illustration, the degrees to which the resistors (e.g., the first resistors 731 and the second resistors 732) disposed in the second sub-areas 2312 may be smaller than the degrees to which the resistors (e.g., the first resistors 731 and the second resistors 732) disposed in the first sub-areas 2311 are deformed. In this case, the electronic device 101 may set a gain value for compensating for a value associated with a pressure corresponding to the second sub-area 2312 to be relatively smaller than that for the first sub-areas 2311, and may set a threshold value for the second sub-area 2312 to be relatively greater than that for the first sub-areas 2311.

Meanwhile, the operation of configuring the above-described gain value and threshold value for each of the sub-areas 2311 and 2312 may be applicable to the operation of configuring an offset value. That is, the electronic device 101 may set an offset value for each of the sub-areas 2311 and 2312 included in the folding area. For example, the electronic device 101 may set the offset value associated with the second sub-area 2312 to be greater than that for the first sub-areas 2311. As a result, a value associated with a pressure and misidentified as being relatively greater in the second sub-area 2312 compared with that in the first sub-areas 2311 by the folding state of the electronic device 101 may be subtracted by a greater value.

Hereinafter, still another example of an electronic device 101 according to various embodiments will be described. As an example, the electronic device 101 may be implemented as a rollable electronic device 3100. Even when the electronic device 101 is implemented as a rollable electronic device 3100, an operation of configuring at least one of the above-described correction values (threshold values and offset values) or threshold values may be executed. Hereinafter, first, the rollable electronic device 3100 will be described.

Figure 24:
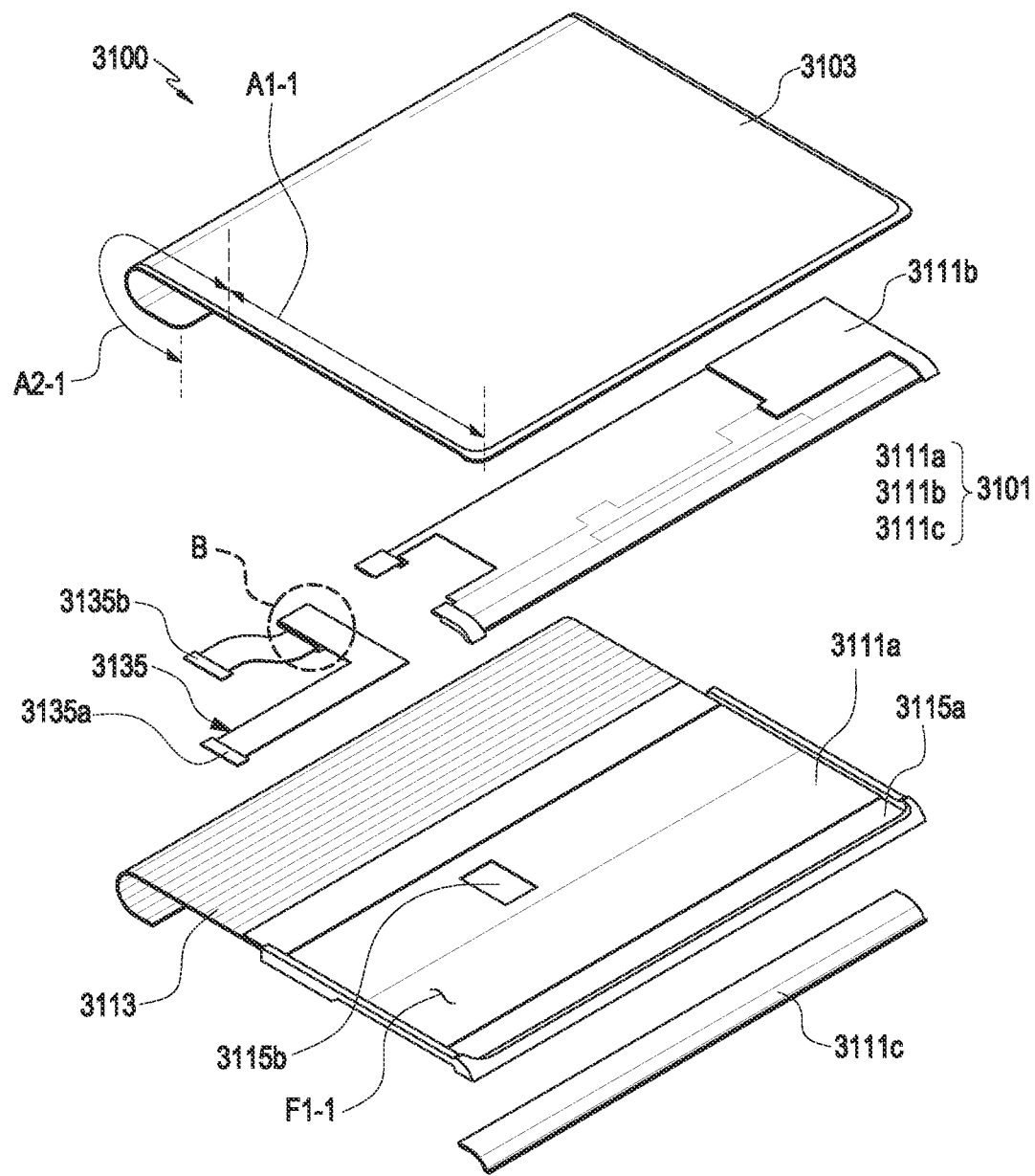
FIG. 24 is an exploded perspective view for describing still another example of an electronic device according to various embodiments.
Figure 25:
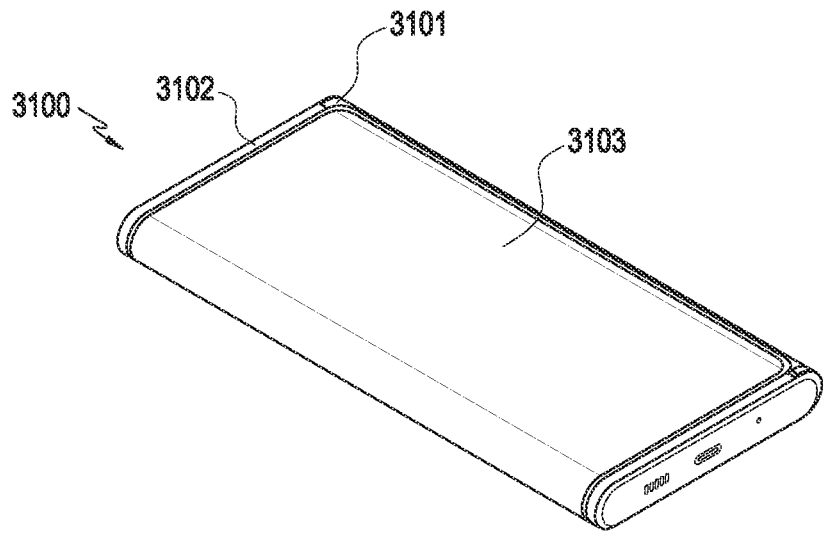
FIG. 25 is a perspective view illustrating still another example of an electronic device according to various embodiments in the state in which a portion of a flexible display is accommodated in a second structure.
Figure 26:
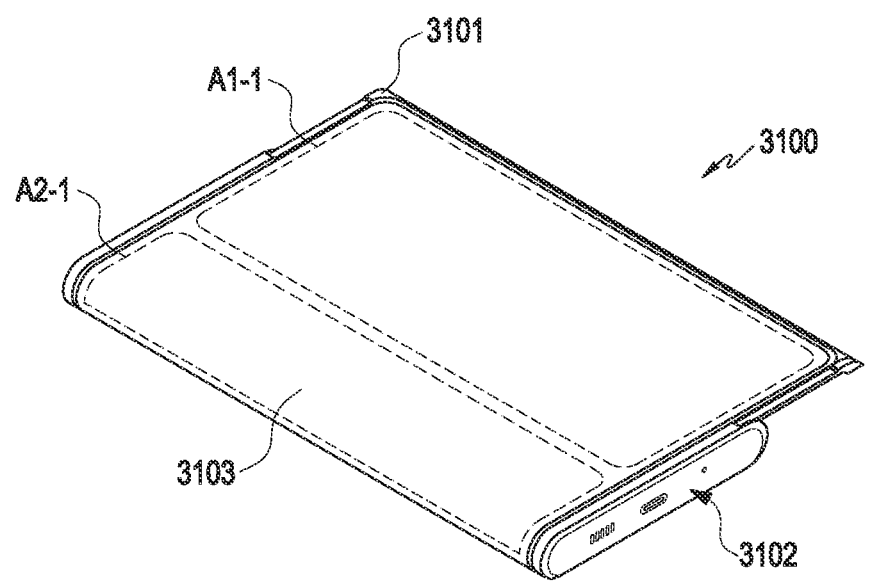
FIG. 26 is a perspective view illustrating still another example of an electronic device according to various embodiments in the state in which most of a flexible display is exposed to the outside of a second structure.

FIG. 24 is an exploded perspective view for describing still another example of the electronic device 3100 according to various embodiments, FIG. 25 is a perspective view illustrating still another example of the electronic device 3100 according to various embodiments in the state in which a portion of a flexible display 3103 is accommodated in a second structure, and FIG. 26 is a perspective view illustrating another example of the electronic device 3100 according to various embodiments in the state in which most of the flexible display 3103 is exposed to the outside of a second structure 3102. Referring to FIGS. 24 to 26, the electronic device 3100 may include a rollable electronic device. The rollable electronic device 3100 may include a flexible display 3103 arranged to be slidable and configured to provide a screen (e.g., a display screen), first and second structures 3101 and 3102, a first plate 3111a, first and second brackets 3111b and 3111c, an articulated hinge structure 3113, and a flexible printed circuit board 3135.

For example, a first area A1-1 of the flexible display 3103 may be mounted on or attached to a first surface F1-1 of the first plate 3111a, and a second area A1-2 of the flexible display 3103 may be attached to or supported on the articulated hinge structure 3113. The articulated hinge structure 3113 may guide or support the deformation of the second area A2-1 to a curved shape, and may suppress the deformation of the second area A2-1 by an external force (e.g., contact by a user) while maintaining the second area A2-1 in a flat state in the state of being exposed to the outside. In some embodiments, the first surface F1-1 may be configured by coupling the first plate 3111a and the first bracket 3111b, and the first surface F1-1 may include the front surface of the first plate 3111a. According to an embodiment, a portion of the first area A1-1 may be directly attached to the first bracket 3111b, and another portion may be directly attached to the first plate 3111a.

According to various embodiments, the first plate 3111a may include an assembly hole 3115a provided through at least a portion thereof. Referring to FIG. 24, a portion of an edge of the flexible display 3103 may enter the assembly hole 3115a. In the state in which a portion of an edge of the flexible display 3103 enters the assembly hole 3115a, the flexible display 3103 may be bonded to or mounted on the first plate 3111a. In the state in which the flexible display 3103 is bonded to or mounted on the first plate 3111a, a portion of the surface of the flexible display 3103 (e.g., the outer surface of an edge) may be coupled to the inner surface of the assembly hole 3115a in the first plate 3111a, and a portion of the surface of the flexible display 3103 (e.g., the outer surface of an edge) coupled in this way may be coupled to and supported by the second bracket 3111c.

According to various embodiments, the first plate 3111a may further include a wiring hole 3115b, and at least a portion of the flexible printed circuit board 3135, for example, a bent portion B may be disposed inside the wiring hole 3115b. In the state in which the flexible display 3103 is mounted on the first structure 3101, a portion of the flexible printed circuit board 3135 (e.g., the bent portion B and a second connector 3135b) may be exposed to a second surface of the first plate 3111a. For example, the bent portion B may be at least partially disposed inside the wiring hole 3115b, and a portion of the flexible printed circuit board 3135 between the second connector 3135b and the bent portion B may pass through the wiring hole 3115b and may be located on a second surface. The second surface may include the rear surface of the first plate 3111a. In this state, when the first structure 3101 slides, the bent portion B of the flexible printed circuit board 3135 may be deformed. For example, a tensional force may be applied to the flexible printed circuit board 3135 due to the sliding of the first structure 3101, and this tension force may be canceled by the deformation of the bent portion B. In some embodiments, the bent portion B may be substantially deformed within the space inside the wiring hole 3115b.

According to various embodiments, the electronic device 3100 may further include a flexible printed circuit board 3135. The flexible printed circuit board 3135 may connect the flexible display 3103 to a main circuit board. In some embodiments, a driving chip (e.g., a display control circuit, or a display driving circuit (DDI)) of the flexible display 3103 may be mounted on the flexible printed circuit board 3135. When a touch panel is integrated into the flexible display 3103, a touch panel driving chip (e.g., a sensor control circuit) may be mounted on the flexible printed circuit board 3135. In an embodiment, the flexible printed circuit board 3135 may be electrically connected to the flexible display 3103 or the main circuit board by including connectors 3135a and 3135b provided at opposite ends, respectively. In another embodiment, a portion of the flexible printed circuit board 3135 (e.g., the bent portion B) may be disposed in the electronic device 3100 in a bent state.

As illustrated in FIGS. 24 and 25, the flexible display 3103 may be at least partially deformed into a curved shape while being maintained in a flat shape. In an embodiment, the first area A1-1 of the flexible display 3103 may be mounted on or attached to the first surface F1-1 of the first plate 3111a to be maintained in a substantially flat plate shape. The second area A2-1 may extend from the first area A1-1 and may be supported on or attached to the articulated hinge structure 3113. For example, the second area A2-1 may be extended (or drawn out) along the sliding direction of the first structure 3101, may be accommodated inside (drawn into) the second structure 3102 together with the articulated hinge structure 3113, and may be at least partially deformed into a curved shape according to the deformation of the articulated hinge structure 3113.

As described above with reference to FIGS. 24 and 26, as the first structure 3101 slides on the second structure 3102, the area of the flexible display 3103 exposed to the outside may vary. Based on the area of the flexible display 3103 to be exposed to the outside, the electronic device 3100 may change an area of the flexible display 3103 to be activated. For example, in the open state (FIG. 26) or in the closed state (FIG. 25), the electronic device 3100 may activate an area that is exposed to the outside of the second structure 3102 in the total area of the flexible display 3103. For example, in the closed state, the electronic device 3100 may activate the first area A1-1 of the flexible display 3103 and deactivate the second area A2-1 of the flexible display 3103. In the closed state, when there is no user input for a predetermined period of time (e.g., 30 seconds or 2 minutes), the electronic device 3100 may deactivate the entire area of the flexible display 3103.

According to various embodiments, as illustrated in FIGS. 24 and 26, in the open state, substantially the entire area (e.g., the first area A1-1 and the second area A2-1) of the flexible display 3103 may be exposed to the outside, and the first area A1-1 and the second area A2-1 may be disposed to configure a plane. In an embodiment, even in the open state, a portion (e.g., one end) of the second area A2-1 may be located to correspond to a roller, and the portion corresponding to the roller in the second area A2-1 may be maintained in a curved shape. For example, in various embodiments disclosed herein, even if it is stated that "in the open state, the second area A2-1 is disposed to configure a plane", a portion of the second area A2-1 may be maintained in a curved shape. Similarly, although it is stated that "in the closed state, the articulated hinge structure 3113 and/or the second area A2-1 are accommodated in the second structure 3102", a portion of the articulated hinge structure 3113 and/or the second area A2-1 may be located outside the second structure 3102.

The entire area (e.g., the first area A1-1 and the second area A2-1) of the flexible display 3103 of the rollable electronic device 3100 is an area that is visually exposed to allow an image to be output, and the electronic device 3100 may adjust the exposure of the entire area to the outside according to the movement of the flexible display 3103. For example, when the second structure 3102 at least partially slides from the first structure 3101, it is possible to selectively expand the first and second areas A1-1 and A2-1 of the flexible display 3103.

According to various embodiments, the flexible display 3103 may also be referred to as a slide-out display or an expandable display.

According to various embodiments, the rollable electronic device 3100 may include the above-described conductive plate (e.g., the conductive plate 2306 in FIG. 5B). For example, the flexible display 3103 may include a conductive plate (e.g., the conductive plate 2306 of FIG. 5B). For example, the conductive plate may be disposed between the flexible display 3103 and the articulated hinge 3113. A partial area and a remaining area of the conductive plate may have different patterns. For example, openings (e.g., the openings K1 in FIG. 5B) may be provided in a partial area of the conductive plate, and the openings K1 are not provided in another partial area. Alternatively, openings having a pattern (e.g., shape, size, and/or arrangement interval) different from that of the openings (e.g., the opening K1 of FIG. 5B) provided in a partial area of the conductive plate may be provided. For example, Like the openings K1 which are provided in an area corresponding to the bendable portion 2306-3 of the conductive plate of the electronic device 101 as described above, the openings K1 are provided in at least a portion of an area of the conductive plate corresponding to the second area A2-1 of the flexible display 3103 (or an area curved according to drawing-out and/or drawing-in of the flexible display) of the rollable electronic device, and no openings may be provided in the remaining area corresponding to the first area A1-1. Alternatively, in the remaining area, openings may be provided in a pattern (e.g., shape, size, and/or arrangement interval) that is different from that of the openings K1 provided in the second area A2-1.

According to another embodiment, the conductive plate (e.g., the conductive plate 2306 in FIG. 5B) included in the expandable display may extend to a flat area (e.g., the first area A1-1), and openings K1 may also be provided in at least a portion of the areas corresponding to the extension area (e.g., the second area A2-1) and the flat area (e.g., the first area A1-1).

The flexible display 3103 according to the exemplary embodiments of the disclosure is applicable to various transformable electronic devices configured such that the shape of a display and/or display area of a display are changeable through structural change of at least one housing.

Hereinafter, an example of an operation of configuring at least one of correction values (threshold values and offset values) or threshold values of the rollable electronic device 3100 will be described with reference to FIGS. 27 and 28. According to various embodiments, to the operation of configuring at least one of correction values (threshold values and offset values) or threshold values of the rollable electronic device 3100, the operations of the electronic device 101 described above with reference to FIGS. 18A to 23, in addition to the operations to be described below.

Figure 27A:
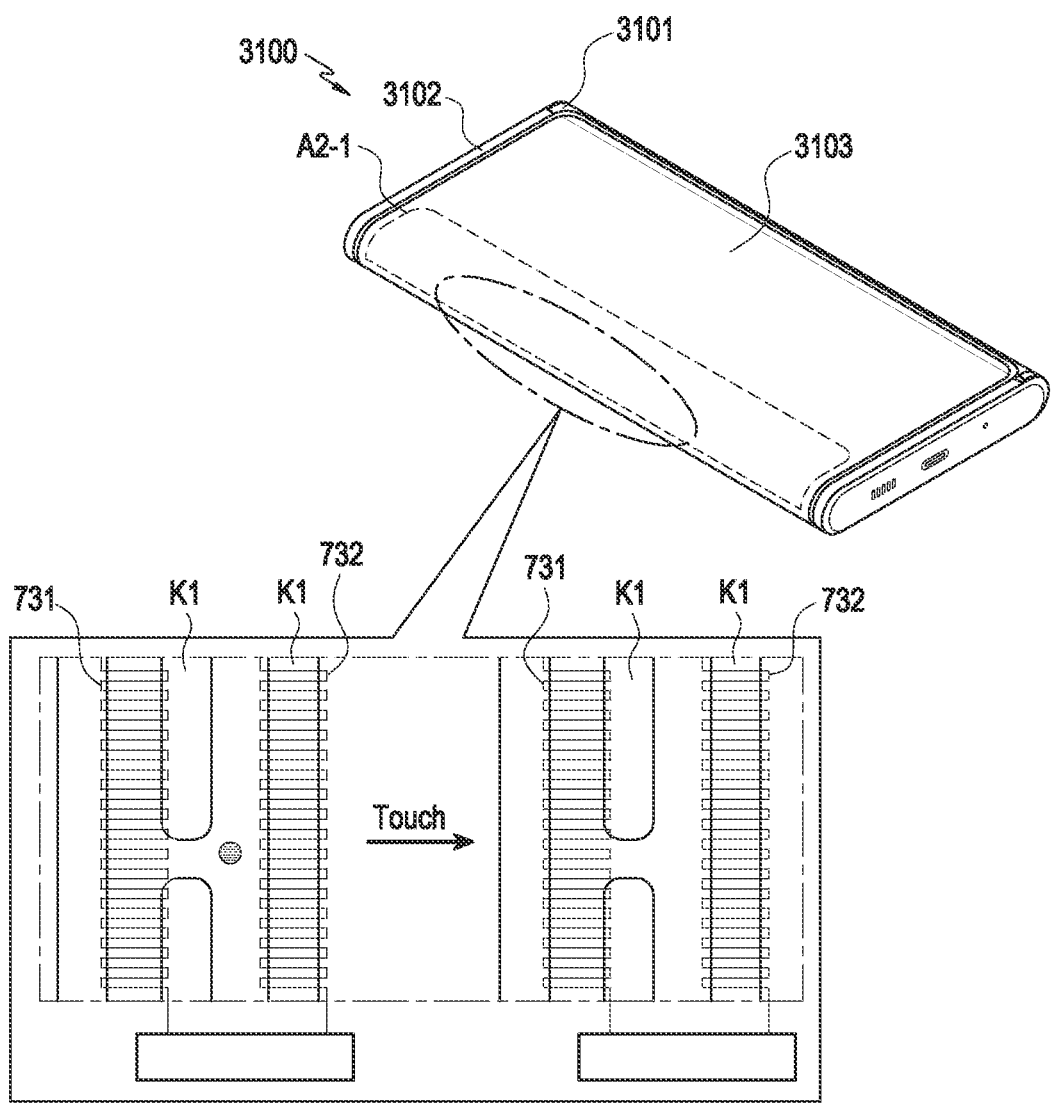
FIG. 27A is a view for describing an example of an operation of configuring a correction value (a gain value, and/or an offset value) or a threshold value based on drawing-in or drawing-out of a flexible display of a rollable electronic device according to various embodiments.
Figure 27B:
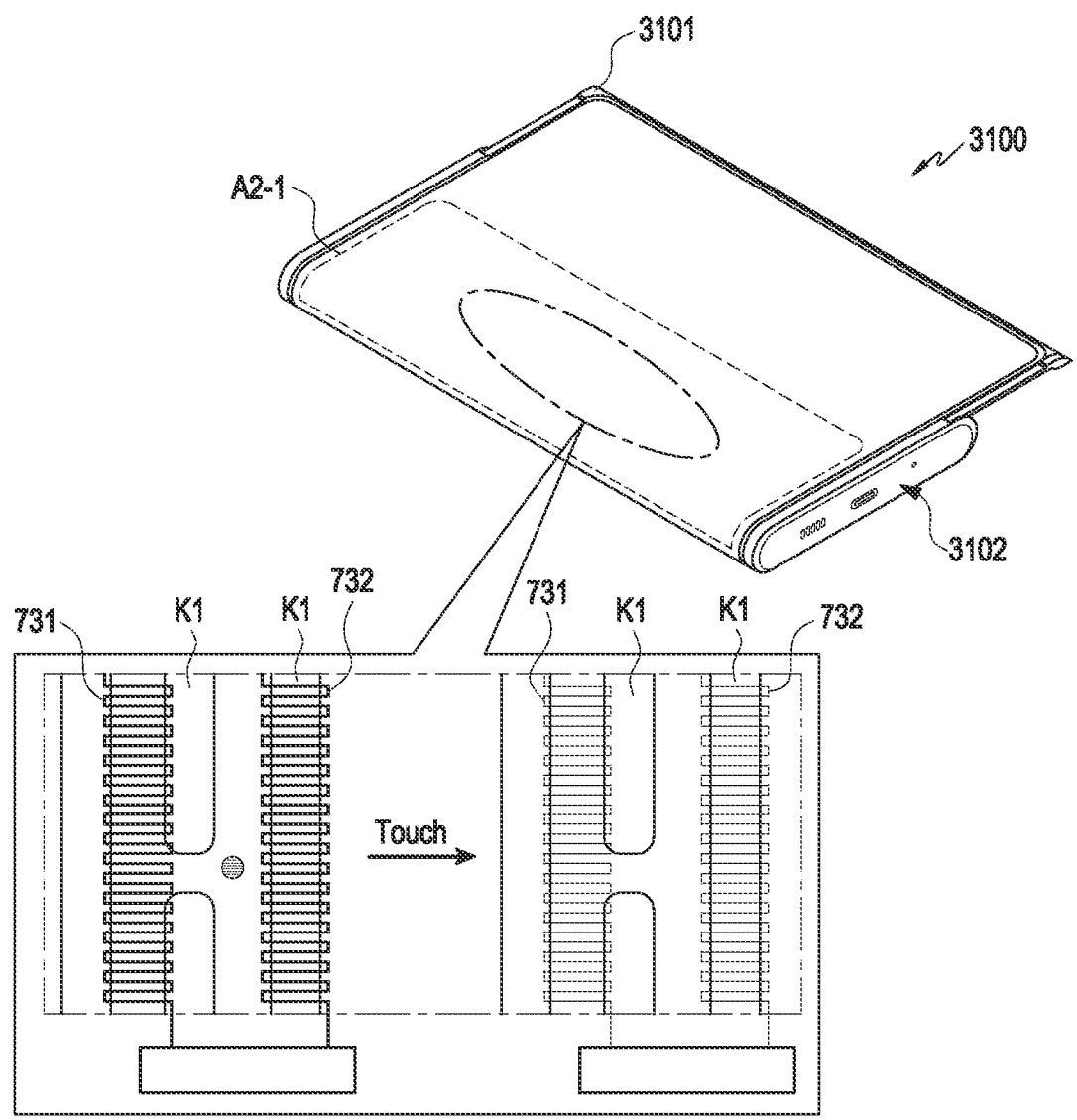
FIG. 27B is a view for describing an example of an operation of configuring a correction value (a gain value, and/or an offset value) or a threshold value based on drawing-in or drawing-out of a flexible display of a rollable electronic device according to various embodiments.
Figure 28:
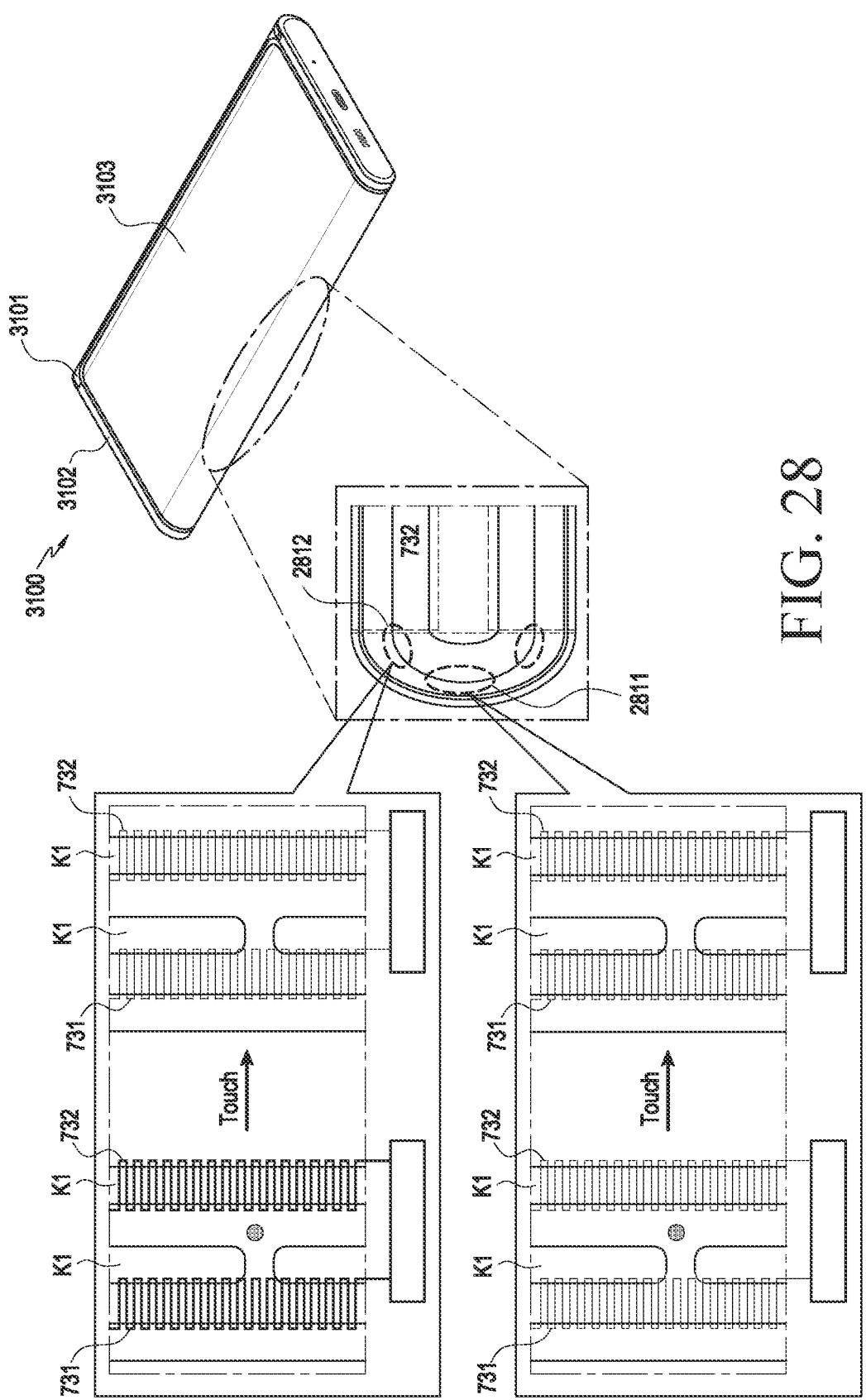
FIG. 28 is a view for describing an example of an operation of configuring different correction values (a gain value, and/or an offset value) or threshold values for respective areas of a conductive plate of a rollable electronic device according to various embodiments.

FIG. 27A is a view for describing an example of an operation of configuring a correction value (a gain value and/or an offset value) or a threshold value based on drawing-in or drawing-out of a flexible display 3103 of a rollable electronic device 3100 according to various embodiments. FIG. 27B is a view for describing an example of an operation of configuring a correction value (a gain value and/or an offset value) or a threshold value based on drawing-in or drawing-out of a flexible display 3103 of a rollable electronic device 3100 according to various embodiments. FIG. 28 is a view for describing an example of an operation of configuring different correction values (a gain value, and/or an offset value) or threshold values for respective areas of a conductive plate of a rollable electronic device 3100 according to various embodiments.

According to various embodiments, the rollable electronic device 3100 may include resistors (e.g., the first resistor 731 and the second resistor 732) for sensing pressure on an area (e.g., an area corresponding to the second area A2-1) in which the above-described openings K1 of the conductive plate are provided. As described above, on an area of the conductive plate of the rollable electronic device 3100 in which the openings K1 are provided (e.g., the area corresponding to the second area A2-1), some resistors (e.g., the first resistor 731) may also be disposed on the openings K1 at a first proportion, and other resistors (e.g., the second resistor 732) may be disposed at a second proportion greater than the first proportion.

According to various embodiments, in the rollable electronic device 3100, a correction value (e.g., a gain value and/or an offset value) and a threshold value may be set for accurate identifying a user input received on the flexible display 3103 corresponding the area of the conductive plate in which the openings K1 are provided (e.g., the area corresponding to the second area A2-1).

For example, in the rollable electronic device 3100, a correction value (e.g., a gain value and/or an offset value) and/or a threshold value) corresponding to a degree of deformation may be set based on the degree of deformation (or bending degree) of a portion of the area of the conductive plate in which the openings K1 are provided (e.g., the area corresponding to the second area A2-1). For example, when the flexible display 3103 of the rollable electronic device 101 is drawn into the electronic device 3100 or drawn out of the electronic device 3100 based on the sliding of the first structure 301, the degree of deformation (or the degree of bending) of a portion of the area the conductive plate in which the openings K1 are provided (e.g., the area corresponding to the second area A2-1) may be changed. For example, when a portion of the area of the conductive plate in which the openings K1 are provided (e.g., the area corresponding to the second area A2-1) is disposed corresponding to a roller according to drawing-in and/or drawing-out of the flexible display 3103, the portion may be further deformed (or bent). As an example, as illustrated in FIGS. 27A to 27B, when the flexible display 3103 is drawn in (FIG. 27A), a portion of the area of the conductive plate in which the openings K1 are provided (e.g., the area corresponding to the second area A2-1) may be relatively further curved compared to the case where the flexible display 3103 is drawn out (FIG. 27B). When a portion of the area of the conductive plate in which the openings K1 are provided is further deformed (e.g., FIG. 27A), the rollable electronic device 3100 may execute at least one of an operation of configuring a relatively greater gain value, an operation of configuring a smaller correction value, or an operation of configuring a smaller threshold value. Since the description of the operations of configuring correction values and threshold values of the foldable electronic device 101 described above may be applicable mutatis mutandis, a redundant description will be omitted.

For example, in the rollable electronic device 3100, a correction value (e.g., a gain value and an offset value) and/or a threshold value corresponding to the degree of deformation (or the degree of bending) may be configured for each of the sub-areas (e.g., the sub-areas 2811 and 2812 in FIG. 28) of the area of the conductive plate in which openings K1 are provided (e.g., the area corresponding to the second area A2-1). For example, in the state in which the flexible display 3103 is drawn out and/or drawn in, the sub-areas of the area of the conductive plate in which the openings K1 are provided (e.g., the area corresponding to the second area A2-1) are may be deformed (or bent) to different degrees. As an example, as illustrated in FIG. 28, in the state in which the flexible display 3103 is drawn in, the second sub-area 2812 of the area of the conductive plate in which the openings K1 are provided (e.g., the area corresponding to the second area A2-1) may be more deformed (or bent) than the first sub-area 2811. Alternatively, without being limited to the above description, the first sub-area 2811 may be more deformed (or bent) than the second sub-area 2812. For a relatively more deformed sub-area (e.g., the second sub-area 2812 in FIG. 28) of the area of the conductive plate in which the openings K1 are provided, the rollable electronic device 3100 may execute at least one of an operation of configuring a gain value relatively greater than that of a relatively less deformed sub-area (e.g., the first sub-area 2811 in FIG. 28), an operation of configuring a relatively smaller correction value than that of the relatively less deformed sub-area, or an operation of configuring a smaller threshold value than that of the relatively less deformed sub-area. Since the description of the operations of configuring correction values and threshold values of the foldable electronic device 101 described above may be applicable mutatis mutandis, a redundant description will be omitted.

According to various embodiments, an electronic device (e.g., the electronic device 101 in FIG. 1 or the electronic device 200 in FIG. 4) may include a housing structure (e.g., the first and second housings 210 and 220 in FIG. 1), a flexible display (e.g., 230) disposed on the housing structure, a pressure sensor (e.g., 712) including a first resistor (e.g., 731) and a second resistor (e.g., 732) disposed in at least a portion of the flexible display, and a control circuit (e.g., 720), wherein the control circuit is configured to detect a value associated with a pressure applied to the flexible display based on values corresponding to the first resistor and the second resistor when the flexible display is touched.

According to various embodiments, the control circuit may include at least one of a touch sensor control circuit (e.g., 721) and a display driving circuit (e.g., 722).

According to various embodiments, the flexible display may include a window, a display panel disposed on the rear surface of the window, a polarizer disposed between the window and the display panel, a touch panel disposed between the polarizer and the display panel, a plurality of touch sensors disposed on the touch panel and configured to detect a touch of an external object facing a front surface of the window, a polymer member disposed on a rear surface of the display panel, a conductive plate attached to a rear surface of the polymer member and including a plurality of openings, the first resistor disposed in an area other than the plurality of openings, and the second resistor disposed on at least some of the plurality of openings.

According to various embodiments, the plurality of openings may have an equal size or different sizes, and the plurality of openings K1 may include at least one of an elongated bar-type shape, a circular shape, a square shape, a rectangular shape, a rhombus shape, or an oval shape.

According to various embodiments, the first resistor may be provided in a first pattern, and the second resistor may be provided in a second pattern, each of the shape of the first pattern and the shape of the second pattern may include a shape of a zigzag pattern, and the shape of the zigzag pattern of each of the first resistor and the second resistor may have a predetermined interval.

According to various embodiments, the first resistor may have a width that is greater or smaller than the width of a support area provided between the plurality of openings.

According to various embodiments, the first resistor may have a width that is equal to the width of the support area provided between the plurality of openings.

According to various embodiments, when the width of the first resistor is smaller than the width of the second resistor, the thickness of the first resistor may be greater or smaller than the thickness of the second resistor.

According to various embodiments, the width of the second resistor may be greater or smaller than the width of a spatial area provided in the plurality of openings.

According to various embodiments, the width of the second resistor may be equal to the width of the spatial area provided in the plurality of openings.

According to various embodiments, when the width of the second resistor is smaller than the width of the first resistor, the thickness of the second resistor may be greater than the thickness of the first resistor.

According to various embodiments, the conductive plate may include first and second flat portions facing the housing structure, and a bendable portion that integrally interconnects the first flat portion and the second flat portion and allows the conductive plate to be folded or unfolded via the plurality of openings which are spaced apart from each other.

According to various embodiments, the electronic device may further include a touch sensor, and the control circuit may be configured to acquire at least one first value associated with a user input in the same manner as operation using the touch sensor, to acquire a value associated with the pressure of the touch by using the pressure sensor, and to perform control such that at least one operation is executed based on the at least one first value and the at least one second value.

According to various embodiments, the control circuit may be configured to compare the at least one first value with a first threshold value, to compare the at least one second value with the second threshold value, and to perform control such that the at least one operation is executed based on the comparison result with the first threshold value and a comparison result with the second threshold value.

According to various embodiments, the control circuit may be configured, based on a comparison result of the at least one first value with the first threshold value, to identify the second threshold value corresponding to the comparison result.

According to various embodiments, the electronic device may further include a hinge structure, wherein the housing structure may include a first housing and a second housing connected to the hinge structure, and the control circuit may be configured to reflect a first gain value on a value associated with the pressure of the touch when the input is positioned in a first area of the flexible display associated with the hinge structure and an angle between the first housing and the second housing is a first angle, to compare the value associated with the pressure of the touch on which the first gain value is reflected with the second threshold value, to reflect a second gain value on the value associated with the pressure of the touch when the angle between the first housing and the second housing is a second angle, and to compare the value associated with the pressure of the touch on which the second gain value is reflected with the second threshold value.

According to various embodiments, the control circuit may be configured to configure the second threshold value to the first value when the angle between the first housing and the second housing is the first angle, and to configure the second threshold value to the second value when the angle between the first housing and the second housing is the second angle.

According to various embodiments, the first area on the flexible display associated with the hinge structure may include a first sub-area and a second sub-area, and the control circuit may be configured to reflect a third gain value on the value associated with the pressure of the touch when the touch is positioned in the first sub-area, and to reflect a fourth gain value on the value associated with the pressure of the touch when the touch is positioned in the second sub-area.

According to various embodiments, when the angle between the first housing and the second housing is changed, the first sub-area may be relatively more curved than the second sub-area, and the third gain value may be greater than the fourth gain value.

According to various embodiments, the control circuit may be configured to compare the value associated with the pressure of the touch on which the third gain value is reflected with a third threshold value when the touch is positioned in the first sub-area, and to compare the value associated with the pressure of the touch on which the fourth gain value is reflected with a fourth threshold value when the touch is positioned in the second sub-area.

According to various embodiments, the electronic device may include a hinge structure, a housing structure including a first housing and a second housing connected to the hinge structure, a flexible display disposed on the housing structure, a conductive plate disposed on the rear surface of the flexible display and including a plurality of openings, a touch sensor, a pressure sensor, wherein a first proportion of the first resistor disposed on the plurality of openings is less than a second proportion of the resistor disposed on the plurality of openings, and a control circuit, wherein the control circuit may be configured to detect a value associated with a pressure applied to the flexible display based on values corresponding to the first resistor and the second resistor when a user input is received on the flexible display.

According to various embodiments, the electronic device may include a hinge structure, a housing structure including a first housing and a second housing connected to the hinge structure, a flexible display disposed on the housing structure, a pressure sensor including a first resistor and a second resistor disposed in at least a portion of the flexible display, a touch sensor, and a control circuit, wherein the control circuit may be configured to receive a user input in an area corresponding to the hinge structure on the flexible display, to acquire at least one first value associated with a touch of the input by using the touch sensor, to acquire at least one second value associated with the pressure of the input by using the pressure sensor based on a first change amount in the resistance value of the first resistor and a second change amount in the resistance value of the second resistor, wherein the second change amount is greater than the first change amount, using the pressure sensor, and to execute at least one operation based on the at least one first value and the at least one second value.

As will be apparent to a person ordinarily skilled in the technical field to which the disclosure belongs, an electronic device including a pressure sensor according to various embodiments of the disclosure is not limited by the above-described embodiments and drawings, and may be variously substituted, modified, and changed within the technical scope of the disclosure.

What is claimed is:

1. An electronic device comprising:
a housing structure;
a flexible display provided on the housing structure, the flexible of display comprising a conductive plate, wherein the conductive plate comprises a plurality of openings;
a pressure sensor comprising a first resistor and a second resistor that are provided in a portion of the flexible display, wherein the portion of the flexible display including the pressure sensor is configured to display an image; and
a control circuit configured to detect a value associated with a pressure of a touch applied to the flexible display based on values corresponding to the first resistor and the second resistor,
wherein the pressure sensor is disposed on the conductive plate; and
wherein the first resistor is disposed in an area of the flexible display other than the plurality of openings, and the second resistor is disposed on at least one of the plurality of openings.

2. The electronic device of claim 1, wherein the flexible display further comprises:
a window;
a display panel disposed on a rear surface of the window;
a polarizer disposed between the window and the display panel;
a touch panel disposed between the polarizer and the display panel;
a plurality of touch sensors disposed on the touch panel and configured to detect a touch of an external object at a front surface of the window; and
a polymer member disposed on a rear surface of the display panel,
wherein the conductive plate is attached to a rear surface of the polymer member.

3. The electronic device of claim 1, wherein a first proportion of the first resistor disposed on the plurality of openings is less than a second proportion of the second resistor disposed on the plurality of openings, and
wherein in case that the flexible display is touched, a second change amount in a resistance value of the second resistor is greater than a first change amount in a resistance value of the first resistor.

4. The electronic device of claim 3, wherein the plurality of openings have an equal size, and
wherein the plurality of openings have at least one of an elongated bar-type shape, a circular shape, a square shape, a rectangular shape, a rhombus shape, or an oval shape.

5. The electronic device of claim 3, wherein the plurality of openings have different sizes, and
wherein the plurality of openings have at least one of an elongated bar-type shape, a circular shape, a square shape, a rectangular shape, a rhombus shape, or an oval shape.

6. The electronic device of claim 3, wherein the first resistor is provided in a first zigzag pattern, and the second resistor is provided in a second zigzag pattern, and
wherein a shape of the first zigzag pattern and a shape of the second zigzag pattern have a predetermined interval.

7. The electronic device of claim 3, wherein a width the first resistor is greater than or equal to a width of a support area provided between the plurality of openings.

8. The electronic device of claim 3, wherein a width the first resistor is smaller than or equal to a width of a support area provided between the plurality of openings.

9. The electronic device of claim 3, wherein a width of the first resistor is smaller than a width of the second resistor, and a thickness of the first resistor is greater than a thickness of the second resistor.

10. The electronic device of claim 3, wherein a width of the first resistor is less than a width of the second resistor, and a thickness of the first resistor is smaller than a thickness of the second resistor.

11. The electronic device of claim 3, wherein a width of the second resistor is greater than or equal to a width of a spatial area provided in the plurality of openings.

12. The electronic device of claim 3, wherein a width of the second resistor is smaller than a width of a spatial area provided in the plurality of openings.

13. The electronic device of claim 3, wherein the conductive plate comprises:
a first flat portion facing the housing structure;
a second flat portion facing the housing structure; and
a bendable portion that integrally interconnects the first flat portion and the second flat portion so that the conductive plate is foldable via the plurality of openings.

14. The electronic device of claim 3, wherein the control circuit is further configured to:
obtain an at least one first value associated with a user input by using a touch sensor of the plurality of touch sensors,
obtain at least one second value associated with a pressure of the user input by using the pressure sensor based on the first change amount in the resistance value of the first resistor and the second change amount in the resistance value of the second resistor, the second change amount being greater than the first change amount, and
perform at least one control operation based on the at least one first value and the at least one second value.

15. The electronic device of claim 14, wherein the control circuit is further configured to:
compare the at least one first value with a first threshold value to obtain a first comparison result,
based on the first comparison result, identify a second threshold value corresponding to the first comparison result,
compare the at least one second value with the second threshold value to obtain a second comparison result, and
perform at least one control operation based on the first comparison result and the second comparison result.

16. The electronic device of claim 15, further comprising a hinge structure,
wherein the housing structure comprises a first housing and a second housing connected to the hinge structure,
wherein the control circuit is further configured to:
based on the user input being positioned in a first area of the flexible display associated with the hinge structure and an angle between the first housing and the second housing being a first angle, reflect a first gain value on a value associated with the pressure of the user input, compare the value associated with the pressure of the user input on which the first gain value is reflected with the second threshold value, based on the angle between the first housing and the second housing being a second angle, reflect a second gain value on the value associated with the pressure of the user input, and compare the value associated with the pressure of the user input on which the second gain value is reflected with the second threshold value.

17. The electronic device of claim 16, wherein the control circuit is further configured to:

based on the angle between the first housing and the second housing being the first angle, configure the second threshold value to the at least one first value, and based on the angle between the first housing and the second housing being the second angle, configure the second threshold value to the at least one second value.

18. The electronic device of claim 16, wherein the first area of the flexible display associated with the hinge structure comprises a first sub-area and a second sub-area, wherein the control circuit is further configured to:

based on the user input being positioned in the first sub-area, reflect a third gain value on the value associated with the pressure of the user input, and based on the user input being positioned in the second sub-area, reflect a fourth gain value on the value associated with the pressure of the user input, and wherein, based on the first sub-area being relatively more curved than the second sub-area in case that the angle between the first housing and the second housing is changed, the third gain value is greater than the fourth gain value.

19. The electronic device of claim 18, wherein the control circuit is further configured to:

based on the user input being positioned in the first sub-area, compare the value associated with the pressure of the user input on which the third gain value is reflected with a third threshold value, and based on the user input being positioned in the second sub-area, compare the value associated with the pressure of the user input on which the fourth gain value is reflected with a fourth threshold value.

* * * * *